(12) United States Patent
Hsu et al.

(10) Patent No.: US 12,529,106 B2
(45) Date of Patent: Jan. 20, 2026

(54) ASSAYS AND METHODS TO ASSIST IN VITRO FERTILIZATION

(71) Applicant: Inti Taiwan, Inc., Zhubei (TW)

(72) Inventors: An Hsu, Hsinchu County (TW); Pei-Yi Lin, Hsinchu County (TW); Yu-Ling Chen, Hsinchu County (TW); Ko-Wen Wu, Hsinchu County (TW); Kuan-Chun Chen, Hsinchu County (TW)

(73) Assignee: Inti Taiwan, Inc., Hsinchu (TW)

( * ) Notice: Subject to any disclaimer, the term of this patent is extended or adjusted under 35 U.S.C. 154(b) by 0 days.

(21) Appl. No.: 18/429,059

(22) Filed: Jan. 31, 2024

(65) Prior Publication Data

US 2024/0410001 A1 Dec. 12, 2024

Related U.S. Application Data

(60) Provisional application No. 63/613,056, filed on Dec. 20, 2023, provisional application No. 63/507,444, filed on Jun. 9, 2023.

(51) Int. Cl.
*C12Q 1/6883* (2018.01)
*C12Q 1/6874* (2018.01)
*G16B 25/10* (2019.01)
*G16B 40/20* (2019.01)

(52) U.S. Cl.
CPC ......... *C12Q 1/6883* (2013.01); *C12Q 1/6874* (2013.01); *G16B 25/10* (2019.02); *G16B 40/20* (2019.02); *C12Q 2600/178* (2013.01)

(58) Field of Classification Search
CPC .............. C12Q 1/6883; C12Q 1/6874; C12Q 2600/178; C12Q 2600/158; G16B 25/10; G16B 40/20
See application file for complete search history.

(56) References Cited

U.S. PATENT DOCUMENTS

| | | | |
|---|---|---|---|
| 9,168,533 B2 | 10/2015 | Chiou et al. | |
| 9,724,692 B2 | 8/2017 | Chiou et al. | |
| 10,415,084 B2 | 9/2019 | Chiou et al. | |
| 10,590,478 B2 | 3/2020 | Chen et al. | |
| 2017/0022544 A1 | 1/2017 | Chen et al. | |
| 2020/0040395 A1 | 2/2020 | Hamamah et al. | |
| 2021/0002698 A1* | 1/2021 | Kang | C12Q 1/6883 |
| 2021/0269862 A1 | 9/2021 | Quake et al. | |

FOREIGN PATENT DOCUMENTS

| | | |
|---|---|---|
| CN | 104975074 A | 10/2015 |
| CN | 106222244 A | 12/2016 |
| CN | 111295453 | 6/2020 |
| CN | 112469836 | 3/2021 |
| CN | 112662758 A | 4/2021 |
| CN | 114164264 A | 3/2022 |
| TW | I697560 | 7/2020 |
| WO | WO-2010/019694 A1 | 2/2010 |
| WO | WO-2014/062442 A1 | 4/2014 |
| WO | WO-2018/178171 A1 | 10/2018 |
| WO | WO-2019/093814 A2 | 5/2019 |
| WO | WO-2021/000893 A1 | 1/2021 |

OTHER PUBLICATIONS

Gao et al. ("Intrauterine injection of human chorionic gonadotropin before embryo transfer can improve in vitro fertilization-embryo transfer outcomes: a meta-analysis of randomized controlled trials." Fertility and sterility 112.1 (2019): 89-97).*
Makker et al. ("Endometrial receptivity: clinical assessment in relation to fertility, infertility, and antifertility." Medicinal research reviews 26.6 (2006): 699-746).*
Itzhaki et al ("Machine learning vs. classic statistics for the prediction of IVF outcomes." Journal of assisted reproduction and genetics 37 (2020): 2405-2412).*
Zeng, Hong, et al. "MicroRNA signatures in plasma and plasma exosome during window of implantation for implantation failure following in-vitro fertilization and embryo transfer." Reproductive Biology and Endocrinology 19 (2021): 1-14.*
"Infertility." Wikipedia. Sep. 9, 2024, 18:22 UTC. Dec. 18, 2024, 19:05 <https://simple.wikipedia.org/w/index.php?title=Infertility&oldid=9759071>.*
Von Grothusen, Carolina, et al. "Uterine fluid microRNAs are dysregulated in women with recurrent implantation failure." Human Reproduction 37.4 (2022): 734-746).*
Agarwal et al., "Predicting effective microRNA target sites in mammalian mRNAs," Elite, 4 (2015).
Altmae et al., "Meta-signature of human endometrial receptivity: a meta-analysis and validation study of transcriptomic biomarkers", Scientific Reports, Aug. 30, pp. 1-15, vol. 7, (2017).
Altmäe et al., "MicroRNAs miR-30b, miR-30d, and miR-494 regulate human endometrial receptivity", *Reproductive sciences* 20.3: 308-317 (2013).
Ambros, "microRNAs: tiny regulators with great potential", Cell, 107(7):823-826 (2001).
Andrews, "FastQC: a quality control tool for high throughput sequence data." Babraham Bioinformatics, (2010): 1-1.
Backes et al., "Bias in high-throughput analysis of miRNAs and implications for biomarker studies." *Analytical chemistry* 88.4 (2016): 2088-2095.
Banno et al., "MicroRNAs in endometrial cancer." International journal of clinical oncology 18 (2013): 186-192.
Bartel, "MicroRNAs: genomics, biogenesis, mechanism, and function", Cell, 116(2): 81-97 (2004).

(Continued)

*Primary Examiner* — Kimberly Chong
(74) *Attorney, Agent, or Firm* — JCIPRNET

(57) ABSTRACT

The disclosure relates to methods for determining an endometrial status using a sample, for example, a blood plasma sample, from a subject, comprising: (a) performing an assay on the blood sample from the subject to determine a miRNA expression profile, wherein the miRNA expression profile comprises expression levels of a plurality of miRNA and (b) analyzing the miRNA expression profile to obtain a predictive score using a computer-based machine-learning model.

25 Claims, 30 Drawing Sheets

(56) References Cited

OTHER PUBLICATIONS

Ben-Hamo et al., "MicroRNA regulation of molecular pathways as a generic mechanism and as a core disease phenotype." *Oncotarget* 6.3 (2015): 1594.
Bjorkman et al., "MicroRNAs in endometriosis: biological function and emerging biomarker candidates." Biology of Reproduction 101.6 (2019): 1167-1178.
Bolger et al., "Trimmomatic: a flexible trimmer for Illumina sequence data." Bioinformatics 30.15 (2014): 2114-2120.
Bolstad et al., "A comparison of normalization methods for high density oligonucleotide array data based on variance and bias," Bioinformatics, 19(2):185-193, (2003).
Breiman, "Random forests." Machine learning 45 (2001): 5-32.
Böhning, "Multinomial logistic regression algorithm." Annals of the institute of Statistical Mathematics 44.1 (1992): 197-200.
Cai et al., "PIWI-interacting RNAs (piRNAs): Promising applications as emerging biomarkers for digestive system cancer." Frontiers in Molecular Biosciences 9 (2022): 848105.
Cavaliere et al., "Towards personalized medicine: Non-coding rnas and endometrial cancer." Healthcare. vol. 9. No. 8. MDPI, (2021).
Chen et al., "A novel platform for discovery of differentially expressed microRNAs in patients with repeated implantation failure", Fertility and sterility 116(1): 181-188 (2021).
Chen et al., "Characterization of microRNAs in serum: a novel class of biomarkers for diagnosis of cancer and other diseases." Cell research 18.10 (2008): 997-1006.
Chen et al., "Development of a Predictive Model for Optimization of Embryo Transfer Timing Using Blood-Based microRNA Expression Profile", *International Journal of Molecular Sciences* 25.1: 76 (2023).
Chen et al., "miRDB: an online database for prediction of functional microRNA targets," Nucleic Acids Res, 48:D127-D31 (2020).
Chen et al., "The biogenesis and biological function of PIWI-interacting RNA in cancer." Journal of hematology & oncology 14.1 (2021): 93.
Chu et al., "miRNA-181 regulates embryo implantation in mice through targeting leukemia inhibitory factor." Journal of molecular cell biology 7.1 (2015): 12-22.
Coenen-Stass et al., "Evaluation of methodologies for microRNA biomarker detection by next generation sequencing." *RNA biology* 15.8 (2018): 1133-1145.
Condrat et al., "miRNAs as biomarkers in disease: latest findings regarding their role in diagnosis and prognosis." Cells 9.2 (2020): 276.
Cortez et al., "MicroRNAs in body fluids-the mix of hormones and biomarkers." Nature reviews Clinical oncology 8.8 (2011): 467-477.
Coughlan et al., "Recurrent implantation failure: definition and management." *Reproductive biomedicine online* 28.1 (2014): 14-38.
Di Pietro et al., "MiR-27a-3p and miR-124-3p, upregulated in endometrium and serum from women affected by Chronic Endometritis, are new potential molecular markers of endometrial receptivity." American Journal of Reproductive Immunology 80.3 (2018): e12858.
Dong et al., "MicroRNA-223-3p suppresses leukemia inhibitory factor expression and pinopodes formation during embryo implantation in mice." American Journal of Translational Research 8.2 (2016): 1155.
Díaz-Gimeno et al., "A genomic diagnostic tool for human endometrial receptivity based on the transcriptomic signature." *Fertility and sterility* 95.1 (2011): 50-60.
Díaz-Gimeno et al., "The accuracy and reproducibility of the endometrial receptivity array is superior to histology as a diagnostic method for endometrial receptivity." Fertility and sterility 99.2 (2013): 508-517.
Enciso et al., "Development of a new comprehensive and reliable endometrial receptivity map (ER Map/ER Grade) based on RT-qPCR gene expression analysis." Human Reproduction 33.2 (2018): 220-228.
Etheridge et al., "Extracellular microRNA: a new source of biomarkers." Mutation Research/Fundamental and Molecular Mechanisms of Mutagenesis 717.1-2 (2011): 85-90.
Extended European Search Report for EP Application No. EP3999657 dated Jun. 7, 2023.
Fuchs et al., "Bias in ligation-based small RNA sequencing library construction is determined by adaptor and RNA structure." *PloS one* 10.5 (2015): e0126049.
Galliano et al., "MicroRNA and implantation," Fertil Steril, 101 (6):1531-1544, (2014).
Garrido-Gomez et al., "Profiling the gene signature of endometrial receptivity: clinical results" Fertility and Sterility, vol. 99, No. 4. p. 1078-1085 (2013).
Giacomini et al., "Global transcriptomic changes occur in uterine fluid-derived extracellular vesicles during the endometrial window for embryo implantation." Human Reproduction 36.8 (2021): 2249-2274.
Git et al., "Systematic comparison of microarray profiling, real-time PCR, and next-generation sequencing technologies for measuring differential microRNA expression." *Rna* 16.5 (2010): 991-1006.
Glatstein et al., "New frontiers in embryo selection." Journal of Assisted Reproduction and Genetics 40.2 (2023): 223-234.
Harper, "The implantation window," Baillieres Clin Obstet Gynaecol, 6(2):351-371, (1992).
Hsieh et al., "A novel multi-gene detection platform for the analysis of miRNA expression." *Scientific reports* 8.1 (2018): 10684.
Huang et al., "miRTarBase 2020: updates to the experimentally validated microRNA-target interaction database," Nucleic Acids Res, 48: 0148-054, (2020).
Hull et al., "Tissue and circulating microRNA influence reproductive function in endometrial disease," Reprod Biomed Online, 27(5):515-529, (2013).
Ibanez-Perez et al., "microRNA-based signatures obtained from endometrial fluid identify implantative endometrium." Human Reproduction 37.10 (2022): 2375-2391.
International Search Report and Written Opinion for Application No. PCT/CN2020/099781 dated Sep. 28, 2020.
Jayaprakash et al., "Identification and remediation of biases in the activity of RNA ligases in small-RNA deep sequencing." *Nucleic acids research* 39.21 (2011): e141-e141.
Kang et al., "miPrimer: an empirical-based qPCR primer design method for small noncoding microRNA." *RNA* 24.3 (2018): 304-312.
Karimzade et al., "Local injury to the endometrium on the day of oocyte retrieval has a negative impact on implantation in assisted reproductive cycles: a randomized controlled trial." Archives of gynecology and obstetrics 281 (2010): 499-503.
Kasvandik et al., "Uterine fluid proteins for minimally invasive assessment of endometrial receptivity." The Journal of Clinical Endocrinology & Metabolism 105.1 (2020): 219-230.
Koler et al., "Disrupted gene pattern in patients with repeated in vitro fertilization (IVF) failure." *Human reproduction* 24.10 (2009): 2541-2548.
Kozomara et al., "miRBase: from microRNA sequences to function." Nucleic acids research 47.D1 (2019): D155-D162.
Kresowik et al., "MicroRNA-31 is significantly elevated in both human endometrium and serum during the window of implantation: a potential biomarker for optimum receptivity," Biol Reprod, 91 (1) :17, (2014).
Kumar et al., "Circulating miRNA biomarkers for Alzheimer's disease." PloS one 8.7 (2013): 69807.
Langmead et al., "Fast gapped-read alignment with Bowtie 2." Nature methods 9.4 (2012): 357-359.
Lee et al., "The C. elegans heterochronic gene lin-4 encodes small RNAs with antisense complementarity to lin-14," Cell, 75(5) :843-854, (1993).
Li et al., "Meta-analysis identifies candidate key genes in endometrium as predictive biomarkers for clinical pregnancy in IVF." *Oncotarget* 8.60 (2017): 102428.
Li et al., "MicroRNA-30a-3p regulates epithelial-mesenchymal transition to affect embryo implantation by targeting Snai2dagger," Biol Reprod, 2019, 100(5) :1171-1179.

(56) References Cited

OTHER PUBLICATIONS

Li et al., "PIWI-interacting RNAs are aberrantly expressed and may serve as novel biomarkers for diagnosis of lung adenocarcinoma." Thoracic cancer 12.18 (2021): 2468-2477.
Li et al., "The Sequence Alignment/Map format and SAMtools." Bioinformatics 25(16) (2009): 2078-2079.
Liang et al., "Role of microRNAs in embryo implantation," Reprod Biol Endocrinol, 15:90, (2017).
Liao et al., "Molecular pathways involved in microRNA-mediated regulation of multidrug resistance." *Molecular biology reports* 45 (2018): 2913-2923.
Linsen et al., "Limitations and possibilities of small RNA digital gene expression profiling." *Nature methods* 6.7 (2009): 474-476.
Liu et al., "Excessive ovarian stimulation up-regulates the Wnt-signaling molecule DKK1 in human endometrium and may affect implantation: an in vitro co-culture study." *Human reproduction* 25.2 (2010): 479-490.
Liu et al., "Factors associated with effectiveness of treatment and reproductive outcomes in patients with thin endometrium undergoing estrogen treatment." *Chinese medical journal* 128.23 (2015): 3173-3177.
Liu et al., "MicroRNA and Embryo Implantation," Am J Reprod Immunol, 75(3):263-271, (2016).
Ma et al., "Inhibition of endometrial Tiam1/Rac1 signals induced by miR-22 up-regulation leads to the failure of embryo implantation during the implantation window in pregnant mice." Biology of Reproduction 92.6 (2015): 152-1.
Mackens et al., "Frozen embryo transfer: a review on the optimal endometrial preparation and timing." Human Reproduction 32.11 (2017): 2234-2242.
Maleki et al., "PIWI-interacting RNAs: new biomarkers for diagnosis and treatment of breast cancer." Cell & Bioscience 10.1 (2020): 44.
Margalioth et al., "Investigation and treatment of repeated implantation failure following IVF-ET." *Human reproduction* 21.12 (2006): 3036-3043.
Medenica et al., "The future is coming: artificial intelligence in the treatment of infertility could improve assisted reproduction outcomes—the value of regulatory frameworks." Diagnostics 12.12 (2022): 2979.
Mestdagh et al., "Evaluation of quantitative miRNA expression platforms in the microRNA quality control (miRQC) study." *Nature methods* 11.8 (2014): 809-815.
Minear et al., "Noninvasive prenatal genetic testing: current and emerging ethical, legal, and social issues." Annual review of genomics and human genetics 16 (2015): 369-398.
Mong et al., "Chromosome 19 microRNA cluster enhances cell reprogramming by inhibiting epithelial-to-mesenchymal transition." *Scientific reports* 10.1 (2020): 3029.
Montanari et al., "Guidelines and best practices: remarks on the Gelli-Bianco law." La clinica terapeutica 169.2 (2018): e82-e85.
Mutia et al., "microRNAs as a biomarker to predict embryo quality assessment in in vitro fertilization." International Journal of Fertility & Sterility 17.2 (2023): 85.
Navot et al., "An insight into early reproductive processes through the in vivo model of ovum donation." *The Journal of Clinical Endocrinology & Metabolism* 72.2 (1991): 408-414.
Navot et al., "Artificially induced endometrial cycles and establishment of pregnancies in the absence of ovaries." *New England Journal of Medicine* 314.13 (1986): 806-811.
Navot et al., "The window of embryo transfer and the efficiency of human conception in vitro," Fertil Steril, 55(1):114-118, (1991).
Noguer-Dance et al., "The primate-specific microRNA gene cluster (C19MC) is imprinted in the placenta." *Human molecular genetics* 19.18 (2010): 3566-3582.
Nothnick, "Non-coding RNAs in uterine development, function and disease", *Non-coding RNA and the Reproductive System*: 171-189 (2016).

Ohara et al., "Clinical relevance of a newly developed endometrial receptivity test for patients with recurrent implantation failure in Japan." Reproductive Medicine and Biology 21.1 (2022): e12444.
Ouyang et al., "Placenta-specific microRNAs in exosomes-good things come in nano-packages." *Placenta* 35 (2014): S69-S73.
Parks et al., "The impact of infertility diagnosis on embryo-endometrial dialogue." Reproduction 155.6 (2018): 543-552.
Pasquinelli et al., "Conservation of the sequence and temporal expression of let-7 heterochronic regulatory RNA," Nature, 408(6808):86-89, (2000).
Paul et al., "The role of microRNAs in human embryo implantation: a review," J Assist Reprod Genet, 36(2):179-187, (2019).
Prapas et al., "The window for embryo transfer in oocyte donation cycles depends on the duration of progesterone therapy." *Human reproduction* (Oxford, England) 13.3 (1998): 720-723.
Qin et al., "Potential role of circulating microRNAs as a biomarker for unexplained recurrent spontaneous abortion." Fertility and sterility 105.5 (2016): 1247-1254.
Raabe et al., "Biases in small RNA deep sequencing data." *Nucleic acids research* 42.3 (2014): 1414-1426.
Revel et al., "MicroRNAs are associated with human embryo implantation defects", *Human reproduction* 26.10: 2830-2840 (2011).
Riesewijk et al. "Gene expression profiling of human endometrial receptivity on days LH+ 2 versus LH+ 7 by microarray technology." *Molecular human reproduction* 9.5 (2003): 253-264.
Ruiz-Alonso et al., "The endometrial receptivity array for diagnosis and personalized embryo transfer as a treatment for patients with repeated implantation failure." *Fertility and sterility* 100.3 (2013): 818-824.
Salilew-Wondim et al., "The role of MicroRNAs in mammalian fertility: from gametogenesis to embryo implantation." International journal of molecular sciences 21.2 (2020): 585.
Schoolcraft et al., "Blastocyst culture and transfer: analysis of results and parameters affecting outcome in two in vitro fertilization programs." Fertility and sterility 72.4 (1999): 604-609.
Schriml et al., "Human Disease Ontology 2018 update: classification, content and workflow expansion," Nucleic Acids Res, 47:0955-062, (2019).
Sebastian-Leon, et al. "Asynchronous and pathological windows of implantation: two causes of recurrent implantation failure." *Human reproduction* 33.4 (2018): 626-635.
Sha et al., "Genome-wide identification of micro-ribonucleic acids associated with human endometrial receptivity in natural and stimulated cycles by deep sequencing", *Fertility and sterility* 96.1: 150-155 (2011).
Shannon et al., "Cytoscape: a software environment for integrated models of biomolecular interaction networks." *Genome research* 13.11 (2003): 2498-2504.
Shekibi et al., "MicroRNAs in the regulation of endometrial receptivity for embryo implantation", *International journal of molecular sciences* 23(11): 6210 (2022).
Shi et al., "Endometrial MicroRNA Signature during the Window of Implantation Changed in Patients with Repeated Implantation Failure," Chin Med J (Engl), 130(5):566-573 (2017).
Simón et al., "A 5-year multicentre randomized controlled trial comparing personalized, frozen and fresh blastocyst transfer in IVF." Reproductive BioMedicine Online 41.3 (2020): 402-415.
Singh et al., "Bridging endometrial receptivity and implantation: network of hormones, cytokines, and growth factors." *The Journal of endocrinology* 210.1 (2011): 5-14.
Sun et al., "An adaptive k-nearest neighbor algorithm." 2010 seventh international conference on fuzzy systems and knowledge discovery. vol. 1. IEEE, 2010.
Tan et al., "Investigation and current management of recurrent IVF treatment failure in the UK." *BJOG: An International Journal of Obstetrics & Gynaecology* 112.6 (2005): 773-780.
Tribolet et al., "MicroRNA biomarkers for infectious diseases: from basic research to biosensing." Frontiers in Microbiology 11 (2020): 1197.
Vanhie et al., "Plasma miRNAs as biomarkers for endometriosis." Human Reproduction 34.9 (2019): 1650-1660.

(56) References Cited

OTHER PUBLICATIONS

Vervaeke et al., "Regulatory guidelines and preclinical tools to study the biodistribution of RNA therapeutics." Advanced Drug Delivery Reviews 184 (2022): 114236.
Vilella et al., "Hsa-miR-30d, secreted by the human endometrium, is taken up by the pre-implantation embryo and might modify its transcriptome," Development, 142(18) :3210-3221, (2015).
Wang et al., "Circulating microRNAs as potential cancer biomarkers: the advantage and disadvantage." Clinical epigenetics 10 (2018): 1-10.
Wang et al., "Ethical, legal and social implications of prenatal and preimplantation genetic testing for cancer susceptibility." Reproductive biomedicine online 19 (2009): 23-33.
Wang et al., "Large scale real-time PCR validation on gene expression measurements from two commercial long-oligonucleotide microarrays," BMC Genomics, 2006, 7:59-75.
Wang et al., "MicroRNA profiles in spontaneous decidualized menstrual endometrium and early pregnancy decidua with successfully implanted embryos." PLoS One 11.1 (2016): e0143116.
Whitby et al., "The endometrial polarity paradox: differential regulation of polarity within secretory-phase human endometrium." *Endocrinology* 159.1 (2018): 506-518.
Wightman et al., "Posttranscriptional regulation of the heterochronic gene lin-14 by lin-4 mediates temporal pattern formation in C. elegans," Cell, 75(5):855-862, (1993).
Wong et al., "miRDB: an online resource for microRNA target prediction and functional annotations." *Nucleic acids research* 43.D1 (2015): D146-D152.
Xu et al., "MicroRNA expression profiling in endometriosis-associated infertility and its relationship with endometrial receptivity evaluated by ultrasound", *Journal of X-ray Science and Technology* 25.3: 523-532 (2017).
Yan et al., "miR-21 reverses impaired decidualization through modulation of KLF12 and NR4A1 expression in human endometrial stromal cells." Biology of Reproduction 100.5 (2019): 1395-1405.
Yuan et al., "Progesterone-induced miR-145/miR-143 inhibits the proliferation of endometrial epithelial cells." Reproductive Sciences 26.2 (2019): 233-243.
Zeng et al., "MicroRNA signatures in plasma and plasma exosome during window of implantation for implantation failure following in-vitro fertilization and embryo transfer." Reproductive Biology and Endocrinology 19 (2021): 1-14.
Zheng et al., "MicroRNA-200c impairs uterine receptivity formation by targeting FUT4 and a1,3-fucosylation," Cell Death Differ, 2017, 24(12):2161-2172.
Zhou et al., "miRNAS in cardiovascular diseases: potential biomarkers, therapeutic targets and challenges." Acta Pharmacologica Sinica 39.7 (2018): 1073-1084.
Zou et al., "Regularization and variable selection via the elastic net," J. R. Statist. Soc. B, 67, part 2, 301-320, (2005).
International Search Report and Written Opinion for International Application No. PCT/CN2024/077981 dated May 21, 2024.
Ora Consent Form, Inti Labs (Jun. 19, 2023): 2 pages.
Yang, "miRNA Technology Underpinning ORA," Inti Labs, Aspire 2023 (Sep. 7, 2023): 34 pages.
Bolstad, "preprocessCore: A collection of pre-processing functions," version 3.19 retrieved Sep. 17, 2024 from https://bioconductor.org/packages/release/bioc/html/preprocessCore.html.
"Office Action of Taiwan Counterpart Application", issued on Apr. 1, 2025, p. 1-p. 13.

\* cited by examiner

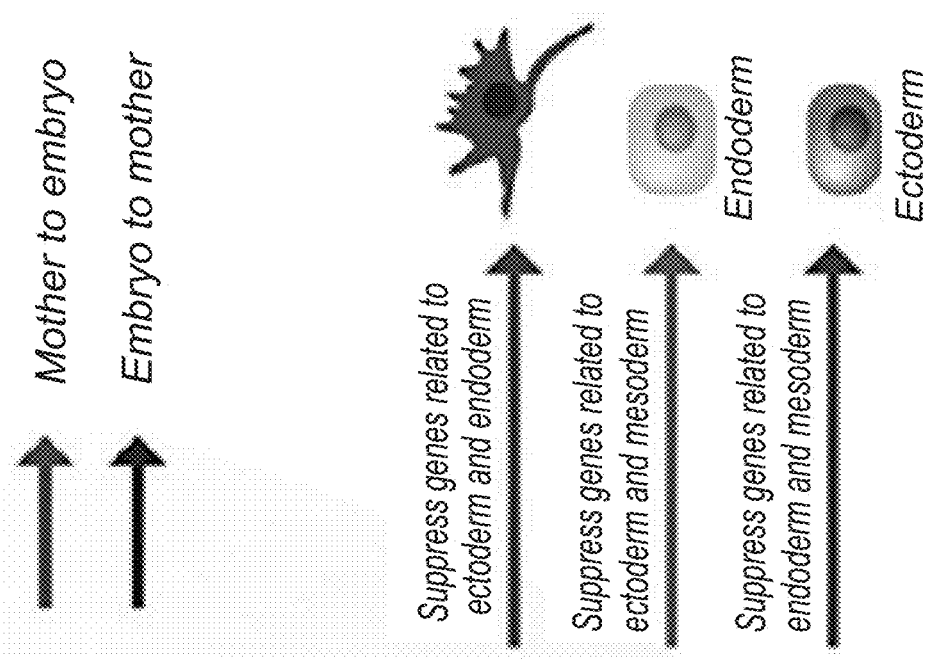
FIG. 12 - Con't

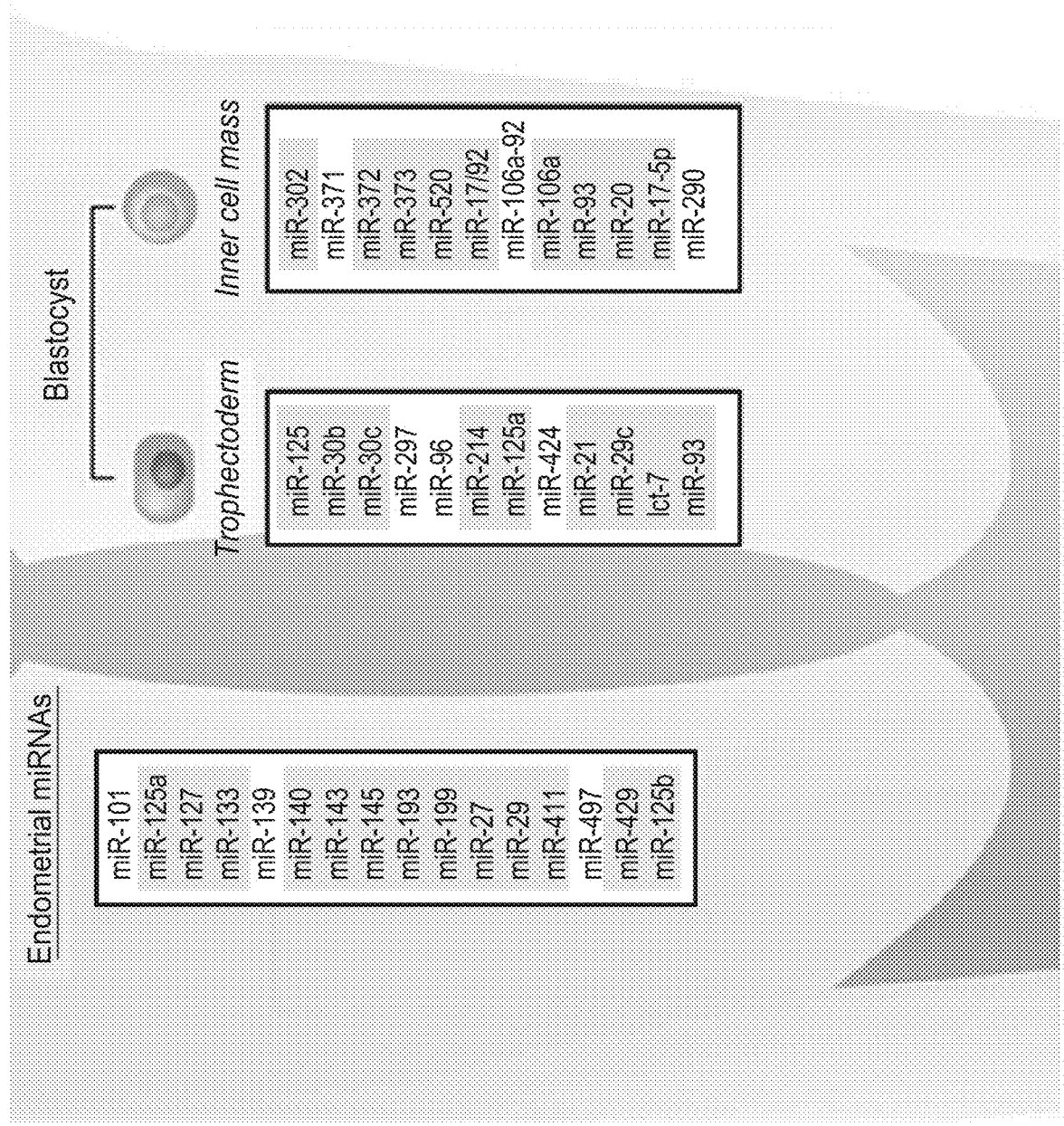
FIG. 12 - Con't

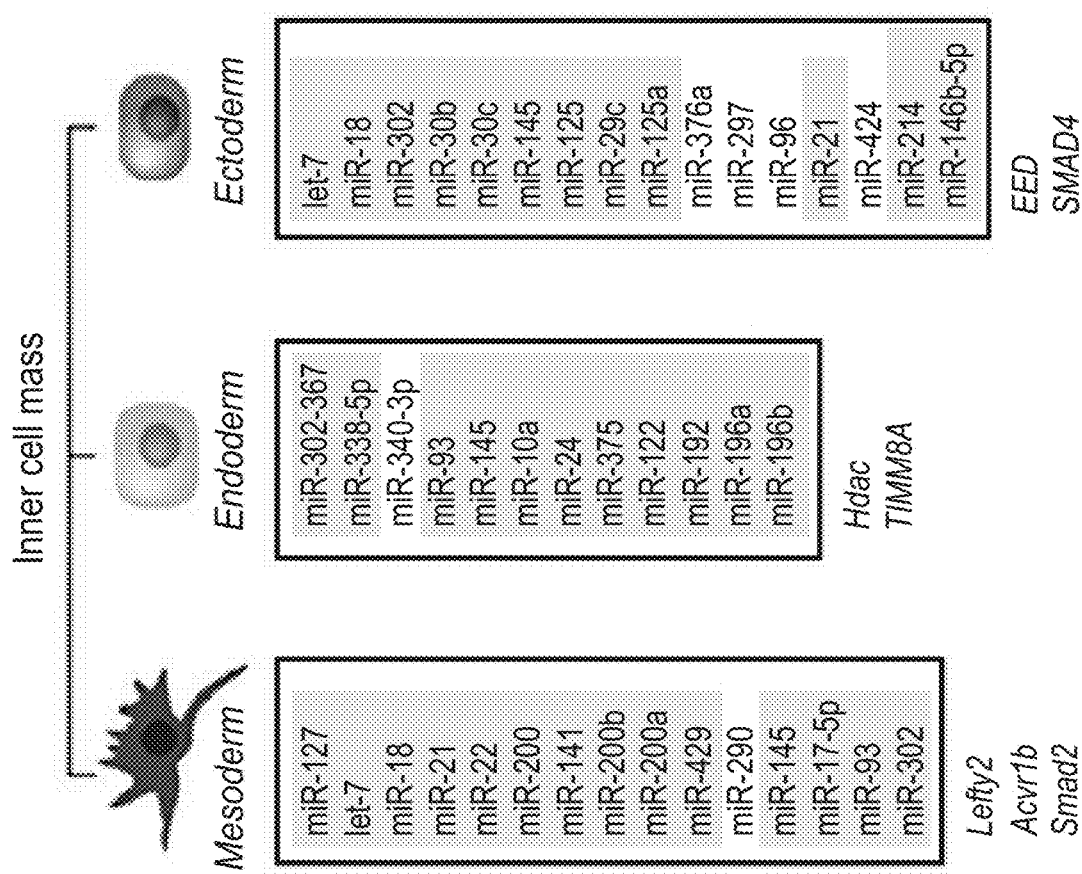
FIG. 12 - Con't

ASSAYS AND METHODS TO ASSIST IN VITRO FERTILIZATION

CROSS-RELATED APPLICATIONS

This application claims the benefit of U.S. Provisional Patent Application Ser. No. 63/507,444 filed Jun. 9, 2023, and U.S. Provisional Patent Application Ser. No. 63/613,056, filed Dec. 20, 2023. The entire contents of each of which is incorporated herein by this reference.

FIELD

The disclosure relates to methods for determining the endometrial receptivity of a subject using (a) blood plasma (b) a microRNA (miRNA) expression profile comprising expression levels of a plurality of miRNAs, for example, 281 miRNAs, and (c) a computer-based method that classifies the endometrial status of the subject based on the miRNA expression profile. Aspects of the disclosure further relate to kits suitable for performing the methods, as well as uses of the kits for diagnostic and therapeutic purposes. In some embodiments, the methods and/or kits are used to classify a subject's responsiveness to an in vitro fertilization (IVF) treatment.

BACKGROUND

Assisted reproductive technologies, including IVF, emerged as potential approaches to address a lack of reproductive success. A major factor in the success rates of IVF is the receptive state of the endometrium. An endometrium is receptive only for a relatively short period referred to as window of implantation (WOI). This usually occurs around days 19-21 of the menstrual cycle. There is a longstanding need for monitoring the status of the endometrium not only based on the calendar approach, which tends to be unreliable, but also through non-invasive means, which would indicate the opportunity for embryo implantation in a more reliable way.

Human endometrium is a tissue cyclically regulated by both proteins and miRNAs. Extracellular vesicles can transport miRNA to communicate cellular processes to other cell types. The human genome comprises more than 2500 miRNAs, some of which have been shown to play roles in reproductive cycles. For example, recent literature demonstrated that certain miRNAs regulate the expression of genes involved in the establishment and progression of WOI. Gene expression can be downregulated by certain miRNAs in endometrial epithelial cells ultimately leading to inhibition of endometrial secretion during the secretory phase. Traditionally, histological and imaging methods were used to assess the status of the endometrium. However, it was long recognized that they are time consuming and often cannot clearly distinguish between the receptive and non-receptive states of the endometrium.

Thus, there remains a need for improved methods of determining endometrial receptivity that require less tissue input and/or provide more reliable determination of the receptive or non-receptive status of the endometrium in a subject.

SUMMARY

In some aspects, the disclosure provides a method of determining the endometrial state of a subject in need thereof, the method comprising (a) obtaining a sample from a subject or using a sample obtained from a subject;
(b) determining a microRNA (miRNA) expression profile in the sample;
(c) inputting the miRNA expression profile from step (b) into computer-based method to generate a report; and
(d) determining the endometrial state of the subject based on the report.

In some embodiments of any of the foregoing or related aspects, the endometrial state is pre-receptive, receptive, or post-receptive. In some embodiments, when the endometrial state is receptive the subject is receptive to embryo transfer. In some embodiments, when the endometrial state is pre-receptive the subject is receptive to embryo transfer about 24 hours after the sample was obtained from the subject. In some embodiments, when the endometrial state is post-receptive the subject has passed the window of implantation. In some embodiments, when the endometrial state is post-receptive the subject has passed the receptive state.

In some embodiments of any of the foregoing or related aspects, the subject is receptive to embryo transfer about 24 hours before the sample was obtained from the subject. In some embodiments, the subject is receptive to embryo transfer about 12 hours before the sample was obtained from the subject.

In some embodiments of any of the foregoing or related aspects, the subject is infertile.

In some embodiments of any of the foregoing or related aspects, the subject has a history of implantation failure, few remaining high quality embryos, a lower or higher than normal BMI, is overweight, and/or is underweight.

In some embodiments of any of the foregoing or related aspects, the subject is undergoing in vitro fertilization. In some embodiments, the subject is undergoing infertility treatments. In some embodiments, the subject is undergoing assisted reproductive technology treatment.

In some aspects, the disclosure provides a method of determining a time period when a subject is receptive to embryo transfer, the method comprising (a) obtaining a sample from a subject or using a sample obtained from a subject;
(b) determining a microRNA (miRNA) expression profile in the sample;
(c) inputting the miRNA expression profile from step (b) into a computer-based method to generate a report; and
(d) identifying the endometrial state of the subject based on the report;
(e) determining the time period when the subject is receptive to embryo transfer based on the endometrial state of the subject.

In some embodiments of any of the foregoing or related aspects, the endometrial state is pre-receptive, receptive, or post-receptive. In some embodiments, when the endometrial state is receptive the subject is receptive to embryo transfer.

In some embodiments of any of the foregoing or related aspects, the method comprises transferring an embryo to the subject.

In some embodiments of any of the foregoing or related aspects, when the endometrial state is pre-receptive the subject is receptive to embryo transfer about 24 hours after the sample was obtained from the subject. In some embodiments, the method comprises transferring an embryo to the subject about 24 hours after the blood sample was obtained from the subject.

In some embodiments of any of the foregoing or related aspects, when the endometrial state is post-receptive the subject has passed the window of implantation. In some embodiments of any of the foregoing or related aspects, when the endometrial state is post-receptive the subject has passed the receptive state.

In some embodiments of any of the foregoing or related aspects, the subject is receptive to embryo transfer about 24 hours before the sample was obtained from the subject. In some embodiments, the subject is receptive to embryo transfer about 12 hours before the sample was obtained from the subject.

In some embodiments of any of the foregoing or related aspects, the method is performed during a first menstrual cycle. In some embodiments of any of the foregoing or related aspects, the method is repeated during the subject's next menstrual cycle. In some embodiments, the method is repeated in a subsequent menstrual cycle. In some embodiments, a subsequent menstrual cycle is a second, third, fourth, fifth, sixth, seventh, eighth, ninth, tenth, eleventh, twelfth, or further menstrual cycle after the first menstrual cycle. In some embodiments, a subsequent menstrual cycle is the second menstrual cycle after the first menstrual cycle. In some embodiments, a subsequent menstrual cycle is the third menstrual cycle after the first menstrual cycle. In some embodiments, a subsequent menstrual cycle is the fourth menstrual cycle after the first menstrual cycle. In some embodiments, a subsequent menstrual cycle is the fifth menstrual cycle after the first menstrual cycle. In some embodiments, a subsequent menstrual cycle the a sixth menstrual cycle after the first menstrual cycle. In some embodiments, a subsequent menstrual cycle is the seventh menstrual cycle after the first menstrual cycle. In some embodiments, a subsequent menstrual cycle is the eighth menstrual cycle after the first menstrual cycle. In some embodiments, a subsequent menstrual cycle is the ninth menstrual cycle after the first menstrual cycle. In some embodiments, a subsequent menstrual cycle is the tenth menstrual cycle after the first menstrual cycle. In some embodiments, a subsequent menstrual cycle is the eleventh menstrual cycle after the first menstrual cycle. In some embodiments, a subsequent menstrual cycle is the twelfth menstrual cycle after the first menstrual cycle.

In some embodiments of any of the foregoing or related aspects, the method comprises transferring an embryo to the subject during the subject's next menstrual cycle, wherein the embryo is transferred during the time period identified during the previous menstrual cycle as the time period when the subject is receptive to embryo transfer. In some embodiments of any of the foregoing or related aspects, the method comprises transferring an embryo to the subject during a subsequent menstrual cycle in the subject, wherein the embryo is transferred during the time period identified during the first menstrual cycle as the time period when the subject is receptive to embryo transfer.

In some embodiments of any of the foregoing or related aspects, the sample is obtained about 5 days after starting progesterone administration during an assisted reproductive technology treatment cycle. In some embodiments, the sample is obtained about 7 days after an LH surge is detected in the subject. In some embodiments, the sample is obtained about 7 days after hCG administration to the subject. In some embodiments, the sample is obtained about 4 days and about 5 days after starting progesterone administration during an assisted reproductive technology treatment cycle. In some embodiments, the sample is obtained about 6 days and about 7 days after an LH surge is detected in the subject. In some embodiments, wherein the sample is obtained about 6 days and about 7 days after hCG administration to the subject.

In some embodiments of any of the foregoing or related aspects, the sample is a blood sample. In some embodiments, the sample is a plasma sample.

In some embodiments of any of the foregoing or related aspects, the subject is a human. In some embodiments, the subject is a human female.

In some embodiments of any of the foregoing or related aspects, the subject is age 21-45. In some embodiments, the subject is age 35 or older.

In some embodiments of any of the foregoing or related aspects, the subject is undergoing assisted reproductive technology treatment.

In some aspects, the disclosure provides a kit for determining the endometrial state of a subject.

In some aspects, the disclosure provides a method comprising:
  obtaining a blood sample of a patient in an in vitro fertilization (IVF) implantation cycle, the blood sample drawn from the patient before and on the day of an embryo transfer for the IVF implantation cycle;
  determining, based on a machine-learning model trained to determine an endometrium status based on miRNA expression profile data from the blood sample, a predicted endometrium status of the patient at the time of the embryo transfer based on an miRNA expression profile from the blood sample;
  generating a predicted embryo transfer date based on the predicted endometrium status; and
  administering a subsequent IVF cycle on the patient by performing an embryo transfer on the predicted embryo transfer date.

In some aspects, the disclosure provides a method comprising:
  obtaining a blood sample of a patient in an in vitro fertilization (IVF) cycle, the blood sample drawn from the patient before and on the day of an embryo transfer for the IVF cycle;
  determining, based on a machine-learning model trained to determine an endometrium status based on miRNA expression profile data from the blood sample, a predicted endometrium status of the patient at the time of the embryo transfer based on an miRNA expression profile from the blood sample;
  generating a predicted embryo transfer date based on the predicted endometrium status; and
  administering a subsequent IVF cycle on the patient by performing an embryo transfer on the predicted embryo transfer date.

In some embodiments of any of the foregoing or related aspects, the blood sample is drawn prior to embryo transfer.

In some embodiments of any of the foregoing or related aspects, the method comprises storing the blood sample, wherein storing the blood sample preserves the later extraction and sequencing of miRNA.

In some embodiments of any of the foregoing or related aspects, the embryo transfer is a fresh embryo transfer. In some embodiments of any of the foregoing or related aspects, the embryo transfer is a frozen embryo transfer (FET).

In some embodiments of any of the foregoing or related aspects, the method comprises administering a pregnancy test to the patient, and upon the pregnancy test being negative:
  retrieving the blood sample from storage;
  sequencing the blood sample for miRNA, thereby providing the miRNA expression profile.

In some embodiments of any of the foregoing or related aspects, the method comprises administering a pregnancy test to the patient, and upon the pregnancy test being negative, sequencing the blood sample for miRNA, thereby providing the miRNA expression profile.

In some aspects, the disclosure provides a method comprising:
  determining endometrial status data for a plurality of patients, the endometrial status data retrieved from at least one of endometrium samples and pregnancy outcomes;
  associating respective miRNA expression profiles from the plurality of patients with endometrial status data, each miRNA expression profile of a respective patient being associated with an endometrial status of the respective patient; and
  training a machine-learning model based on the associated miRNA expression profiles and associated endometrial status data, the trained machine-learning model trained to output a predicted endometrial status based on an inputted miRNA expression profile.

In some embodiments of any of the foregoing or related aspects, the endometrial status is at least one of PRE, WOI, and POST. In some embodiments of any of the foregoing or related aspects, the endometrial status is at least one of pre-receptive, receptive, and post-receptive. In some embodiments of any of the foregoing or related aspects, the endometrial status is pre-receptive. In some embodiments of any of the foregoing or related aspects, the endometrial status is receptive. In some embodiments of any of the foregoing or related aspects, the endometrial status is post-receptive.

In some embodiments of any of the foregoing or related aspects, the machine-learning model is a plurality of machine-learning models, and each of the machine-learning model generates a prediction of one or more of PRE, WOI, and POST. In some embodiments of any of the foregoing or related aspects, the machine-learning model is a plurality of machine-learning models, and each of the machine-learning model generates a prediction of one or more of pre-receptive, receptive, and post-receptive.

In some embodiments of any of the foregoing or related aspects, the model further associates one or more of age of the respective patient, body mass index (BMI) of the patient, pregnancy history of the patient, and implantation failure of the patient with the endometrial status of the patient, such that input data of age of the respective patient, body mass index (BMI) of the patient, pregnancy history of the patient, and implantation failure of the patient can be input to the machine-learning model in addition to the miRNA expression profile.

In some embodiments of any of the foregoing or related aspects, the machine-learning is trained on a server in a network, the server accessible to a patient or clinician for upload of the miRNA expression data.

In some aspects, the disclosure provides a method comprising:
  receiving, at a machine-learning model in a networked server, a digital representation of an miRNA expression profile of a patient, the miRNA expression profile being determined by sequencing of a blood sample of the patient; and
  processing, at the machine-learning model, the miRNA expression profile, the machine-learning model trained to output a predicted endometrial status based on an inputted miRNA expression profile, said processing resulting in a predicted endometrial status of the patient based on the provided digital representation of the miRNA expression profile.

In some embodiments of any of the foregoing or related aspects, the machine-learning model is further trained to receive input data of age of the respective patient, body mass index (BMI) of the patient, pregnancy history of the patient, and implantation failure of the patient and predict the endometrial status of the patient based on the received input data, the method further comprising:
  receiving the input data of age of the respective patient, body mass index (BMI) of the patient, pregnancy history of the patient, and implantation failure of the patient, such that the machine-learning model outputs the predicted endometrial status based on the input data in addition to the miRNA expression profile.

In some embodiments of any of the foregoing or related aspects, the trained machine learning model is trained based on a plurality of miRNA expression profiles, each miRNA expression profile determined from a sample of a given patient of a plurality of patients and each miRNA expression profile associated with a known endometrial status of the given patient, such that the trained machine-learning model is trained to output the endometrial state of a patient separate from the plurality of patients based on an miRNA expression profile determined from the sample of the patient separate from the plurality of patients.

In some embodiments of any of the foregoing or related aspects, the machine-learning model is a classifier.

DETAILED DESCRIPTION

Figure 1A:
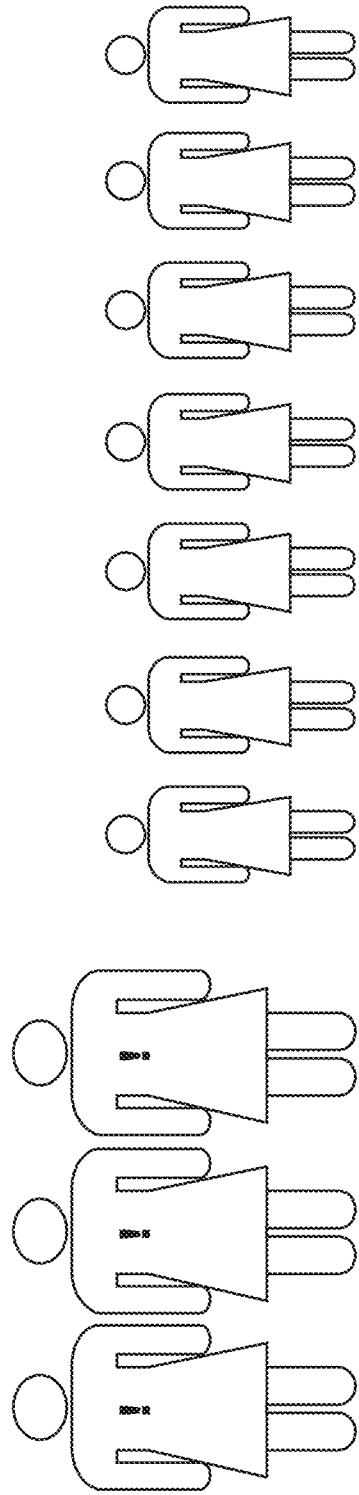
FIG. 1A provides a diagram demonstrating approximately 30 percent of infertile women have a displaced window of implantation (WOI).

The disclosures and embodiments set forth herein are to be construed as exemplary only and not as limiting the scope of the invention. Although specific terms are employed herein, unless otherwise noted, they are used in a generic and descriptive sense only and not for purposes of limitation.

Definitions

As used herein, the singular forms "a," "an," and "the" are intended to include the plural forms as well, unless the context clearly indicates otherwise.

The term "cDNA" refers to complementary DNA generated by performing reverse transcription on an RNA preparation using a reverse transcriptase. In some embodiments, the RNA preparation contains miRNAs extracted from an endometrial tissue sample.

The term "expression" refers to the transcription and/or accumulation of RNA molecules in a biological sample, for example, an endometrial tissue sample from a subject. In this context, the term "miRNA expression" refers to the amount of one or more miRNAs in a biological sample, and the miRNA expression can be detected by using suitable methods known in the art.

The term "implantation" as used herein refers to the stage of pregnancy at which the embryo adheres to the wall of the uterus.

The term "in vitro fertilization" or "IVF" has been previously defined, and it refers to a process by which oocytes are fertilized by sperm outside of the body, in vitro. IVF is a major treatment in infertility when in vivo conception has failed. The present method may also be performed when the fertilization takes place by "intracytoplasmic sperm injection" or "ICSI", which refers to an in vitro fertilization procedure in which a single sperm is injected directly into an oocyte. This procedure is most commonly used to overcome male infertility factors, although it may also be used where oocytes cannot easily be penetrated by sperm, and occasionally as a method of in vitro fertilization in a number of conditions (poor response, unknown infertility, endometriosis). In some embodiments, IVF includes fresh embryo transfer. In some embodiments, IVF includes frozen embryo transfer (FET).

In some embodiments, the window of implantation (WOI) is estimated based on a regular menstrual pattern. In some embodiments, the window of implantation occurs approximately 7 days before the expected first day of the menstrual period. For example, in some embodiments, the window of implantation corresponds to days 19-21 of an ideal menstrual cycle of 28 days in humans. In some embodiments, the window of implantation corresponds to days 19-23 of a menstrual cycle of 28 days in humans. Similar cycles have been disclosed in other mammals, so that the method of the invention could be adapted to any mammalian female.

The term "microRNA" or "miRNA" are used here interchangeably and refer to a class of approximately 18 to 25 nucleotide long non-coding RNA derived from an endogenous gene. miRNAs function as post-transcriptional regulators of gene expression by base pairing to the 3' untranslated regions (UTR) of their target mRNAs for mRNA degradation or translation inhibition. In some embodiments, the miRNA is cell-free miRNA in blood.

The terms "nucleic acid," "nucleotide" and "polynucleotide" are used interchangeably and refer to a polymer of DNA or RNA in either single or double stranded form. Unless otherwise noted, these terms encompass polynucleotides containing known analogues of natural nucleotides that have similar binding properties as the reference nucleic acid and are metabolized in a manner similar to naturally occurring nucleotides.

The term "primer" refers to an oligonucleotide which acts to initiate synthesis of a complementary nucleic acid strand when placed under conditions in which synthesis of a primer extension product is induced, e.g., in the presence of nucleotides and a polymerization-inducing agent such as a DNA or RNA polymerase and at a suitable temperature, pH, metal ion concentration, and salt concentration.

The term "probe" refers to a structure comprising a polynucleotide, which contains a nucleic acid sequence complementary to a nucleic acid sequence present in the target nucleic acid analyte (e.g., a nucleic acid amplification product). The polynucleotide regions of probes may be composed of DNA, and/or RNA, and/or synthetic nucleotide analogs. Probes are generally of a length compatible with their use in specific detection of all or a portion of a target sequence of a target nucleic acid.

The term "targeting" refers to the selection of suitable nucleotide sequences that hybridize to a nucleic acid sequence of interest.

The term "window of implantation" refers to a self-limited period of endometrial receptivity spanning between days 19 and 23 of the menstrual cycle (women) in which there is crosstalk between a receptive endometrium and a functional blastocyst. In some embodiments, the window of implantation occurs at about day 19 of the menstrual cycle to about day 21 of the menstrual cycle. In some embodiments, the window of implantation occurs at about day 19 of the menstrual cycle to about day 23 of the menstrual cycle. In some embodiments, the window of implantation occurs before day 19. In some embodiments, the window of implantation occurs after day 23. The terms "window of implantation", "WOI", "receptive," "receptive state," and "receptive stage" are used interchangeably herein. In normal menstrual cycles this is achieved through the local effects of ovarian estrogens and progesterone, which induce a series of cellular and molecular events in the endometrium leading to appropriate endometrial receptivity.

Overview of the Methods for Determining Endometrial Status

Methods based on the examination of gene expression levels have been developed. Early studies focused on a few marker genes. Igenomix developed an "Endometrial Receptivity Analysis" (ERA) test, relying on a microarray of specific 238 genes involved in endometrial receptivity. However, microarray-based ERA test has certain drawbacks. For example, it is known that microarray-based gene expression measurements require significant amounts of tissue samples. In addition, microarray technology generally has lower specificity as compared to quantitative polymerase chain reaction (qPCR) technology. Next-generation sequencing (NGS)-based ERA test is only emerging. Other known methods require invasive biopsies which are costly and time consuming (Table 1).

In some embodiments, the present disclosure provides non-invasive methods for determining endometrial receptivity. Endometrial receptivity is the state in which a subject's endometrium is prepared for embryo implantation. This occurs in all menstrual cycles in a time period referred to as the window of implantation (WOI). In a natural cycle, ovulation occurs after the LH surge, and the WOI is around seven days after the LH surge (LH+7). In a hormone replacement therapy (HRT) cycle, the WOI is around five days after a progesterone administration (P+5). These estimates give probable information on endometrial receptivity. However, the ultimate answer for the endometrium status is generally determined by examination of the endometrium itself.

An endometrial sample can be collected from the uterine cavity of a women either five days after a progesterone administration (P+5) in a hormone replacement therapy cycle or seven days after an endogenous LH surge (LH+7) in a natural cycle. The sample is then subject to a molecular diagnostic tool that analyzes the endometrial receptivity status. In some embodiments, the methods of determining an endometrial status according to this disclosure, the molecular diagnostic tool analyzes the miRNA expression profile of a blood plasma sample. In some embodiments, the endometrial status determined by the blood plasma sample is validated relative to an endometrial sample.

The present disclosure provides methods of determining an endometrial status, comprising: (a) performing an assay on a blood plasma sample to determine a miRNA expression profile in the blood, wherein the miRNA expression profile comprises expression levels of a plurality of miRNAs, for example, the miRNAs in Table 7; and (b) analyzing the miRNA expression profile with an a computer-based machine-learning model to obtain a receptivity predictive score, wherein the receptivity predictive score classifies the endometrial status into a pre-receptive state, a receptive state, or a post-receptive state. In some embodiments, the receptivity predictive score is a probability of each endometrial status. In some embodiments, the receptivity predictive score is used internally to predict a most likely endometrial status by selecting the endometrial status with the highest receptivity predictive score (e.g., probability).

The pre-receptive state indicates that the endometrium is not yet ready to receive the embryo and embryo implantation at the time of sample collection may be too early. The receptive state indicates that the endometrium is at an optimal time for embryo implantation at the same time the sample was collected. The post-receptive state indicates that the endometrium already passed the optimal stage for embryo implantation.

In some embodiments, the pre-receptive state indicates the endometrium is not yet ready to receive the embryo about 5 days after progesterone administration. In some embodiments, the pre-receptive state indicates the endometrium is not yet ready to receive the embryo about seven days after an endogenous LH surge (LH+7). In some embodiments, the receptive state indicates the endometrium is at an optimal time for embryo implantation about 5 days after progesterone administration. In some embodiments, the receptive state indicates the endometrium is at an optimal time for embryo implantation about seven days after an endogenous LH surge (LH+7). In some embodiments, the post-receptive state indicates the endometrium is already passed the optimal stage for the embryo about 5 days after progesterone administration. In some embodiments, the post-receptive state indicates the endometrium is already passed the optimal stage for the embryo about seven days after an endogenous LH surge (LH+7).

Subjects

In some embodiments, the subject is a mammal. In some embodiments, the subject is a human. In some embodiments, the subject a mammalian female. The term "mammalian" includes any mammal, for example, humans and non-human primates, cattle, goat, sheep, horses, pigs, dogs, etc. In some embodiments, the mammalian female is a human female or non-human primate. In some embodiments, the mammalian female is a woman (i.e., a human female).

In some embodiments, the subject is 18 to 65 years old. In some embodiments, the subject is 18 to 50 years old. In some embodiments, the subject is 18 to 45 years old. In some embodiments, the subject is 18 to 40 years old. In some embodiments, the subject is 18 to 35 years old. In some embodiments, the subject is 18 to 30 years old. In some embodiments, the subject is 18 to 30 years old. In some embodiments, the subject is 21 to 45 years old. In some embodiments, the subject is 21 to 38 years old. In some embodiments the subject is at least 35 years old. In some embodiments, the subject is at least 36 years old. In some embodiments, the subject is at least 37 years old. In some embodiments, the subject is at least 38 years old. In some embodiments, the subject is at least 39 years old. In some embodiments, the subject is at least 40 years old.

In some embodiments, the subject is 18 years old. In some embodiments, the subject is 19 years old. In some embodiments, the subject is 20 years old. In some embodiments, the subject is 21 years old. In some embodiments, the subject is 22 years old. In some embodiments, the subject is 23 years old. In some embodiments, the subject is 24 years old. In some embodiments, the subject is 25 years old. In some embodiments, the subject is 26 years old. In some embodiments, the subject is 27 years old. In some embodiments, the subject is 28 years old. In some embodiments, the subject is 29 years old. In some embodiments, the subject is 30 years old. In some embodiments, the subject is 31 years old. In some embodiments, the subject is 32 years old. In some embodiments, the subject is 33 years old. In some embodiments, the subject is 34 years old. In some embodiments, the subject is 35 years old. In some embodiments, the subject is 36 years old. In some embodiments, the subject is 37 years old. In some embodiments, the subject is 38 years old. In some embodiments, the subject is 39 years old. In some embodiments, the subject is 40 years old. In some embodiments, the subject is 41 years old. In some embodiments, the subject is 42 years old. In some embodiments, the subject is 43 years old. In some embodiments, the subject is 44 years old. In some embodiments, the subject is 45 years old. In some embodiments, the subject is 46 years old. In some embodiments, the subject is 47 years old. In some embodiments, the subject is 48 years old. In some embodiments, the subject is 49 years old. In some embodiments, the subject is 50 years old.

In some embodiments, the subject is about 18 years old. In some embodiments, the subject is about 19 years old. In some embodiments, the subject is about 20 years old. In some embodiments, the subject is about 21 years old. In some embodiments, the subject is about 22 years old. In some embodiments, the subject is about 23 years old. In some embodiments, the subject is about 24 years old. In some embodiments, the subject is about 25 years old. In some embodiments, the subject is about 26 years old. In some embodiments, the subject is about 27 years old. In some embodiments, the subject is about 28 years old. In some embodiments, the subject is about 29 years old. In some embodiments, the subject is about 30 years old. In some embodiments, the subject is about 31 years old. In some embodiments, the subject is about 32 years old. In some embodiments, the subject is about 33 years old. In some embodiments, the subject is about 34 years old. In some embodiments, the subject is about 35 years old. In some embodiments, the subject is about 36 years old. In some embodiments, the subject is about 37 years old. In some embodiments, the subject is about 38 years old. In some embodiments, the subject is about 39 years old. In some embodiments, the subject is about 40 years old. In some embodiments, the subject is about 41 years old. In some embodiments, the subject is about 42 years old. In some embodiments, the subject is about 43 years old. In some embodiments, the subject is about 44 years old. In some embodiments, the subject is about 45 years old. In some embodiments, the subject is about 46 years old. In some embodiments, the subject is about 47 years old. In some embodiments, the subject is about 48 years old. In some embodiments, the subject is about 49 years old. In some embodiments, the subject is about 50 years old.

In some embodiments, the subject has a BMI of about 18 to about 30. In some embodiments, the subject has a BMI of about 18.5 to about 30. In some embodiments, the subject has a BMI of about 18.5 to about 24.9. In some embodiments, the subject has a BMI of about 18.5 to about 25. In some embodiments, the subject has a BMI of about 25 to about 29.9. In some embodiments, the subject has a BMI of about 25 to about 30. In some embodiments, the subject has a BMI of greater than 18.5. In some embodiments, the subject has a BMI of greater than 19. In some embodiments, the subject has a BMI of greater than 20. In some embodiments, the subject has a BMI of greater than 21. In some embodiments, the subject has a BMI of greater than 22. In some embodiments, the subject has a BMI of greater than 23. In some embodiments, the subject has a BMI of greater than 24. In some embodiments, the subject has a BMI of greater than 25. In some embodiments, the subject has a BMI of greater than 26. In some embodiments, the subject has a BMI of greater than 27. In some embodiments, the subject has a BMI of greater than 28. In some embodiments, the subject has a BMI of greater than 29. In some embodiments, the subject has a BMI of greater than 30. In some embodiments, the subject has a BMI of greater than 31. In some embodiments, the subject has a BMI of greater than 32. In some embodiments, the subject has a BMI of greater than 33. In some embodiments, the subject has a BMI of greater than 34.

In some embodiments, the subject has a BMI of about 18.5. In some embodiments, the subject has a BMI of about 19. In some embodiments, the subject has a BMI of about 20. In some embodiments, the subject has a BMI of about 21. In some embodiments, the subject has a BMI of about 22. In some embodiments, the subject has a BMI of about 23. In some embodiments, the subject has a BMI of about 24. In some embodiments, the subject has a BMI of about 25. In some embodiments, the subject has a BMI of about 26. In some embodiments, the subject has a BMI of about 27. In some embodiments, the subject has a BMI of about 28. In some embodiments, the subject has a BMI of about 29. In some embodiments, the subject has a BMI of about 30. In some embodiments, the subject has a BMI of about 31. In some embodiments, the subject has a BMI of about 32. In some embodiments, the subject has a BMI of about 33. In some embodiments, the subject has a BMI of about 34.

In some embodiments, the subject is overweight. In some embodiments, the subject is underweight.

In some embodiments, the subject has a consistent menstrual cycle. In some embodiments, the subject has an irregular menstrual cycle.

In some embodiments, the subject has recurrent implantation failure (RIF). In some embodiments, recurrent implantation failure is failure of about two to about four in vitro fertilization (IVF) attempts. In some embodiments, recurrent implantation failure is failure of at least two in vitro fertilization (IVF) attempts. In some embodiments, recurrent implantation failure is failure of at least three in vitro fertilization (IVF) attempts. In some embodiments, recurrent implantation failure is failure of at least four in vitro fertilization (IVF) attempts.

In some embodiments, the subject does not have an ovulatory disorder. In some embodiments, the subject does not have one or more of endometriosis, myoma, polyps, and hydrosalpinx. In some embodiments, the subject does not have endometriosis. In some embodiments, the subject does not have myomas. In some embodiments, the subject does not have polyps. In some embodiments, the subject does not have hydrosalpinx.

In some embodiments, the subject has an ovulatory disorder. In some embodiments, the subject has one or more of endometriosis, myoma, polyps, and hydrosalpinx. In some embodiments, the subject has endometriosis. In some embodiments, the subject has myomas. In some embodiments, the subject has polyps. In some embodiments, the subject has hydrosalpinx.

In some embodiments the subject has at least one average grade embryo. Grading of embryo's is a method known to those of skill in the art. Embryo's may be graded as good-quality (i.e., high-quality), fair-quality, and poor-quality. In some embodiments, Embryo grading is based, at least in part on the number of cells in the embryo and the appearance of the cells. In some embodiments, a good-quality embryo has many cells which are tightly packed. In some embodiments, an average-quality embryo has cells which are not tightly packed. In some embodiments, a poor-quality embryo has few cells, and the cells are not tightly packed.

In some embodiments, the subject has at least one good quality embryo. In some embodiments, the subject has greater than one good-quality embryo. In some embodiments, the subject has greater than two good-quality embryos. In some embodiments, the subject has at least two good-quality embryos. In some embodiments, the subject has greater than three good grade embryos. In some embodiments, the subject has at least three good-quality embryos. In some embodiments, the subject has at least one average quality embryo. In some embodiments, the subject has greater than one average-quality embryo. In some embodiments, the subject has greater than two average-quality embryos. In some embodiments, the subject has at least two average-quality embryos. In some embodiments, the subject has greater than three average grade embryos. In some embodiments, the subject has at least three average-quality embryos. In some embodiments, the subject has at least one poor quality embryo. In some embodiments, the subject has greater than one poor-quality embryo. In some embodiments, the subject has greater than two poor-quality embryos. In some embodiments, the subject has at least two poor-quality embryos. In some embodiments, the subject has greater than three poor grade embryos. In some embodiments, the subject has at least three poor-quality embryos. Determining embryo grade is known to those of skill in the art. In some embodiments, embryo grade is determined using methods known in the art. In some embodiments, embryo grade is determined using the method described in Bouillon, C. et al., Obstetric and perinatal outcomes of singletons after single blastocyst transfer: is there any difference according to blastocyst morphology, *RMBO*, Vol. 35, Issue 2, 197-207, Jun. 7, 2017. In some embodiments, embryo grade is determined using methods described in the Complete Guides to Embryo Grading and Success Rates (remembryo.com/embryo-grading/published Oct. 13, 2018 and updated Feb. 17, 2023.

In some embodiments, a good-quality embryo is graded as 6AA, 6AB, 6BA, 5AA, 5BA, 4AA, 4AB, 4BA, 3AA, 3AB, or 3BA. In some embodiments, an average quality embryo is graded as 6BB, 5BB, 4BB, or 3BB. In some embodiments, a poor-quality embryo is graded as 6CA, 6AC, 6CB, 6BC, 6CC, 5CA, 5AC, 5CB, 5BC, 5CC, 4CA, 4AC, 4CB, 4BC, 4CC, 3CA, 3AC, 3CB, 3BC, or, 3CC.

In some embodiments, the subject has high-quality embryos. In some embodiments, the subject has few remaining high-quality embryos. In some embodiments, few high-quality embryos is 1 embryo. In some embodiments, few high-quality embryos is 2 embryos. In some embodiments, few high-quality embryos is 3 embryos. In some embodiments, few high-quality embryos is 4 embryos. In some embodiments, few high-quality embryos is 5 embryos.

In some embodiments, the subject has average-quality embryos. In some embodiments, the subject has few remaining average-quality embryos. In some embodiments, few average-quality embryos is 1 embryo. In some embodiments, few average-quality embryos is 2 embryos. In some embodiments, few average-quality embryos is 3 embryos. In some embodiments, few average-quality embryos is 4 embryos. In some embodiments, few average-quality embryos is 5 embryos.

In some embodiments, the subject has poor-quality embryos. In some embodiments, the subject has few remaining poor-quality embryos. In some embodiments, few poor-quality embryos is 1 embryo. In some embodiments, few poor-quality embryos is 2 embryos. In some embodiments, few poor-quality embryos is 3 embryos. In some embodiments, few poor-quality embryos is 4 embryos. In some embodiments, few poor-quality embryos is 5 embryos.

In some embodiments, a subject's endometrium is in the receptive state.

In some embodiments, the patient is 21-45 years of age and has a BMI greater than 18.5 kg/m. In some embodiments, the patient is 21-45 years of age and has greater than 1 good-quality embryos. In some embodiments, the patient has a BMI greater than 18.5 kg/m and has greater than 1 good-quality embryos. In some embodiments, the patient is 21-45 years of age, has a BMI greater than 18.5 kg/m and has greater than 1 good quality embryos. In some embodiments, the patient is 21-45 years of age and has 1 or more good-quality embryos. In some embodiments, the patient has a BMI greater than 18.5 kg/m and has 1 or more good-quality embryos. In some embodiments, the patient is 21-45 years of age, has a BMI greater than 18.5 kg/m and has 1 or more good-quality embryos.

In some embodiments, the patient is 35 years of age or older and has a BMI greater than 18.5 kg/m. In some embodiments, the patient is 35 years of age or older and has greater than 1 good-quality embryos. In some embodiments, the patient has a BMI greater than 18.5 kg/m and has greater than 1 good-quality embryos. In some embodiments, the patient is 35 years of age or older, has a BMI greater than 18.5 kg/m and has greater than 1 good-quality embryos. In some embodiments, the patient is 35 years of age or older and has 1 or more good-quality embryos. In some embodiments, the patient has a BMI greater than 18.5 kg/m and has 1 or more good-quality embryos. In some embodiments, the patient is 35 years of age or older, has a BMI greater than 18.5 kg/m and has 1 or more good-quality embryos.

In some embodiments, the patient is 21-45 years of age and has a BMI greater than 18.5 kg/m. In some embodiments, the patient is 21-45 years of age and has greater than 1 average-quality embryo. In some embodiments, the patient has a BMI greater than 18.5 kg/m and has greater than 1 average-quality embryo. In some embodiments, the patient is 21-45 years of age, has a BMI greater than 18.5 kg/m and has greater than 1 average-quality embryo. In some embodiments, the patient is 21-45 years of age and has 1 or more average-quality embryos. In some embodiments, the patient has a BMI greater than 18.5 kg/m and has 1 or more average-quality embryos. In some embodiments, the patient is 21-45 years of age, has a BMI greater than 18.5 kg/m and has 1 or more average-quality embryos.

In some embodiments, the patient is 35 years of age or older and has a BMI greater than 18.5 kg/m. In some embodiments, the patient is 35 years of age or older and has greater than 1 average-quality embryo. In some embodiments, the patient has a BMI greater than 18.5 kg/m and has greater than 1 average-quality embryo. In some embodiments, the patient is 35 years of age or older, has a BMI greater than 18.5 kg/m and has greater than 1 average-quality embryo. In some embodiments, the patient is 35 years of age or older and has 1 or more average-quality embryo. In some embodiments, the patient has a BMI greater than 18.5 kg/m and has 1 or more average-quality embryo. In some embodiments, the patient is 35 years of age or older, has a BMI greater than 18.5 kg/m and has 1 or more average-quality embryo.

In some embodiments, the patient is 21-45 years of age and has a BMI greater than 18.5 kg/m. In some embodiments, the patient is 21-45 years of age and has greater than 1 poor-quality embryos. In some embodiments, the patient has a BMI greater than 18.5 kg/m and has greater than 1 poor-quality embryos. In some embodiments, the patient is 21-45 years of age, has a BMI greater than 18.5 kg/m and has greater than 1 poor-quality embryos. In some embodiments, the patient is 21-45 years of age and has 1 or more poor-quality embryos. In some embodiments, the patient has a BMI greater than 18.5 kg/m and has 1 or more poor-quality embryos. In some embodiments, the patient is 21-45 years of age, has a BMI greater than 18.5 kg/m and has 1 or more poor-quality embryos.

In some embodiments, the patient is 35 years of age or older and has a BMI greater than 18.5 kg/m. In some embodiments, the patient is 35 years of age or older and has greater than 1 poor-quality embryos. In some embodiments, the patient has a BMI greater than 18.5 kg/m and has greater than 1 poor-quality embryos. In some embodiments, the patient is 35 years of age or older, has a BMI greater than 18.5 kg/m and has greater than 1 poor-quality embryos. In some embodiments, the patient is 35 years of age or older and has 1 or more poor-quality embryos. In some embodiments, the patient has a BMI greater than 18.5 kg/m and has 1 or more poor-quality embryos. In some embodiments, the patient is 35 years of age or older, has a BMI greater than 18.5 kg/m and has 1 or more poor-quality embryos.

Sample Collection

In some embodiments, a blood sample is collected from a subject. In some embodiments, the sample is a plasma sample. In some embodiments, the blood sample is collected at during a mock hormone replacement therapy cycle. In some embodiments, the blood sample is collected during a mock hormone replacement therapy cycle 4-6 days after progesterone administration. In some embodiments, the blood sample is collected 4-6 days after progesterone administration. In some embodiments, the blood sample is collected about 4-6 days after progesterone administration. In some embodiments, the blood sample is collected during a mock hormone replacement therapy cycle 5 days after progesterone administration. In some embodiments, the blood sample is collected 5 days after progesterone administration. In some embodiments, the blood sample is collected about 5 days after progesterone administration. In some embodiments, the blood sample is collected during a mock hormone replacement therapy cycle 6 days after progesterone administration. In some embodiments, the blood sample is collected 6 days after progesterone administration. In some embodiments, the blood sample is collected about 6 days after progesterone administration. In some embodiments, the blood sample is collected during a mock hormone replacement therapy cycle 4 days after progesterone administration. In some embodiments, the blood sample is collected 4 days after progesterone administration. In some embodiments, the blood sample is collected about 4 days after progesterone administration.

In some embodiments, the blood sample is collected during a hormone replacement therapy (HRT) cycle. In some embodiments, the blood sample is collected during an HRT cycle about 4-6 days after progesterone administration. In some embodiments, the blood sample is collected during an HRT cycle about 5 days after progesterone administration. In some embodiments, the blood sample is collected during an HRT cycle about 6 days after progesterone administration. In some embodiments, the blood sample is collected during an HRT cycle about 4 days after progesterone administration. In some embodiments, the blood sample is collected during a hormone replacement therapy (HRT) cycle. In some embodiments, the blood sample is collected during an HRT cycle 4-6 days after progesterone administration. In some embodiments, the blood sample is collected during an HRT cycle 5 days after progesterone administration. In some embodiments, the blood sample is collected during an HRT cycle 6 days after progesterone administration. In some embodiments, the blood sample is collected during an HRT cycle 4 days after progesterone administration.

In some embodiments, the blood sample is collected after a luteinizing hormone (LH) surge. In some embodiments, the blood sample is collected about 6-8 days after an LH surge. In some embodiments, the blood sample is collected about 6 days after an LH surge. In some embodiments, the blood sample is collected about 7 days after an LH surge. In some embodiments, the blood sample is collected about 8 days after an LH surge. In some embodiments, the blood sample is collected 6-8 days after an LH surge. In some embodiments, the blood sample is collected 6 days after an LH surge. In some embodiments, the blood sample is collected 7 days after an LH surge. In some embodiments, the blood sample is collected 8 days after an LH surge.

In some embodiments, the blood sample is collected after a human chorionic gonadotropin (hCG) administration. In some embodiments, the blood sample is collected during an HRT cycle about 4-7 days after hCG administration. In some embodiments, the blood sample is collected during an HRT cycle about 4 days after hCG administration. In some embodiments, the blood sample is collected during an HRT cycle about 5 days after hCG administration. In some embodiments, the blood sample is collected during an HRT cycle about 6 days after hCG administration. In some embodiments, the blood sample is collected during an HRT cycle about 7 days after hCG administration. In some embodiments, the blood sample is collected during an HRT cycle 4-7 days after hCG administration. In some embodiments, the blood sample is collected during an HRT cycle 4 days after hCG administration. In some embodiments, the blood sample is collected during an HRT cycle 5 days after hCG administration. In some embodiments, the blood sample is collected during an HRT cycle 6 days after hCG administration. In some embodiments, the blood sample is collected during an HRT cycle 7 days after hCG administration.

In some embodiments, the blood sample is collected about 4 days and about 5 days after starting progesterone administration. In some embodiments, the blood sample is collected about 4 days and about 5 days after starting progesterone administration during an assisted reproductive technology treatment cycle.

In some embodiments, the blood sample is collected about 4 days and about 5 days after starting progesterone administration. In some embodiments, the blood sample is collected about 4 days and about 5 days after starting progesterone administration during and HRT cycle. In some embodiments, the blood sample is collected about 6 days and about 7 days after an LH surge is detected. In some embodiments, the blood sample is collected about 6 days and about 7 days after hCG administration.

In some embodiments, about 5 mL to about 10 mL of blood is collected. In some embodiments, about 1 mL to about 10 mL of blood is collected. In some embodiments, about 0.5 mL of blood is collected. In some embodiments, about 1 mL of blood is collected. In some embodiments, about 2 mL of blood is collected. In some embodiments, about 3 mL of blood is collected. In some embodiments, about 4 mL of blood is collected. In some embodiments, about 5 mL of blood is collected. In some embodiments, about 6 mL of blood is collected. In some embodiments, about 7 mL of blood is collected. In some embodiments, about 8 mL of blood is collected. In some embodiments, about 9 mL of blood is collected. In some embodiments, about 10 mL of blood is collected. In some embodiments, about 11 mL of blood is collected. In some embodiments, about 12 mL of blood is collected.

In some embodiments, the blood sample is collected with a needle size to reduce hemolysis. In some embodiments, the blood sample is collected using at least a 21 gauge needle. In some embodiments, hemolysis is monitored during sample collection. In some embodiments, hemolysis is monitored during blood pre-processing.

In some embodiments, pre-processing of the blood samples occurs within 30 minutes of sample collection. In some embodiments, pre-processing of the blood samples occurs within 1 hour of sample collection. In some embodiments, pre-processing of the blood sample occurs within 2 hours of sample collection. In some embodiments, pre-processing comprises:

i) inverting the blood collection tube at least five times,
ii) spinning the specimen in a centrifuge at 1200 g for 10 minutes at room temperature, and
iii) transferring the sample to new tubes and centrifuging at 12000 g for 10 minutes.

Methods for short or longer term storage of blood are well known to those of skill in the art. In some embodiments, blood is stored prior to processing. In some embodiments, blood is stored after processing. In some embodiments, the processed blood samples are stored at room temperature. In some embodiments, the processed blood samples are stored at −80° C. In some embodiments, the processed blood samples are stored at about 1.7 to about 3.3° C. In some embodiments, the processed blood samples are stored at 0° C. In some embodiments, a blood sample is pre-processed and then stored at −80° C. In some embodiments, a blood sample is pre-processed and then stored at −80° C. for up to 1 year. In some embodiments, a blood sample is pre-processed and then stored at about 1.7 to about 3.3° C. In some embodiments, a blood sample is pre-processed and then stored at about 1.7 to about 3.3° C. for up to 1 year. In some embodiments, a blood sample is pre-processed and then stored at 0° C. In some embodiments, a blood sample is pre-processed and then stored at 0° C. for up to 1 year.

In some embodiments, the blood sample is collected. In some embodiments, the blood is collected in a plasma preparation tube (PPT). In some embodiments, the blood is collected in a Streck tube. In some embodiments, the blood is collected in an RNA Complete BCT Tube (Streck). In some embodiments, the blood is collected in a PAXgene Blood ccfDNA Tube (Qiagen). In some embodiments, the blood is collected in a DNA/RNA Shield Blood Collection Tube (Zymo). In some embodiments, the blood is collected in a cf-DNA/cf-RNA Preservation tube (Norgen Biotek). In some embodiments, the blood is collected in a Lbgard Blood Collection Tube (Biomatrica). In some embodiments, the blood is collected in a STASIS DNA/RNA Blood collection tube (MagBio Genomics).

In some embodiments, a uterine fluid sample is collected from a subject. In some embodiments, the uterine fluid sample is collected at during a mock hormone replacement therapy cycle. In some embodiments, the uterine fluid sample is collected during a mock hormone replacement therapy cycle 4-6 days after progesterone administration. In some embodiments, the uterine fluid sample is collected 4-6 days after progesterone administration. In some embodiments, the uterine fluid sample is collected about 4-6 days after progesterone administration. In some embodiments, the uterine fluid sample is collected during a mock hormone replacement therapy cycle 5 days after progesterone administration. In some embodiments, the uterine fluid sample is collected 5 days after progesterone administration. In some embodiments, the uterine fluid sample is collected about 5 days after progesterone administration. In some embodiments, the uterine fluid sample is collected during a mock hormone replacement therapy cycle 6 days after progesterone administration. In some embodiments, the uterine fluid sample is collected 6 days after progesterone administration. In some embodiments, the uterine fluid sample is collected about 6 days after progesterone administration. In some embodiments, the uterine fluid sample is collected during a mock hormone replacement therapy cycle 4 days after progesterone administration. In some embodiments, the uterine fluid sample is collected 4 days after progesterone administration. In some embodiments, the uterine fluid sample is collected about 4 days after progesterone administration.

In some embodiments, the uterine fluid sample is collected during a hormone replacement therapy (HRT) cycle. In some embodiments, the uterine fluid sample is collected during an HRT cycle about 4-6 days after progesterone administration. In some embodiments, the uterine fluid sample is collected during an HRT cycle about 5 days after progesterone administration. In some embodiments, the uterine fluid sample is collected during an HRT cycle about 6 days after progesterone administration. In some embodiments, the uterine fluid sample is collected during an HRT cycle about 4 days after progesterone administration. In some embodiments, the uterine fluid sample is collected during a hormone replacement therapy (HRT) cycle. In some embodiments, the uterine fluid sample is collected during an HRT cycle 4-6 days after progesterone administration. In some embodiments, the uterine fluid sample is collected during an HRT cycle 5 days after progesterone administration. In some embodiments, the uterine fluid sample is collected during an HRT cycle 6 days after progesterone administration. In some embodiments, the uterine fluid sample is collected during an HRT cycle 4 days after progesterone administration.

In some embodiments, the uterine fluid sample is collected after a luteinizing hormone (LH) surge. In some embodiments, the uterine fluid sample is collected about 6-8 days after an LH surge. In some embodiments, the uterine fluid sample is collected about 6 days after an LH surge. In some embodiments, the uterine fluid sample is collected about 7 days after an LH surge. In some embodiments, the uterine fluid sample is collected about 8 days after an LH surge. In some embodiments, the uterine fluid sample is collected 6 days after an LH surge. In some embodiments, the uterine fluid sample is collected 7 days after an LH surge. In some embodiments, the uterine fluid sample is collected 8 days after an LH surge.

In some embodiments, the uterine fluid sample is collected after a human chorionic gonadotropin (hCG) administration. In some embodiments, the uterine fluid sample is collected during an HRT cycle about 4-7 days after hCG administration. In some embodiments, the uterine fluid sample is collected during an HRT cycle about 4 days after hCG administration. In some embodiments, the uterine fluid sample is collected during an HRT cycle about 5 days after hCG administration. In some embodiments, the uterine fluid sample is collected during an HRT cycle about 6 days after hCG administration. In some embodiments, the uterine fluid sample is collected during an HRT cycle about 7 days after hCG administration. In some embodiments, the uterine fluid sample is collected during an HRT cycle 4-7 days after hCG administration. In some embodiments, the uterine fluid sample is collected during an HRT cycle 4 days after hCG administration. In some embodiments, the uterine fluid sample is collected during an HRT cycle 5 days after hCG administration. In some embodiments, the uterine fluid sample is collected during an HRT cycle 6 days after hCG administration. In some embodiments, the uterine fluid sample is collected during an HRT cycle 7 days after hCG administration.

In some embodiments, the uterine fluid sample is collected about 4 days and about 5 days after starting progesterone administration. In some embodiments, the uterine fluid sample is collected about 4 days and about 5 days after starting progesterone administration during an assisted reproductive technology treatment cycle.

In some embodiments, the uterine fluid sample is collected about 4 days and about 5 days after starting progesterone administration. In some embodiments, the uterine fluid sample is collected about 4 days and about 5 days after starting progesterone administration during and HRT cycle. In some embodiments, the uterine fluid sample is collected about 6 days and about 7 days after an LH surge is detected. In some embodiments, the uterine fluid sample is collected about 6 days and about 7 days after hCG administration. In some embodiments, uterine fluid is obtained by lavage. In some embodiments, uterine fluid is obtained by lavage after flushing the uterus with phosphate buffered saline (PBS). In some embodiments, uterine fluid is collected with an intra-uterine insemination catheter inserted through the cervical canal into the uterine cavity.

Library Preparation

The miRNAs in the blood sample can be extracted and enriched using methods known in the art. The miRNA-enriched preparations can be stored at −80° C. The quantity and quality of the miRNA can be analyzed using methods known in the art. For example, the miRNA can be analyzed using a commercially available Agilent bioanalyzer.

cDNA can be synthesized from the extracted and enriched miRNAs in a reverse transcription reaction, and a qPCR reaction can be performed to quantify the expression levels of the miRNAs. Thus, in some embodiments, the miRNA expression profile is determined by qPCR, optionally using one or more miRNA profiling chips disclosed herein.

In some embodiments, the cDNA synthesis is performed using a universal reverse transcription primer as disclosed in U.S. Pat. No. 10,590,478, which is incorporated herein by reference. In some embodiments, the cDNA synthesis is performed using a universal reverse transcription primer.

In some embodiments, the library for sequencing is prepared using methods known in the art. In some embodiments, the library is prepared using two-adaptor ligation. In some embodiments, the library is prepared using randomized adapters. In some embodiments, the library is prepared using single adaptor ligation and circularization. In some embodiments, the library is prepared using unique molecular identifiers. In some embodiments, the library is prepared using polyadenylation and template switching. In some embodiments, the library is prepared using sequencing of hybridization probes.

In some embodiments, the library is prepared using a commercially available protocol. In some embodiments, the library is prepared using one or more of Small RNA-Seq Library Prep Kit (Lexogen GmBH), Small RNA Library Prep Kit (Morgen Biotek Corp.), TruSeq Small RNA Library Prep Kit (Illumina), TailorMix miRNA Sample Preparation Kit (SeqMatic), NEBNExt Multiplex Small RNA Library Prep Set (New England Biolabs), CleanTag Small RNA Library Prep Kit (TriLink BioTechnologies, In.), ScriptMiner Library preparation (Cambio), NEXTflex Small RNA Sequencing Kit (PerkinElmer), RealSeq-AC Kit (Somagenics), RealSeq-biofluids Kit (Somagenics), SMARTer microRNA-Seq Kit (Takara Bio), TrucWuant Small RNA Seq Kit for Ultra Low Input (GenXPro GmBH), QIAseq miRNA Library Kit (Qiagen), SMARTer smRNA-seq Kit (Takara Bio), CATS Small RNA-seq Kit (Biagenode), HTG EdgeSeq miRNA Whole Transcriptome Assay (HTG Molecular Diagonists), or FirePlex miRNA assays (Abcam).

In some embodiments, the library is prepared using the iCatcher (CatchGene) platform. In some embodiments, the library is prepared using the QIAsymphony (Qiagen) platform. In some embodiments, the library is prepared using the KingFisher (ThermoFisher) platform.

In some embodiments, the library is prepared using the methods described in the Examples.

miRNA Sequencing

The expression levels of the miRNAs can be analyzed with quantitative methods known in the art including qPCR, sequencing, microarray, or RNA-DNA hybrid capture technology. In some embodiments, the expression level of the miRNA is analyzed using qPCR. In some embodiments, the expression level of the miRNA is measured using qRT-PCR. In some embodiments, the expression level of the miRNA is analyzed using Next-Generation Sequencing (NGS). In some embodiments, to facilitate the analysis, one or more miRNA profiling chips targeting the 281 miRNAs can be used. In some embodiments, the one or more chips additionally target certain RNA sequences, e.g., 18 s rRNA, that can be used as the endogenous controls for the miRNA expression analysis. In some embodiments, miRNA expression is measured by OpenArray. In some embodiments, miRNA expression is measured by Microarray.

In some embodiments, miRNA expression is determined using Next-Generation sequencing. Methods of Next-Generation sequencing are known to those of skill in the art. In some embodiments, miRNA expression is determined using the NextSeq 550. In some embodiments, miRNA expression is determined using the iSeq 100. In some embodiments, miRNA expression is determined using the MiniSeq. In some embodiments, miRNA expression is determined using the MiniSeq Series. In some embodiments, miRNA expression is determined using the NextSeq 1000. In some embodiments, miRNA expression is determined using the NextSeq 2000. In some embodiments, miRNA expression is determined using the NovaSeq. In some embodiments, miRNA expression is determined using the DNBSEQ G99. In some embodiments, miRNA expression is determined using the DNBSEQ G50.

In some embodiments, the presence of an miRNA is determined. In some embodiments, the absence of an miRNA is determined. In some embodiments, the presence of an miRNA indicates a pre-receptive stage. In some embodiments, the absence of an miRNA indicates a pre-receptive stage. In some embodiments, the presence of an miRNA indicates a post-receptive stage. In some embodiments, the absence of an miRNA indicates a post-receptive stage. In some embodiments, the presence of an miRNA indicates the receptive stage. In some embodiments, the absence of an miRNA indicates the receptive stage.

In some embodiments, the presence of one or more miRNAs is determined. In some embodiments, the absence of one or more miRNAs is determined. In some embodiments, the presence of one or more miRNAs indicates a pre-receptive stage. In some embodiments, the absence of one or more miRNAs indicates a pre-receptive stage. In some embodiments, the presence of one or more miRNAs indicates a post-receptive stage. In some embodiments, the absence of one or more miRNAs indicates a post-receptive stage. In some embodiments, the presence of one or more miRNAs indicates the receptive stage. In some embodiments, the absence of one or more miRNAs indicates the receptive stage.

The present disclosure provides methods of determining the miRNA expression profile of a blood sample. The method generally comprises (i) obtaining or having obtained a blood sample from a subject, (ii) performing an assay to determine a miRNA expression profile of the blood sample, wherein the miRNA expression profile comprises expression levels of a plurality of miRNAs, for example, 281 miRNAs provided in Table 7.

miRNA Analysis Method and its Use for Determining Endometrial Receptivity

In some embodiments of the disclosure, the miRNA expression profile can be used to generate a receptivity predictive score, using a computer-based miRNA analysis method. In some embodiments, the receptivity predictive score classifies the endometrial status (also referred to herein as endometrial state or endometrial stage) into one of the following four states: a pre-receptive state, a receptive state, post-receptive state (short window), or post-receptive state (average window).

In some embodiments, the pre-receptive state indicates a subject is receptive to embryo transfer about 24 hours after the sample was obtained. In some embodiments, the receptive state indicates the subject is receptive to transfer at the time the sample was obtained. In some embodiments, the post-receptive state (short window) indicates the subject is receptive to embryo transfer about 12 hours before the sample was obtained. In some embodiments, the post-receptive state (average window) indicates the subject is receptive to embryo transfer about 24 hours before the sample was obtained.

In some embodiments, the computer-based miRNA analysis method is a mathematical prediction classifier which uses the miRNA expression data and learns to distinguish classes according to different receptivity states.

In some embodiments, to build the machine-learning model, the raw data on miRNA expression levels is divided into a training set and a validation set. In some embodiments, the training set is used to train the prediction classifier and the validation set is used to evaluate and refine the performance of the prediction classifier. In some embodiments, one or more of the following steps are performed to build and validate the machine-learning model: data normalization, data scaling, data transformation, prediction modeling, and cross-validation.

In some embodiments, the data is normalized through reads ratio, where individual miRNAs reads are divided by total RNA reads (see, for example, Yu et al., "Analysis of microRNA expression profile by small RNA sequencing in Down syndrome fetuses." Int. J. Mol. Med. Vol. 32 Issue 5; 1115-1125; Sep. 18, 2013). In some embodiments, the data can be standardized the range of value to make data having zero-mean and unit-variance.

In some embodiments, the Optimal Receptivity Assay (ORA®) is performed by using one or more of the following steps: quality control, data normalization (converting miRNA sequencing read counts to a ratio with the total read count), target qualification (by selecting miRNA targets with stable expression patterns and reliable ration value between different patient samples), data transformation (converting the miRNA ratio into a processed format for use in the modeling system), prediction modeling (establishing the Optimal Receptivity Assay (ORA®) model), and cross-validation (validating the prediction model by an independent dataset to evaluate accuracy).

In some embodiments, a quality control of the miRNA dataset for Optimal Receptivity Assay (ORA®) analysis is performed. In some embodiments, quality control comprises measuring miRNA used in sequencing, the total reads from sequencing, total miRNA reads, spike-in control reads, and detectable miRNA number from sequencing. In some embodiments, quality control measures the total reads from sequencing. In some embodiments, quality control measures total miRNA reads from sequencing. In some embodiments, quality control measures spike-in control reads from sequencing. In some embodiments, quality control measures detectable miRNA numbers from sequencing.

In some embodiments the method comprises performing verification of the dataset. In some embodiments, verification of the dataset using Optimal Receptivity Assay (ORA®) analyzes one or more of precision, reproducibility, repeatability, limit of blank (LoB), and interference. In some embodiments, the dataset is validated by measuring one or more of accuracy, sensitivity, and specificity.

In some embodiments the method uses logistic regression.

In some embodiments, the method comprises cross validation. In some embodiments, the method comprises 10-fold cross validation.

In some embodiments, pregnancy rates can be used to assess the predictive value of the computer-based miRNA analysis model.

In some embodiments, after validation and refinement, a computer-based miRNA analysis model is generated. The model, when receiving a blood sample from a subject, classifies the endometrial status of the subject.

In some embodiments, the prediction model comprises an method step for predicting the pre-receptive state. In some embodiments, the prediction model comprises an method step for predicting the receptive state. In some embodiments, the prediction model comprises an method step for predicting the post-receptive state.

In some embodiments, the method has a prediction accuracy of at least 90%. In some embodiments, the method has a prediction accuracy of at least 91%. In some embodiments, the method has a prediction accuracy of at least 92%. In some embodiments, the method has a prediction accuracy of at least 93%. In some embodiments, the method has a prediction accuracy of at least 94%. In some embodiments, the method has a prediction accuracy of at least 95%. In some embodiments, the method has a prediction accuracy of at least 96%. In some embodiments, the method has a prediction accuracy of at least 97%. In some embodiments, the method has a prediction accuracy of at least 98%. In some embodiments, the method has a prediction accuracy of at least 99%.

In some embodiments, the method has a prediction accuracy of about 90%. In some embodiments, the method has a prediction accuracy of about 91%. In some embodiments, the method has a prediction accuracy of about 92%. In some embodiments, the method has a prediction accuracy of about 93%. In some embodiments, the method has a prediction accuracy of about 94%. In some embodiments, the method has a prediction accuracy of about 95%. In some embodiments, the method has a prediction accuracy of about 96%. In some embodiments, the method has a prediction accuracy of about 97%. In some embodiments, the method has a prediction accuracy of about 98%. In some embodiments, the method has a prediction accuracy of about 99%. In some embodiments, the method has a prediction accuracy of about 100%. In some embodiments, the method has a prediction accuracy of about 98.1%.

Analyzing miRNA Expression Profile to Determine Endometrial Receptivity

The present disclosure determines a blood sample's microRNA (miRNA) expression profile. miRNAs are small molecules in the body which influence various cellular processes such as cell growth, development, and metabolism. In some embodiments, the miRNA is cell-free miRNA in blood. In some embodiments, the expression signatures of miRNAs can reflect the different physiological states of the endometrium in response to changes in factors such as age, BMI, AMH (anti-mullerian hormone), lifestyle, and environmental effects. In some embodiments, miRNA have regulatory functions throughout the entire process of embryo implantation and pregnancy (e.g., tissue development, embryo attachment and growth, pre-eclampsia, and more). In some embodiments, the miRNA that modify these endometrial conditions can be measured in the bloodstream. For example, miRNA in the bloodstream have been found to regulate a number of immune mechanisms during pregnancy, and are critical physiological factors for cell growth and angiogenesis. Through the regulation of these mechanisms, miRNAs can affect the endometrium's environment, growth process, and, by extension, pregnancy results. In some embodiments, the methods described herein identify blood-based miRNA biomarkers to accurately reflect the endometrial status of a subject.

In some embodiments, the miRNA expression profile comprises expression levels of a plurality of miRNAs. In some embodiments, the miRNA expression profile comprises expression levels of a plurality of miRNAs, for example, at least 10, 25, 50, 75, 100, 125, 150, 200, 250, or 300 miRNAs, all of which may be implicated in the regulation of endometrial receptivity. In some embodiments, the miRNA expression profile comprises expression levels of about 50 to about 300 miRNAs. In some embodiments, the miRNA expression profile comprises expression levels of about 50 miRNAs. In some embodiments, the miRNA expression profile comprises expression levels of about 75 miRNAs. In some embodiments, the miRNA expression profile comprises expression levels of about 100 miRNAs. In some embodiments, the miRNA expression profile comprises expression levels of about 125 miRNAs. In some embodiments, the miRNA expression profile comprises expression levels of about 150 miRNAs. In some embodiments, the miRNA expression profile comprises expression levels of about 175 miRNAs. In some embodiments, the miRNA expression profile comprises expression levels of about 200 miRNAs. In some embodiments, the miRNA expression profile comprises expression levels of about 225 miRNAs. In some embodiments, the miRNA expression profile comprises expression levels of about 250 miRNAs. In some embodiments, the miRNA expression profile comprises expression levels of about 275 miRNAs. In some embodiments, the miRNA expression profile comprises expression levels of about 300 miRNAs.

In some embodiments, the method comprises determining the level of at least one miRNA. In some embodiments the method comprises determining the level of at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, or 281, miRNA(s) miRNA(s).

In some embodiments, the method comprises determining the level of at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, or 281, miRNA(s) selected from the miRNA provided in Table 7.

In some embodiments, the present disclosure provides a selection of 281 miRNAs, whose expression levels have been implicated in the regulation of endometrial receptivity. These 281 miRNAs were chosen by first identifying genes involved in the reproductive diseases from the Human Disease Ontology database, and then selecting potential regulator miRNAs using miRTARBase, TargetScan, and miRDB.

In some embodiments, to determine an endometrial status, the methods according to this disclosure comprise performing an assay to determine the miRNA expression profile of the blood sample, wherein the miRNA expression profile comprises expression levels of the 281 miRNAs shown in Table 7.

In some embodiments, the miRNA is selected from let-7a, miR-21, miR-25, miR-103, miR-192, miR-181a, miR-24, miR, 210, miR-25, miR 16, or any combination thereof. In some embodiments, the miRNA is selected from miR-25, miR-27a, miR-31, miR-93, miR-106b, miR-146a, miR-152, miR-155, or any combination thereof.

In some embodiments, expression of one or more miRNA selected from hsa-let-7b-3p, hsa-let-7d-3p, hsa-let-7i-5p, hsa-miR-1-3p, hsa-miR-100-5p, hsa-miR-106b-3p, hsa-miR-10a-3p, hsa-miR-10a-5p, hsa-miR-10b-5p, hsa-miR-1180-3p, hsa-miR-1255b-5p, hsa-miR-125a-3p, hsa-miR-125b-5p, hsa-miR-1260a, hsa-miR-1260b, hsa-miR-1270, hsa-miR-128-3p, hsa-miR-1285-3p, hsa-miR-1287-5p, hsa-miR-1292-5p, hsa-miR-1294, hsa-miR-1298-5p, hsa-miR-1301-3p, hsa-miR-1303, hsa-miR-1304-3p, hsa-miR-1306-5p, hsa-miR-1307-3p, hsa-miR-130b-3p, hsa-miR-139-3p, hsa-miR-140-5p, hsa-miR-141-3p, hsa-miR-142-3p, hsa-miR-143-3p, hsa-miR-145-5p, hsa-miR-1469, hsa-miR-146a-5p, hsa-miR-146b-5p, hsa-miR-148a-3p, hsa-miR-151b, hsa-miR-1538, hsa-miR-155-5p, hsa-miR-15b-3p, hsa-miR-17-3p, hsa-miR-17-5p, hsa-miR-181b-5p, hsa-miR-183-3p, hsa-miR-183-5p, hsa-miR-186-5p, hsa-miR-18a-5p, hsa-miR-1908-5p, hsa-miR-192-5p, hsa-miR-193a-5p, hsa-miR-193b-5p, hsa-miR-194-5p, hsa-miR-196b-5p, hsa-miR-197-3p, hsa-miR-199a-3p, hsa-miR-199b-3p, hsa-miR-19b-3p, hsa-miR-200c-3p, hsa-miR-204-3p, hsa-miR-205-5p, hsa-miR-210-3p, hsa-miR-2110, hsa-miR-22-3p, hsa-miR-22-5p, hsa-miR-221-3p, hsa-miR-223-5p, hsa-miR-23b-3p, hsa-miR-24-3p, hsa-miR-25-5p, hsa-miR-27a-3p, hsa-miR-27b-3p, hsa-miR-27b-5p, hsa-miR-28-3p, hsa-miR-29b-3p, hsa-miR-29c-3p, hsa-miR-30a-3p, hsa-miR-30a-5p, hsa-miR-30d-5p, hsa-miR-30c-3p, hsa-miR-31-5p, hsa-miR-3135b, hsa-miR-3143, hsa-miR-32-3p, hsa-miR-32-5p, hsa-miR-320d, hsa-miR-324-5p, hsa-miR-328-3p, hsa-miR-335-5p, hsa-miR-338-3p, hsa-miR-339-3p, hsa-miR-340-5p, hsa-miR-345-5p, hsa-miR-34a-5p, hsa-miR-3529-3p, hsa-miR-3605-3p, hsa-miR-3605-5p, hsa-miR-361-5p, hsa-miR-3612, hsa-miR-3615, hsa-miR-362-5p, hsa-miR-363-3p, hsa-miR-365a-3p, hsa-miR-365b-3p, hsa-miR-3688-3p, hsa-miR-374a-5p, hsa-miR-376a-3p, hsa-miR-376c-3p, hsa-miR-382-5p, hsa-miR-383-3p, hsa-miR-3913-3p, hsa-miR-3913-5p, hsa-miR-3960, hsa-miR-3972, hsa-miR-421, hsa-miR-423-3p, hsa-miR-424-3p, hsa-miR-424-5p, hsa-miR-432-5p, hsa-miR-4429, hsa-miR-450a-5p, hsa-miR-4510, hsa-miR-454-3p, hsa-miR-4644, hsa-miR-4732-5p, hsa-miR-483-5p, hsa-miR-497-5p, hsa-miR-5010-5p, hsa-miR-502-3p, hsa-miR-503-5p, hsa-miR-505-3p, hsa-miR-505-5p, hsa-miR-5189-3p, hsa-miR-532-3p, hsa-miR-542-3p, hsa-miR-548 am-5p, hsa-miR-548c-5p, hsa-miR-548h-3p, hsa-miR-5480-5p, hsa-miR-548z, hsa-miR-550a-5p, hsa-miR-5585-5p, hsa-miR-574-3p, hsa-miR-576-5p, hsa-miR-589-5p, hsa-miR-590-3p, hsa-miR-598-3p, hsa-miR-625-3p, hsa-miR-625-5p, hsa-miR-628-3p, hsa-miR-642a-3p, hsa-miR-642a-5p, hsa-miR-642b-3p, hsa-miR-642b-5p, hsa-miR-652-3p, hsa-miR-657, hsa-miR-660-5p, hsa-miR-663b, hsa-miR-664a-5p, hsa-miR-671-5p, hsa-miR-6815-5p, hsa-miR-7-5p, hsa-miR-744-5p, hsa-miR-766-3p, hsa-miR-769-5p, hsa-miR-877-5p, hsa-miR-885-3p, hsa-miR-885-5p, hsa-miR-93-3p, hsa-miR-941, hsa-miR-95-3p, hsa-miR-96-5p, hsa-miR-99a-5p, hsa-miR-99b-5p, hsa-let-7a-5p, hsa-let-7b-5p, hsa-let-7c-5p, hsa-let-7d-5p, hsa-let-7e-5p, hsa-let-7f-5p, hsa-let-7g-5p, hsa-miR-103a-3p, hsa-miR-103b, hsa-miR-106a-5p, hsa-miR-106b-5p, hsa-miR-107, hsa-miR-12116, hsa-miR-122-5p, hsa-miR-122b-3p, hsa-miR-1246, hsa-miR-125a-5p, hsa-miR-126-3p, hsa-miR-126-5p, hsa-miR-1290, hsa-miR-130a-3p, hsa-miR-132-3p, hsa-miR-139-5p, hsa-miR-140-3p, hsa-miR-142-5p, hsa-miR-144-3p, hsa-miR-150-3p, hsa-miR-150-5p, hsa-miR-151a-3p, hsa-miR-151a-5p, hsa-miR-15a-5p, hsa-miR-15b-5p, hsa-miR-16-5p, hsa-miR-181a-2-3p, hsa-miR-181a-3p, hsa-miR-181a-5p, hsa-miR-182-5p, hsa-miR-185-5p, hsa-miR-18b-5p, hsa-miR-191-5p, hsa-miR-195-5p, hsa-miR-200a-3p, hsa-miR-206, hsa-miR-20a-5p, hsa-miR-20b-5p, hsa-miR-21-5p, hsa-miR-222-3p, hsa-miR-223-3p, hsa-miR-23a-3p, hsa-miR-25-3p, hsa-miR-26a-5p, hsa-miR-26b-5p, hsa-miR-28-5p, hsa-miR-29a-3p, hsa-miR-3065-5p, hsa-miR-3074-5p, hsa-miR-30b-5p, hsa-miR-30c-5p, hsa-miR-30c-5p, hsa-miR-3157-5p, hsa-miR-3184-3p, hsa-miR-3184-5p, hsa-miR-3200-5p, hsa-miR-320a-3p, hsa-miR-320b, hsa-miR-320c, hsa-miR-324-3p, hsa-miR-339-5p, hsa-miR-342-3p, hsa-miR-3614-3p, hsa-miR-3652, hsa-miR-374b-5p, hsa-miR-374c-3p, hsa-miR-375-3p, hsa-miR-378a-3p, hsa-miR-378c, hsa-miR-3940-3p, hsa-miR-423-5p, hsa-miR-425-3p, hsa-miR-425-5p, hsa-miR-4298, hsa-miR-451a, hsa-miR-4635, hsa-miR-4685-5p, hsa-miR-4707-3p, hsa-miR-4771, hsa-miR-484, hsa-miR-486-3p, hsa-miR-486-5p, hsa-miR-499a-5p, hsa-miR-501-3p, hsa-miR-532-5p, hsa-miR-550a-3-5p, hsa-miR-574-5p, hsa-miR-629-5p, hsa-miR-651-5p, hsa-miR-6734-5p, hsa-miR-6786-3p, hsa-miR-6873-3p, hsa-miR-7706, hsa-miR-7847-3p, hsa-miR-8485, hsa-miR-92a-3p, hsa-miR-92b-3p, hsa-miR-93-5p, hsa-miR-98-5p, or any combination thereof, is used to determine endometrial receptivity stage.

In some embodiments, expression of one or more miRNA selected from hsa-let-7i-5p, hsa-miR-10a-5p, hsa-miR-10b-5p, hsa-miR-1180-3p, hsa-miR-1260b, hsa-miR-128-3p, hsa-miR-1285-3p, hsa-miR-1303, hsa-miR-130b-3p, hsa-miR-143-3p, hsa-miR-151b, hsa-miR-181b-5p, hsa-miR-193a-5p, hsa-miR-199a-3p, hsa-miR-199b-3p, hsa-miR-23b-3p, hsa-miR-24-3p, hsa-miR-28-3p, hsa-miR-29c-3p, hsa-miR-30a-3p, hsa-miR-30d-5p, hsa-miR-30c-3p, hsa-miR-3135b, hsa-miR-320d, hsa-miR-339-3p, hsa-miR-3529-3p, hsa-miR-361-5p, hsa-miR-3960, hsa-miR-421, hsa-miR-4510, hsa-miR-5585-5p, hsa-miR-625-5p, hsa-miR-660-5p, hsa-miR-7-5p, hsa-miR-744-5p, hsa-let-7a-5p, hsa-let-7b-5p, hsa-let-7c-5p, hsa-let-7d-5p, hsa-let-7e-5p, hsa-let-7f-5p, hsa-let-7g-5p, hsa-miR-103a-3p, hsa-miR-103b, hsa-miR-106b-5p, hsa-miR-107, hsa-miR-12116, hsamiR-122-5p, hsa-miR-122b-3p, hsa-miR-1246, hsa-miR-126-3p, hsa-miR-126-5p, hsa-miR-1290, hsa-miR-130a-3p, hsa-miR-139-5p, hsa-miR-140-3p, hsa-miR-142-5p, hsa-miR-144-3p, hsa-miR-150-5p, hsa-miR-151a-3p, hsa-miR-151a-5p, hsa-miR-15a-5p, hsa-miR-15b-5p, hsa-miR-16-5p, hsa-miR-181a-3p, hsa-miR-181a-5p, hsa-miR-182-5p, hsa-miR-185-5p, hsa-miR-191-5p, hsa-miR-20a-5p, hsa-miR-20b-5p, hsa-miR-21-5p, hsa-miR-223-3p, hsa-miR-23a-3p, hsa-miR-25-3p, hsa-miR-26a-5p, hsa-miR-26b-5p, hsa-miR-29a-3p, hsa-miR-3074-5p, hsa-miR-30c-5p, hsa-miR-3184-3p, hsa-miR-320a-3p, hsa-miR-320b, hsa-miR-320c, hsa-miR-339-5p, hsa-miR-342-3p, hsa-miR-375-3p, hsa-miR-378a-3p, hsa-miR-378c, hsa-miR-423-5p, hsa-miR-425-5p, hsa-miR-451a, hsa-miR-4635, hsa-miR-4685-5p, hsa-miR-4771, hsa-miR-484, hsa-miR-486-3p, hsa-miR-486-5p, hsa-miR-532-5p, hsa-miR-574-5p, hsa-miR-629-5p, hsa-miR-6873-3p, hsa-miR-7847-3p, hsa-miR-8485, hsa-miR-92a-3p, hsa-miR-93-5p, hsa-miR-98-5p, or any combination thereof, is used to determine endometrial receptivity stage.

In some embodiments, expression of one or more miRNA selected from hsa-let-7b-5p, hsa-let-7g-5p, hsa-miR-423-5p, hsa-miR-5585-5p, hsa-miR-629-5p, hsa-miR-3960, hsa-miR-191-5p, hsa-let-7d-5p, has-miR-122-5p, hsa-miR-375-3p, hsa-miR-143-3p, hsa-miR-12116, or any combination thereof, is used to determine endometrial receptivity stage. In some embodiments, expression of one or more miRNA selected from hsa-let-7b-5p, hsa-let-7g-5p, hsa-miR-423-5p, or any combination thereof, is used to determine endometrial receptivity stage. In some embodiments, expression of one or more miRNA selected from hsa-miR-5585-5p, hsa-miR-629-5p, hsa-miR-3960, hsa-miR-191-5p, hsa-let-7d-5p, has-miR-122-5p, or any combination thereof, is used to determine endometrial receptivity stage. In some embodiments, expression of one or more miRNA selected from hsa-miR-375-3p, hsa-miR-143-3p, hsa-miR-12116, or any combination thereof, is used to determine endometrial receptivity stage. In some embodiments, expression of one or more miRNA selected from hsa-miR-375-3p, hsa-miR-143-3p, hsa-let-7d-5p, hsa-let-7g-5p, hsa-miR-191-5p and hsa-miR-423-5p, or any combination thereof, is used to determine endometrial receptivity stage.

In some embodiments, expression of hsa-let-7b-5p, hsa-let-7g-5p, hsa-miR-423-5p, or any combination thereof is reduced in the receptive stage relative to expression in the pre-receptive stage. In some embodiments, expression of hsa-let-7b-5p, hsa-let-7g-5p, hsa-miR-423-5p, or any combination thereof is reduced in the post-receptive stage relative to expression in the receptive stage. In some embodiments, expression of hsa-let-7b-5p, hsa-let-7g-5p, hsa-miR-423-5p, or any combination thereof is reduced in the post-receptive stage relative to expression in the pre-receptive stage. In some embodiments, expression of hsa-let-7b-5p, hsa-let-7g-5p, hsa-miR-423-5p, or any combination thereof is reduced in the receptive stage and post-receptive stage relative to expression in the pre-receptive stage.

In some embodiments, expression of hsa-let-7b-5p is reduced in the receptive stage relative to expression in the pre-receptive stage. In some embodiments, expression of hsa-let-7b-5p is reduced in the post-receptive stage relative to expression in the receptive stage. In some embodiments, expression of hsa-let-7b-5p, is reduced in the post-receptive stage relative to expression in the pre-receptive stage. In some embodiments, expression of hsa-let-7b-5p is reduced in the receptive stage and post-receptive stage relative to expression in the pre-receptive stage.

In some embodiments, expression of hsa-miR-423-5p is reduced in the receptive stage relative to expression in the pre-receptive stage. In some embodiments, expression of hsa-miR-423-5p is reduced in the post-receptive stage relative to expression in the receptive stage. In some embodiments, expression of hsa-miR-423-5p, is reduced in the post-receptive stage relative to expression in the pre-receptive stage. In some embodiments, expression of hsa-miR-423-5p is reduced in the receptive stage and post-receptive stage relative to expression in the pre-receptive stage.

In some embodiments, expression of hsa-let-7g-5p is reduced in the receptive stage relative to expression in the pre-receptive stage. In some embodiments, expression of hsa-let-7g-5p is reduced in the post-receptive stage relative to expression in the receptive stage. In some embodiments, expression of hsa-let-7g-5p, is reduced in the post-receptive stage relative to expression in the pre-receptive stage. In some embodiments, expression of hsa-let-7g-5p is reduced in the receptive stage and post-receptive stage relative to expression in the pre-receptive stage.

In some embodiments, expression of hsa-miR-5585-5p, hsa-miR-629-5p, hsa-miR-3960, hsa-miR-191-5p, hsa-let-7d-5p, or any combination thereof is reduced in the post-receptive stage relative to the pre-receptive stage and receptive stage. In some embodiments, expression of hsa-miR-5585-5p, hsa-miR-629-5p, hsa-miR-3960, hsa-miR-191-5p, hsa-let-7d-5p, or any combination thereof is reduced in the post-receptive stage relative to the pre-receptive stage. In some embodiments, expression of hsa-miR-5585-5p, hsa-miR-629-5p, hsa-miR-3960, hsa-miR-191-5p, hsa-let-7d-5p, or any combination thereof is reduced in the post-receptive stage relative to the receptive stage. In some embodiments, expression of hsa-miR-122-5p is increased in the post-receptive stage relative to the pre-receptive stage and receptive stage. In some embodiments, expression of hsa-miR-122-5p is increased in the post-receptive stage relative to the pre-receptive stage. In some embodiments, expression of hsa-miR-122-5p is increased in the post-receptive stage relative to the receptive stage.

In some embodiments, expression of hsa-miR-5585-5p is reduced in the post-receptive stage relative to the pre-receptive stage and receptive stage. In some embodiments, expression of hsa-miR-5585-5p is reduced in the post-receptive stage relative to the pre-receptive stage. In some embodiments, expression of hsa-miR-5585-5p is reduced in the post-receptive stage relative to the receptive stage. In some embodiments, expression of hsa-miR-5585-5p is reduced in the post-receptive stage relative to the pre-receptive stage and receptive stage. In some embodiments, expression of hsa-miR-5585-5p is reduced in the post-receptive stage relative to the pre-receptive stage. In some embodiments, expression of hsa-miR-5585-5p is reduced in the post-receptive stage relative to the receptive stage. In some embodiments, expression of hsa-miR-629-5p is reduced in the post-receptive stage relative to the pre-receptive stage and receptive stage. In some embodiments, expression of hsa-miR-629-5p is reduced in the post-receptive stage relative to the pre-receptive stage. In some embodiments, expression of hsa-miR-629-5p is reduced in the post-receptive stage relative to the receptive stage. In some embodiments, expression of hsa-miR-629-5p is reduced in the post-receptive stage relative to the pre-receptive stage and receptive stage. In some embodiments, expression of hsa-miR-629-5p is reduced in the post-receptive stage relative to the pre-receptive stage. In some embodiments, expression of hsa-miR-629-5p is reduced in the post-receptive stage relative to the receptive stage. In some embodiments, expression of hsa-miR-3960 is reduced in the post-receptive stage relative to the pre-receptive stage and receptive stage. In some embodiments, expression of hsa-miR-3960 is reduced in the post-receptive stage relative to the pre-receptive stage. In some embodiments, expression of hsa-miR-3960 is reduced in the post-receptive stage relative to the receptive stage. In some embodiments, expression of hsa-miR-3960 is reduced in the post-receptive stage relative to the pre-receptive stage and receptive stage. In some embodiments, expression of hsa-miR-3960 is reduced in the post-receptive stage relative to the pre-receptive stage. In some embodiments, expression of hsa-miR-3960 is reduced in the post-receptive stage relative to the receptive stage. In some embodiments, expression of hsa-miR-191-5p is reduced in the post-receptive stage relative to the pre-receptive stage and receptive stage. In some embodiments, expression of hsa-miR-191-5p is reduced in the post-receptive stage relative to the pre-receptive stage. In some embodiments, expression of hsa-miR-191-5p is reduced in the post-receptive stage relative to the receptive stage. In some embodiments, expression of hsa-miR-191-5p is reduced in the post-receptive stage relative to the pre-receptive stage and receptive stage. In some embodiments, expression of hsa-miR-191-5p is reduced in the post-receptive stage relative to the pre-receptive stage. In some embodiments, expression of hsa-miR-191-5p is reduced in the post-receptive stage relative to the receptive stage. In some embodiments, expression of hsa-let-7d-5p is reduced in the post-receptive stage relative to the pre-receptive stage and receptive stage. In some embodiments, expression of hsa-let-7d-5p is reduced in the post-receptive stage relative to the pre-receptive stage. In some embodiments, expression of hsa-let-7d-5p is reduced in the post-receptive stage relative to the receptive stage. In some embodiments, expression of hsa-let-7d-5p is reduced in the post-receptive stage relative to the pre-receptive stage and receptive stage. In some embodiments, expression of hsa-let-7d-5p is reduced in the post-receptive stage relative to the pre-receptive stage. In some embodiments, expression of hsa-let-7d-5p is reduced in the post-receptive stage relative to the receptive stage.

In some embodiments, expression of hsa-miR-375-3p, hsa-miR-143-3p, hsa-miR-12116, or any combination thereof is increased in the pre-receptive stage relative to expression in the receptive stage. In some embodiments, expression of hsa-miR-375-3p, hsa-miR-143-3p, hsa-miR-12116, or any combination thereof is decreased in the receptive stage relative to expression in the pre-receptive stage. In some embodiments, expression of hsa-miR-375-3p is increased in the pre-receptive stage relative to expression in the receptive stage. In some embodiments, expression of hsa-miR-143-3p is increased in the pre-receptive stage relative to expression in the receptive stage. In some embodiments, expression of hsa-miR-12116 is increased in the pre-receptive stage relative to expression in the receptive stage. In some embodiments, expression of hsa-miR-375-3p, hsa-miR-143-3p, hsa-miR-12116, or any combination thereof is the same between the receptive stage and post-receptive stage. In some embodiments, expression of hsa-miR-375-3p is the same between the receptive stage and post-receptive stage. In some embodiments, expression of hsa-miR-143-3p is the same between the receptive stage and post-receptive stage. In some embodiments, expression of hsa-miR-12116 is the same between the receptive stage and post-receptive stage.

In some embodiments, the miRNA measured by the Optimal Receptivity Assay (ORA®) method are involved in one or more of the biological functions of gland development, response to oxygen levels, cell cycle GI/S phase transition, response to decreased oxygen levels, response to hypoxia, GI.A transition of mitotic cell cycle, mitotic cell cycle phase transition, epithelial cell proliferation, cellular response to oxygen levels, regulation of apoptotic signaling pathway, cell proliferation, cell cycle phase, utero embryonic development, cell migration, or any combination thereof. In some embodiments, the miRNA measured by the Optimal Receptivity Assay (ORA®) method are involved in one or more of the biological functions of gland development, response to oxygen levels, cell cycle GI/S phase transition, response to decreased oxygen levels, response to hypoxia, GI.A transition of mitotic cell cycle, mitotic cell cycle phase transition, epithelial cell proliferation, cellular response to oxygen levels, regulation of apoptotic signaling pathway, cell proliferation, cell cycle phase, utero embryonic development, cell migration, decidualiztion or any combination thereof. In some embodiments, the miRNA measured by the Optimal Receptivity Assay (ORA®) method are involved in gland development. In some embodiments, the miRNA measured by the Optimal Receptivity Assay (ORA®) method are involved in response to oxygen levels. In some embodiments, the miRNA measured by the Optimal Receptivity Assay (ORA®) method are involved in cell cycle GI/S phase transition. In some embodiments, the miRNA measured by the Optimal Receptivity Assay (ORA®) method are involved in response to decreased oxygen levels. In some embodiments, the miRNA measured by the Optimal Receptivity Assay (ORA®) method are involved in response to hypoxia. In some embodiments, the miRNA measured by the Optimal Receptivity Assay (ORA®) method are involved in decidualization. In some embodiments, the miRNA measured by the Optimal Receptivity Assay (ORA®) method are involved in GI.A transition of mitotic cell cycle. In some embodiments, the miRNA measured by the Optimal Receptivity Assay (ORA®) method are involved in mitotic cell cycle phase transition. In some embodiments, the miRNA measured by the Optimal Receptivity Assay (ORA®) method are involved in epithelial cell proliferation. In some embodiments, the miRNA measured by the Optimal Receptivity Assay (ORA®) method are involved in cellular response to oxygen levels. In some embodiments, the miRNA measured by the Optimal Receptivity Assay (ORA®) method are involved in regulation of apoptotic signaling pathway. In some embodiments, the miRNA measured by the Optimal Receptivity Assay (ORA®) method are involved in cell proliferation. In some embodiments, the miRNA measured by the Optimal Receptivity Assay (ORA®) method are involved in cell cycle phase. In some embodiments, the miRNA measured by the Optimal Receptivity Assay (ORA®) method are involved in utero embryonic development. In some embodiments, the miRNA measured by the Optimal Receptivity Assay (ORA®) method are involved in cell migration.

In some embodiments, endometrial receptivity is determined using one or more of the following steps:
Blood Draw: Blood is collected from a subject. In some embodiments, blood is drawn during a hormone replacement therapy cycle or a natural cycle. Blood is collected either after 4 days (96 hours) and 5 days (120 hours) of progesterone administration in an HRT cycle, or after 6 days (144 hours) and 7 days (168 hours) from the time an LH surge is detected or from when human chorionic gonadotropic (hGC) is administered in a natural cycle). Blood samples are collected using at least a 21 g needle to minimize hemolysis. Hemolysis is monitored during the pre-processing steps while processing the blood into plasma as hemolysis will skew the data analysis.

Pre-processing: Whole blood is processed into plasma. This step is performed at the clinic where the blood is drawn. Hemolysis is monitored during the pre-processing step as hemolysis will skew the data analysis.

Sample Extraction: The pre-processed plasma is then sent to a laboratory for RNA extraction.

Library Preparation: The extracted miRNA is prepared for Next-Generation Sequencing Sequencing: Next Generation Sequencing is performed on the sample Data Analysis: miRNA measured in the sample is analyzed using the Optimal Receptivity Assay (ORA®) predictive model Final Report: Based on the Optimal Receptivity Assay (ORA®) analysis, samples are placed into one or four endometrium status groups, an inconclusive group, or an invalid/insufficient RNA group (less than 1 percent of samples results in an inconclusive or invalid/insufficient RNA result using the Optimal Receptivity Assay (ORA®) method); the six groups are described as follows:
  a. pre-receptive: The endometrium is not yet ready for embryo implantation and implanting at the time at which this blood draw was performed may not be ideal. It is recommended to delay the embryo implantation time during the next treatment cycle. Embryo transfer may be delayed by 24 hours.
  b. receptive: The optimal time for embryo transfer is at the time at which the blood draw was performed
  c. post-receptive (short window): The endometrium has passed the optimal time for embryo implantation. It is recommended to adjust the timing of embryo implantation during the next treatment cycle by moving forward by 12 hours.
  d. post-receptive (average window): The endometrium has passed the optimal time for embryo implantation. It is recommended to adjust the timing of embryo implantation during the next treatment cycle by moving forward by 24 hours.
  e. Inconclusive: The resulting data does not match ORA's model of Optimal Receptivity Assay (ORA®) and database and is unable to proceed with analysis. This could be due to existing physiological conditions or variations that have occurred during the sample submission process
  f. Invalid/insufficient RNA: Results cannot be obtained due to the low concentration of the extracted material (miRNA). The blood draw should be performed again in hopes of obtaining higher concentration to proceed with Optimal Receptivity Assay (ORA®)

Embryo transfer: The healthcare provide performs embryo transfer during next treatment cycle according to Optimal Receptivity Assay (ORA®) test results.

In some embodiments, endometrial receptivity is determined using one or more of the following steps:
  i) blood is collected from a subject, wherein the blood is drawn during a hormone replacement therapy cycle or a natural cycle, wherein
    a) blood is collected either after 4 days (96 hours) and 5 days (120 hours) of progesterone administration in an HRT cycle, or
    b) after 6 days (144 hours) and 7 days (168 hours) from the time an LH surge is detected or from when human chorionic gonadotropic (hGC) is administered in a natural cycle),
    and wherein the blood sample is collected using at least a 21 g needle to minimize hemolysis;
  ii) the blood is processed into plasma in a clinic where the blood is drawn and hemolysis is hemolysis is monitored;
  iii) the processed plasma is sent to a laboratory for RNA extraction and sequencing comprising the steps of
    a) miRNA extraction,
    b) library preparation, and
    c) Next-Generation sequencing;
  iv) sequenced miRNA is analyzed using the Optimal Receptivity Assay (ORA®) predictive method described herein;
  v) the blood sample is categorized as one of the following:
    a) pre-receptive, wherein it is recommended to delay the embryo implantation time during the next treatment cycle, wherein embryo transfer may be delayed by 24 hours;
    b) receptive, wherein the optimal time for embryo transfer is at the time at which the blood draw was performed;
    c) post-receptive short window, wherein it is recommended to adjust the timing of embryo implantation during the next treatment cycle by moving forward by 12 hours;
    d) post-receptive average window, wherein it is recommended to adjust the timing of embryo implantation during the next treatment cycle by moving forward by 24 hours;
    e) Inconclusive, wherein the resulting data is not able to determine receptivity;
    f) Invalid/insufficient RNA, wherein results cannot be obtained due to the low concentration of the extracted material (miRNA); and,
  vi) a healthcare provider performs embryo transfer during the next treatment cycle according to the results determined in steps i)-v).

Applications of the Methods According to this Disclosure

In some embodiments, the present disclosure provides methods for determining an endometrial status, using a sample, for example, an endometrial biopsy, comprising: (a) performing an assay on the blood sample from a subject to determine a miRNA expression profile of the blood sample, wherein the miRNA expression profile comprises expression levels of a plurality of miRNAs, for example, 281 miRNAs selected from those described in Table 7; and (b) analyzing the miRNA expression profile to obtain a receptivity predictive score using, for example, a computer-based method.

Methods of the present disclosure can be used for various diagnostic and therapeutic purposes, including but not limited to IVF treatment. For example, in some embodiments, based on the endometrial results, the methods may further include transferring an embryo in the subject or administering one or more treatments to the subject who suffers or suffered from an implantation failure. For example, in some embodiments, based on the endometrial results, the methods may further include implanting an embryo in the subject or administering one or more treatments to the subject who suffers or suffered from an implantation failure.

In some embodiments, the present disclosure provides methods of detecting endometrial receptivity for embryo transfer, comprising: (a) performing an assay on a blood sample from a subject to determine a miRNA expression profile of the blood sample, wherein the miRNA expression profile comprises expression levels of a plurality of miR-NAs, for example, 281 miRNAs selected from those described in Table 7, (b) analyzing the miRNA expression profile to obtain a receptivity predictive score, wherein the receptivity predictive score determines whether the subject has endometrial receptivity, and (c) transferring an embryo to the endometrium of the subject determined to have endometrial receptivity.

In some embodiments, the present disclosure provides methods of detecting endometrial receptivity for embryo implantation, comprising: (a) performing an assay on a blood sample from a subject to determine a miRNA expression profile of the blood sample, wherein the miRNA expression profile comprises expression levels of a plurality of miRNAs, for example, 281 miRNAs selected from those described in Table 7, (b) analyzing the miRNA expression profile to obtain a receptivity predictive score, wherein the receptivity predictive score determines whether the subject has endometrial receptivity, and (c) transferring an embryo to the endometrium of the subject determined to have endometrial receptivity.

In some embodiments, the methods of determining an endometrial status can be used to determine the timing of embryo transfer to a subject. In some embodiments, if the endometrial status is at the receptive state, the subject is considered suitable for embryo transfer. In some embodiments, if the endometrial status is at the pre-receptive or the post-receptive state, the subject is considered not suitable for embryo transfer. In some embodiments, when the endometrial status is determined to be at the pre-receptive state or the post-receptive state, the present disclosure provides methods for embryo transfer based on the information on the endometrial status. For example, in some embodiments, if the endometrial status is determined to be at the pre-receptive state, during the next cycle, embryo transfer is performed between 5.5 and 7.5 days following progesterone administration. In some embodiments, if the endometrial status is determined to be at the pre-receptive state, during the next cycle, embryo transfer is performed at about 5.5 to about 7.5 days. In some embodiments, if the endometrial status is determined to be at the pre-receptive state, during the next cycle, embryo transfer is performed at 5.5 to 7.5 days. In some embodiments, if the endometrial status is determined to be at the pre-receptive state, during the next cycle, embryo transfer is performed between 5 and 8 days. In some embodiments, if the endometrial status is determined to be at the pre-receptive state, during the next cycle, embryo transfer is performed at about 5 to about 8 days. In some embodiments, if the endometrial status is determined to be at the pre-receptive state, during the next cycle, embryo transfer is performed at 5 to 8 days. In some embodiments, if the endometrial status is determined to be at the pre-receptive state, embryo transfer is delayed by 24-hours. In some embodiments, if the endometrial status is determined to be at the pre-receptive state, during the next cycle, embryo transfer is performed about 5 days after progesterone administration. In some embodiments, if the endometrial status is determined to be at the pre-receptive state, during the next cycle, embryo transfer is performed about 5.5 days after progesterone administration. In some embodiments, if the endometrial status is determined to be at the pre-receptive state, during the next cycle, embryo transfer is performed about 6 days after progesterone administration. In some embodiments, if the endometrial status is determined to be at the pre-receptive state, during the next cycle, embryo transfer is performed about 6.5 days after progesterone administration. In some embodiments, if the endometrial status is determined to be at the pre-receptive state, during the next cycle, embryo transfer is performed about 7 days after progesterone administration. In some embodiments, if the endometrial status is determined to be at the pre-receptive state, during the next cycle, embryo transfer is performed about 7.5 days after progesterone administration. In some embodiments, if the endometrial status is determined to be at the pre-receptive state, during the next cycle, embryo transfer is performed about 8 days after progesterone administration. In some embodiments, if the endometrial status is determined to be at the pre-receptive state, during the next cycle, embryo transfer is performed 5 days after progesterone administration. In some embodiments, if the endometrial status is determined to be at the pre-receptive state, during the next cycle, embryo transfer is performed 5.5 days after progesterone administration. In some embodiments, if the endometrial status is determined to be at the pre-receptive state, during the next cycle, embryo transfer is performed 6 days after progesterone administration. In some embodiments, if the endometrial status is determined to be at the pre-receptive state, during the next cycle, embryo transfer is performed 6.5 days after progesterone administration. In some embodiments, if the endometrial status is determined to be at the pre-receptive state, during the next cycle, embryo transfer is performed 7 days after progesterone administration. In some embodiments, if the endometrial status is determined to be at the pre-receptive state, during the next cycle, embryo transfer is performed 7.5 days after progesterone administration. In some embodiments, if the endometrial status is determined to be at the pre-receptive state, during the next cycle, embryo transfer is performed 8 days after progesterone administration.

In some embodiments, the methods of determining an endometrial status can be used to determine the timing of embryo implantation in a subject. In some embodiments, if the endometrial status is at the receptive state, the subject is considered suitable for embryo implantation. In some embodiments, if the endometrial status is at the pre-receptive or the post-receptive state, the subject is considered not suitable for embryo implantation. In some embodiments, when the endometrial status is determined to be at the pre-receptive state or the post-receptive state, the present disclosure provides methods for embryo implantation based on the information on the endometrial status. For example, in some embodiments, if the endometrial status is determined to be at the pre-receptive state, during the next cycle, embryo implantation is performed between 5.5 and 7.5 days following progesterone administration. In some embodiments, if the endometrial status is determined to be at the pre-receptive state, during the next cycle, embryo implantation is performed at about 5.5 to about 7.5 days. In some embodiments, if the endometrial status is determined to be at the pre-receptive state, during the next cycle, embryo implantation is performed at 5.5 to 7.5 days. In some embodiments, if the endometrial status is determined to be at the pre-receptive state, during the next cycle, embryo implantation is performed between 5 and 8 days. In some embodiments, if the endometrial status is determined to be at the pre-receptive state, during the next cycle, embryo implantation is performed at about 5 to about 8 days. In some embodiments, if the endometrial status is determined to be at the pre-receptive state, during the next cycle, embryo implantation is performed at 5 to 8 days. In some embodiments, if the endometrial status is determined to be at the pre-receptive state, embryo transfer is delayed by 24-hours. In some embodiments, if the endometrial status is determined to be at the pre-receptive state, during the next cycle, embryo implantation is performed about 5 days after progesterone administration. In some embodiments, if the endometrial status is determined to be at the pre-receptive state, during the next cycle, embryo implantation is performed about 5.5 days after progesterone administration. In some embodiments, if the endometrial status is determined to be at the pre-receptive state, during the next cycle, embryo implantation is performed about 6 days after progesterone administration. In some embodiments, if the endometrial status is determined to be at the pre-receptive state, during the next cycle, embryo implantation is performed about 6.5 days after progesterone administration. In some embodiments, if the endometrial status is determined to be at the pre-receptive state, during the next cycle, embryo implantation is performed about 7 days after progesterone administration. In some embodiments, if the endometrial status is determined to be at the pre-receptive state, during the next cycle, embryo implantation is performed about 7.5 days after progesterone administration. In some embodiments, if the endometrial status is determined to be at the pre-receptive state, during the next cycle, embryo implantation is performed about 8 days after progesterone administration. In some embodiments, if the endometrial status is determined to be at the pre-receptive state, during the next cycle, embryo implantation is performed 5 days after progesterone administration. In some embodiments, if the endometrial status is determined to be at the pre-receptive state, during the next cycle, embryo implantation is performed 5.5 days after progesterone administration. In some embodiments, if the endometrial status is determined to be at the pre-receptive state, during the next cycle, embryo implantation is performed 6 days after progesterone administration. In some embodiments, if the endometrial status is determined to be at the pre-receptive state, during the next cycle, embryo implantation is performed 6.5 days after progesterone administration. In some embodiments, if the endometrial status is determined to be at the pre-receptive state, during the next cycle, embryo implantation is performed 7 days after progesterone administration. In some embodiments, if the endometrial status is determined to be at the pre-receptive state, during the next cycle, embryo implantation is performed 7.5 days after progesterone administration. In some embodiments, if the endometrial status is determined to be at the pre-receptive state, during the next cycle, embryo implantation is performed 8 days after progesterone administration.

In some embodiments, if the endometrial status is determined to be at the post-receptive state, during the next cycle, embryo transfer is performed between 2.5 and 4.5 days, for example, 2.5, 3, 3.5, 4, or 4.5 days after a progesterone administration. In some embodiments, if the endometrial status is determined to be at the post-receptive state, during the next cycle, embryo transfer is performed at about 2.5 to about 4.5 days. In some embodiments, if the endometrial status is determined to be at the post-receptive state, during the next cycle, embryo transfer is performed at 2.5 to 4.5 days. In some embodiments, if the endometrial status is determined to be in the post-receptive state, embryo transfer is moved forward by 12 hours. In some embodiments, if the endometrial status is determined to be in the post-receptive state, embryo transfer is moved forward by 24 hours. In some embodiments, if the endometrial status is determined to be in the post-receptive state, embryo transfer is performed about 2.5 days after progesterone administration. In some embodiments, if the endometrial status is determined to be in the post-receptive state, embryo transfer is performed about 3 days after progesterone administration. In some embodiments, if the endometrial status is determined to be in the post-receptive state, embryo transfer is performed about 3.5 days after progesterone administration. In some embodiments, if the endometrial status is determined to be in the post-receptive state, embryo transfer is performed about 4 days after progesterone administration. In some embodiments, if the endometrial status is determined to be in the post-receptive state, embryo transfer is performed about 4.5 days after progesterone administration. In some embodiments, if the endometrial status is determined to be in the post-receptive state, embryo transfer is performed 2.5 days after progesterone administration. In some embodiments, if the endometrial status is determined to be in the post-receptive state, embryo transfer is performed 3 days after progesterone administration. In some embodiments, if the endometrial status is determined to be in the post-receptive state, embryo transfer is performed 3.5 days after progesterone administration. In some embodiments, if the endometrial status is determined to be in the post-receptive state, embryo transfer is performed 4 days after progesterone administration. In some embodiments, if the endometrial status is determined to be in the post-receptive state, embryo transfer is performed 4.5 days after progesterone administration.

In some embodiments, if the endometrial status is determined to be at the post-receptive state, during the next cycle, embryo implantation is performed between 2.5 and 4.5 days, for example, 2.5, 3, 3.5, 4, or 4.5 days after a progesterone administration. In some embodiments, if the endometrial status is determined to be at the post-receptive state, during the next cycle, embryo implantation is performed at about 2.5 to about 4.5 days. In some embodiments, if the endometrial status is determined to be at the post-receptive state, during the next cycle, embryo implantation is performed at 2.5 to 4.5 days. In some embodiments, if the endometrial status is determined to be in the post-receptive state, embryo transfer is moved forward by 12 hours. In some embodiments, if the endometrial status is determined to be in the post-receptive state, embryo transfer is moved forward by 24 hours. In some embodiments, if the endometrial status is determined to be in the post-receptive state, embryo transfer is performed about 2.5 days after progesterone administration. In some embodiments, if the endometrial status is determined to be in the post-receptive state, embryo transfer is performed about 3 days after progesterone administration. In some embodiments, if the endometrial status is determined to be in the post-receptive state, embryo transfer is performed about 3.5 days after progesterone administration. In some embodiments, if the endometrial status is determined to be in the post-receptive state, embryo transfer is performed about 4 days after progesterone administration. In some embodiments, if the endometrial status is determined to be in the post-receptive state, embryo transfer is performed about 4.5 days after progesterone administration. In some embodiments, if the endometrial status is determined to be in the post-receptive state, embryo transfer is performed 2.5 days after progesterone administration. In some embodiments, if the endometrial status is determined to be in the post-receptive state, embryo transfer is performed 3 days after progesterone administration. In some embodiments, if the endometrial status is determined to be in the post-receptive state, embryo transfer is performed 3.5 days after progesterone administration. In some embodiments, if the endometrial status is determined to be in the post-receptive state, embryo transfer is performed 4 days after progesterone administration. In some embodiments, if the endometrial status is determined to be in the post-receptive state, embryo transfer is performed 4.5 days after progesterone administration.

In some embodiments, when the endometrium shows a non-receptive state at the time of the sampling, the information gained is instructive, such that the method can be repeated by taking a blood sample at another time, modified in line with the results of the first determination. By way of example, if the endometrial status is at the pre-receptive state, the next time point of taking the blood sample can be more than seven days after an endogenous LH surge or more than five days after a progesterone administration. For example, the next point of taking the blood sample can be between 7.5 and 10.5 days, for example, 7.5, 8, 8.5, 9, 9.5, 10, or 10.5 days after an endogenous LH surge or between 5.5 and 7.5 days, for example, 5.5, 6, 6.5, 7, or 7.5 days after a progesterone administration. Alternatively, in some embodiments, if the endometrial status is at the post-receptive state, the next time point of taking the blood sample can be fewer than seven days after an endogenous LH surge or fewer than five days after a progesterone administration. For example, the next point of taking the blood sample can be between 3.5 and 6.5 days, for example, 3.5, 4, 4.5, 5, 5.5, 6, or 6.5 days after an endogenous LH surge or between 2.5 and 4.5 days, for example, 2.5, 3, 3.5, 4, or 4.5 days after a progesterone administration. In some embodiments, by following these procedures, a receptive state can be identified, and the success rate of the IVF treatment can be improved. In some embodiments, the subject suffers or suffered from an implantation failure. In some embodiments, the subject is undergoing IVF treatment. In some embodiments, the subject is undergoing assisted reproductive technology (ART) treatment. In some embodiments, the assisted reproductive technology is in vitro fertilization-embryo transfer (IVF-ET). In some embodiments, the assisted reproductive technology is gamete intrafallopian transfer (GIFT). In some embodiments, the assisted reproductive technology is zygote intrafallopian transfer (ZIFT). In some embodiments, the assisted reproductive technology is frozen embryo transfer (FET). In some embodiments, the assisted reproductive technology is fresh embryo transfer.

In some embodiments, IVF treatment includes fresh embryo transfer. In some embodiments, IVF treatment includes frozen embryo transfer (FET).

In some embodiments, if the endometrial status is determined to be at the pre-receptive state or the post-receptive state, the method of determining an endometrial status can be repeated at least once or until the endometrial status is determined to be at the receptive state.

In some embodiments, the methods of determining an endometrial status according to this disclosure can be used to determine the WOI of a subject. In some embodiments, the methods according to this disclosure can be used to classify a subject's responsiveness to the IVF treatment. For any one of these uses, in some embodiments, the subject suffers or suffered from an implantation failure. In some embodiments, the subject is undergoing an IVF treatment. In some embodiments, the subject is undergoing assisted reproductive technology treatment.

In some embodiments, the methods of determining an endometrial status according to this disclosure can be used as a valuable tool for investigating the effects of pregnancy drugs on the endometrium of a subject. In these embodiments, the subject suffers or suffered from an implantation failure. In some embodiments, the subject is undergoing an IVF treatment.

In some embodiments, the methods of determining an endometrial status according to this disclosure increase overall implantation rate during in vitro fertilization treatment cycles in a patient. In some embodiments, the methods of determining an endometrial status according to this disclosure increase overall implantation rate during in vitro fertilization treatment cycles in a population of subjects.

In some embodiments, the methods of determining an endometrial status according to this disclosure increase overall implantation success during in vitro fertilization treatment cycles in a subject by 5%-90% relative to the implantation success of a subject undergoing in vitro fertilization treatment cycles without using the methods of determining an endometrial status described herein. In some embodiments, the methods of determining an endometrial status according to this disclosure increase overall implantation success during in vitro fertilization treatment cycles in a subject by 50%-90% relative to the implantation success of a subject undergoing in vitro fertilization treatment cycles without using the methods of determining an endometrial status described herein. In some embodiments, the methods of determining an endometrial status according to this disclosure increase overall implantation success during in vitro fertilization treatment cycles in a subject by 5%, 10%, 20%, 30%, 40%, 50%, 60%, 70%, 80%, 90%, 95%, or 99% relative to the implantation success of a subject undergoing in vitro fertilization treatment cycles without using the methods of determining an endometrial status described herein. In some embodiments, the methods of determining an endometrial status according to this disclosure increase overall implantation success during in vitro fertilization treatment cycles in a subject by about 5%, about 10%, about 20%, about 30%, about 40%, about 50%, about 60%, about 70%, about 80%, about 90%, about 95%, or about 99% relative to the implantation success of a subject undergoing in vitro fertilization treatment cycles without using the methods of determining an endometrial status described herein.

In some embodiments, the methods of determining an endometrial status according to this disclosure increase overall implantation success during in vitro fertilization treatment cycles in a subject by at least 5% relative to the implantation success of a subject undergoing in vitro fertilization treatment cycles without using the methods of determining an endometrial status described herein. In some embodiments, the methods of determining an endometrial status according to this disclosure increase overall implantation success during in vitro fertilization treatment cycles in a subject by at least 10% relative to the implantation success of a subject undergoing in vitro fertilization treatment cycles without using the methods of determining an endometrial status described herein. In some embodiments, the methods of determining an endometrial status according to this disclosure increase overall implantation success during in vitro fertilization treatment cycles in a subject by at least 20% relative to the implantation success of a subject undergoing in vitro fertilization treatment cycles without using the methods of determining an endometrial status described herein. In some embodiments, the methods of determining an endometrial status according to this disclosure increase overall implantation success during in vitro fertilization treatment cycles in a subject by at least 30% relative to the implantation success of a subject undergoing in vitro fertilization treatment cycles without using the methods of determining an endometrial status described herein. In some embodiments, the methods of determining an endometrial status according to this disclosure increase overall implantation success during in vitro fertilization treatment cycles in a subject by at least 40% relative to the implantation success of a subject undergoing in vitro fertilization treatment cycles without using the methods of determining an endometrial status described herein. In some embodiments, the methods of determining an endometrial status according to this disclosure increase overall implantation success during in vitro fertilization treatment cycles in a subject by at least 50% relative to the implantation success of a subject undergoing in vitro fertilization treatment cycles without using the methods of determining an endometrial status described herein. In some embodiments, the methods of determining an endometrial status according to this disclosure increase overall implantation success during in vitro fertilization treatment cycles in a subject by at least 60% relative to the implantation success of a subject undergoing in vitro fertilization treatment cycles without using the methods of determining an endometrial status described herein. In some embodiments, the methods of determining an endometrial status according to this disclosure increase overall implantation success during in vitro fertilization treatment cycles in a subject by at least 70% relative to the implantation success of a subject undergoing in vitro fertilization treatment cycles without using the methods of determining an endometrial status described herein. In some embodiments, the methods of determining an endometrial status according to this disclosure increase overall implantation success during in vitro fertilization treatment cycles in a subject by at least 80% relative to the implantation success of a subject undergoing in vitro fertilization treatment cycles without using the methods of determining an endometrial status described herein. In some embodiments, the methods of determining an endometrial status according to this disclosure increase overall implantation success during in vitro fertilization treatment cycles in a subject by at least 90% relative to the implantation success of a subject undergoing in vitro fertilization treatment cycles without using the methods of determining an endometrial status described herein.

In some embodiments, the methods of determining an endometrial status according to this disclosure increase overall implantation rate during in vitro fertilization treatment cycles in a population of subjects by 5%-90% relative to the implantation rate of a population of subjects undergoing in vitro fertilization treatment cycles without using the methods of determining an endometrial status described herein. In some embodiments, the methods of determining an endometrial status according to this disclosure increase overall implantation rate during in vitro fertilization treatment cycles in a population of subjects by 50%-90% relative to the implantation rate of a population of subjects undergoing in vitro fertilization treatment cycles without using the methods of determining an endometrial status described herein. In some embodiments, the methods of determining an endometrial status according to this disclosure increase overall implantation rate during in vitro fertilization treatment cycles in a population of subjects by 5%, 10%, 20%, 30%, 40%, 50%, 60%, 70%, 80%, 90%, 95%, or 99% relative to the implantation rate of a population of subjects undergoing in vitro fertilization treatment cycles without using the methods of determining an endometrial status described herein. In some embodiments, the methods of determining an endometrial status according to this disclosure increase overall implantation rate during in vitro fertilization treatment cycles in a population of subjects by about 5%, about 10%, about 20%, about 30%, about 40%, about 50%, about 60%, about 70%, about 80%, about 90%, about 95%, or about 99% relative to the implantation rate of a population of subjects undergoing in vitro fertilization treatment cycles without using the methods of determining an endometrial status described herein.

In some embodiments, the methods of determining an endometrial status according to this disclosure increase overall implantation rate during in vitro fertilization treatment cycles in a population of subjects by at least 5% relative to the implantation rate of a population of subjects undergoing in vitro fertilization treatment cycles without using the methods of determining an endometrial status described herein. In some embodiments, the methods of determining an endometrial status according to this disclosure increase overall implantation rate during in vitro fertilization treatment cycles in a population of subjects by at least 10% relative to the implantation rate of a population of subjects undergoing in vitro fertilization treatment cycles without using the methods of determining an endometrial status described herein. In some embodiments, the methods of determining an endometrial status according to this disclosure increase overall implantation rate during in vitro fertilization treatment cycles in a population of subjects by at least 20% relative to the implantation rate of a population of subjects undergoing in vitro fertilization treatment cycles without using the methods of determining an endometrial status described herein. In some embodiments, the methods of determining an endometrial status according to this disclosure increase overall implantation rate during in vitro fertilization treatment cycles in a population of subjects by at least 30% relative to the implantation rate of a population of subjects undergoing in vitro fertilization treatment cycles without using the methods of determining an endometrial status described herein. In some embodiments, the methods of determining an endometrial status according to this disclosure increase overall implantation rate during in vitro fertilization treatment cycles in a population of subjects by at least 40% relative to the implantation rate of a population of subjects undergoing in vitro fertilization treatment cycles without using the methods of determining an endometrial status described herein. In some embodiments, the methods of determining an endometrial status according to this disclosure increase overall implantation rate during in vitro fertilization treatment cycles in a population of subjects by at least 50% relative to the implantation rate of a population of subjects undergoing in vitro fertilization treatment cycles without using the methods of determining an endometrial status described herein. In some embodiments, the methods of determining an endometrial status according to this disclosure increase overall implantation rate during in vitro fertilization treatment cycles in a population of subjects by at least 60% relative to the implantation rate of a population of subjects undergoing in vitro fertilization treatment cycles without using the methods of determining an endometrial status described herein. In some embodiments, the methods of determining an endometrial status according to this disclosure increase overall implantation rate during in vitro fertilization treatment cycles in a population of subjects by at least 70% relative to the implantation rate of a population of subjects undergoing in vitro fertilization treatment cycles without using the methods of determining an endometrial status described herein. In some embodiments, the methods of determining an endometrial status according to this disclosure increase overall implantation rate during in vitro fertilization treatment cycles in a population of subjects by at least 80% relative to the implantation rate of a population of subjects undergoing in vitro fertilization treatment cycles without using the methods of determining an endometrial status described herein. In some embodiments, the methods of determining an endometrial status according to this disclosure increase overall implantation rate during in vitro fertilization treatment cycles in a population of subjects by at least 90% relative to the implantation rate of a population of subjects undergoing in vitro fertilization treatment cycles without using the methods of determining an endometrial status described herein.

In some embodiments, the methods of determining an endometrial status according to this disclosure increase the rate of successful pregnancy by 5%-90% in a subject relative to a subject that did not undergo an analysis of endometrial status. In some embodiments, the methods of determining an endometrial status according to this disclosure increase the rate of successful pregnancy by 50%-90% in a subject relative to a subject that did not undergo an analysis of endometrial status. In some embodiments, the methods of determining an endometrial status according to this disclosure increase the rate of successful pregnancy by 5%, 10%, 20%, 30%, 40%, 50%, 60%, 70%, 80%, 90%, 95%, or 99% in a subject relative to a subject that did not undergo an analysis of endometrial status. In some embodiments, the methods of determining an endometrial status according to this disclosure increase the rate of successful pregnancy by about 5%, about 10%, about 20%, about 30%, about 40%, about 50%, about 60%, about 70%, about 80%, about 90%, about 95%, or about 99% in a subject relative to a subject that did not undergo an analysis of endometrial status.

In some embodiments, the methods of determining an endometrial status according to this disclosure increase the rate of successful pregnancy by at least 5% in a subject relative to a subject that did not undergo an analysis of endometrial status. In some embodiments, the methods of determining an endometrial status according to this disclosure increase the rate of successful pregnancy by at least 10% in a subject relative to a subject that did not undergo an analysis of endometrial status. In some embodiments, the methods of determining an endometrial status according to this disclosure increase the rate of successful pregnancy by at least 20% in a subject relative to a subject that did not undergo an analysis of endometrial status. In some embodiments, the methods of determining an endometrial status according to this disclosure increase the rate of successful pregnancy by at least 30% in a subject relative to a subject that did not undergo an analysis of endometrial status. In some embodiments, the methods of determining an endometrial status according to this disclosure increase the rate of successful pregnancy by at least 40% in a subject relative to a subject that did not undergo an analysis of endometrial status. In some embodiments, the methods of determining an endometrial status according to this disclosure increase the rate of successful pregnancy by at least 50% in a subject relative to a subject that did not undergo an analysis of endometrial status. In some embodiments, the methods of determining an endometrial status according to this disclosure increase the rate of successful pregnancy by at least 60% in a subject relative to a subject that did not undergo an analysis of endometrial status. In some embodiments, the methods of determining an endometrial status according to this disclosure increase the rate of successful pregnancy by at least 70% in a subject relative to a subject that did not undergo an analysis of endometrial status. In some embodiments, the methods of determining an endometrial status according to this disclosure increase the rate of successful pregnancy by at least 80% in a subject relative to a subject that did not undergo an analysis of endometrial status. In some embodiments, the methods of determining an endometrial status according to this disclosure increase the rate of successful pregnancy by at least 90% in a subject relative to a subject that did not undergo an analysis of endometrial status.

In some embodiments, the methods of determining an endometrial status according to this disclosure increase the rate of successful pregnancy by 5%-90% in a population of subjects relative to a population of subjects that did not undergo an analysis of endometrial status. In some embodiments, the methods of determining an endometrial status according to this disclosure increase the rate of successful pregnancy by 50%-90% in a population of subjects relative to a population of subjects that did not undergo an analysis of endometrial status. In some embodiments, the methods of determining an endometrial status according to this disclosure increase the rate of successful pregnancy by 5%, 10%, 20%, 30%, 40%, 50%, 60%, 70%, 80%, 90%, 95%, or 99% in a population of subjects relative to a population of subjects that did not undergo an analysis of endometrial status. In some embodiments, the methods of determining an endometrial status according to this disclosure increase the rate of successful pregnancy by about 5%, about 10%, about 20%, about 30%, about 40%, about 50%, about 60%, about 70%, about 80%, about 90%, about 95%, or about 99% in a population of subjects relative to a population of subjects that did not undergo an analysis of endometrial status.

In some embodiments, the methods of determining an endometrial status according to this disclosure increase the rate of successful pregnancy by at least 10% in a population of subjects relative to a population of subjects that did not undergo an analysis of endometrial status. In some embodiments, the methods of determining an endometrial status according to this disclosure increase the rate of successful pregnancy by at least 20% in a population of subjects relative to a population of subjects that did not undergo an analysis of endometrial status. In some embodiments, the methods of determining an endometrial status according to this disclosure increase the rate of successful pregnancy by at least 30% in a population of subjects relative to a population of subjects that did not undergo an analysis of endometrial status. In some embodiments, the methods of determining an endometrial status according to this disclosure increase the rate of successful pregnancy by at least 40% in a population of subjects relative to a population of subjects that did not undergo an analysis of endometrial status. In some embodiments, the methods of determining an endometrial status according to this disclosure increase the rate of successful pregnancy by at least 50% in a population of subjects relative to a population of subjects that did not undergo an analysis of endometrial status. In some embodiments, the methods of determining an endometrial status according to this disclosure increase the rate of successful pregnancy by at least 60% in a population of subjects relative to a population of subjects that did not undergo an analysis of endometrial status. In some embodiments, the methods of determining an endometrial status according to this disclosure increase the rate of successful pregnancy by at least 70% in a population of subjects relative to a population of subjects that did not undergo an analysis of endometrial status. In some embodiments, the methods of determining an endometrial status according to this disclosure increase the rate of successful pregnancy by at least 80% in a population of subjects relative to a population of subjects that did not undergo an analysis of endometrial status. In some embodiments, the methods of determining an endometrial status according to this disclosure increase the rate of successful pregnancy by at least 90% in a population of subjects relative to a population of subjects that did not undergo an analysis of endometrial status.

In some embodiments, the disclosure provides a method including obtaining a blood sample of a patient in an in vitro fertilization (IVF) cycle. In some embodiments, the blood sample is drawn from the patient before and on the day of an embryo transfer for the IVF cycle. In some embodiments, the disclosure provides a method of determining, based on a machine-learning model trained to determine an endometrium status based on miRNA expression profile data from a blood sample, a predicted endometrium status of a patient at the time of an embryo transfer based on an miRNA expression profile from the blood sample. In some embodiments, the disclosure provides a method of generating a predicted embryo transfer date based on a predicted endometrium status determined based on a machine-learning model trained to determine an endometrium status based on miRNA expression profile data from a blood sample.

In some embodiments, the disclosure provides a method including obtaining a blood sample of a patient in an in vitro fertilization (IVF) implantation cycle. The blood sample is drawn from the patient before and on the day of an embryo transfer for the IVF implantation cycle. In some embodiments, the disclosure provides a method of determining, based on a machine-learning model trained to determine an endometrium status based on miRNA expression profile data from a blood sample, a predicted endometrium status of a patient at the time of an embryo transfer based on an miRNA expression profile from the blood sample. In some embodiments, the disclosure provides a method of generating a predicted embryo transfer date based on a predicted endometrium status determined based on a machine-learning model trained to determine an endometrium status based on miRNA expression profile data from a blood sample.

In some embodiments, the disclosure provides a method including obtaining a blood sample of a patient in an in vitro fertilization (IVF) cycle. In some embodiments, the blood sample is drawn from the patient before and on the day of an embryo transfer for the IVF cycle. In some embodiments, the disclosure provides a method including determining, based on a machine-learning model trained to determine an endometrium status based on miRNA expression profile data from the blood sample, a predicted endometrium status of the patient at the time of the embryo transfer based on an miRNA expression profile from the blood sample. In some embodiments, the disclosure provides a method including generating a predicted embryo transfer date based on the predicted endometrium status. In some embodiments, the disclosure provides a method including administering a subsequent IVF cycle on the patient by performing an embryo transfer on the predicted embryo transfer date. In some embodiments, the method comprises storing the blood sample. In some embodiments, storing the blood sample preserves the later extraction and sequencing of miRNA. In some embodiments, the method comprises administering a pregnancy test to the patient, and upon the pregnancy test being negative, retrieving the blood sample from storage and sequencing the blood sample for miRNA, thereby providing the miRNA expression profile.

In some embodiments, the disclosure provides a method including obtaining a blood sample of a patient in an in vitro fertilization (IVF) implantation cycle. The blood sample is drawn from the patient before and on the day of an embryo transfer for the IVF implantation cycle. In some embodiments, the disclosure provides a method including determining, based on a machine-learning model trained to determine an endometrium status based on miRNA expression profile data from the blood sample, a predicted endometrium status of the patient at the time of the embryo transfer based on an miRNA expression profile from the blood sample. In some embodiments, the disclosure provides a method including generating a predicted embryo transfer date based on the predicted endometrium status. In some embodiments, the disclosure provides a method including administering a subsequent IVF cycle on the patient by performing an embryo transfer on the predicted embryo transfer date. In some embodiments, the disclosure provides a method including storing the blood sample, such that storing the blood sample preserves the later extraction and sequencing of miRNA. In some embodiments, the disclosure provides a method including administering a pregnancy test to the patient, and upon the pregnancy test being negative: retrieving the blood sample from storage and sequencing the blood sample for miRNA, thereby providing the miRNA expression profile.

In some embodiments, the disclosure provides a method comprising: obtaining a blood sample of a patient in an in vitro fertilization (IVF) cycle. In some embodiments, the blood sample is drawn from the patient before and on the day of an embryo transfer for the IVF cycle. In some embodiments, the disclosure provides a method including determining, based on a machine-learning model trained to determine an endometrium status based on miRNA expression profile data from the blood sample, a predicted endometrium status of the patient at the time of the embryo transfer based on an miRNA expression profile from the blood sample. In some embodiments, the disclosure provides a method including generating a predicted embryo transfer date based on the predicted endometrium status. In some embodiments, the disclosure provides a method including administering a subsequent IVF cycle on the patient by performing an embryo transfer on the predicted embryo transfer date. In some embodiments, the disclosure provides a method including storing the blood sample, such that storing the blood sample preserves the later extraction and sequencing of miRNA. In some embodiments, the disclosure provides a method including administering a pregnancy test to the patient, and upon the pregnancy test being negative: retrieving the blood sample from storage and sequencing the blood sample for miRNA, thereby providing the miRNA expression profile.

In some embodiments, the disclosure provides a method comprising: obtaining a blood sample of a patient in an in vitro fertilization (IVF) implantation cycle. The blood sample is drawn from the patient before and on the day of an embryo transfer for the IVF implantation cycle. In some embodiments, the disclosure provides a method including determining, based on a machine-learning model trained to determine an endometrium status based on miRNA expression profile data from the blood sample, a predicted endometrium status of the patient at the time of the embryo transfer based on an miRNA expression profile from the blood sample. In some embodiments, the disclosure provides a method including generating a predicted embryo transfer date based on the predicted endometrium status. In some embodiments, the disclosure provides a method including administering a subsequent IVF cycle on the patient by performing an embryo transfer on the predicted embryo transfer date. In some embodiments, the disclosure provides a method including storing the blood sample, such that storing the blood sample preserves the later extraction and sequencing of miRNA. In some embodiments, the disclosure provides a method including administering a pregnancy test to the patient, and upon the pregnancy test being negative: retrieving the blood sample from storage and sequencing the blood sample for miRNA, thereby providing the miRNA expression profile.

In some embodiments, the disclosure provides a method including obtaining a blood sample of a patient in an in vitro fertilization (IVF) cycle. The blood sample is drawn from the patient before and on the day of an embryo transfer for the IVF cycle. In some embodiments, the disclosure provides a method including determining, based on a machine-learning model trained to determine an endometrium status based on miRNA expression profile data from the blood sample, a predicted endometrium status of the patient at the time of the embryo transfer based on an miRNA expression profile from the blood sample. In some embodiments, the disclosure provides a method including generating a predicted embryo transfer date based on the predicted endometrium status. In some embodiments, if the in vitro fertilization cycle is not successful, an embryo transfer is performed in a subsequent IVF cycle based on the predicted embryo transfer date. In some embodiments, the method comprises storing the blood sample, such that storing the blood sample preserves the later extraction and sequencing of miRNA. In some embodiments, the method comprises administering a pregnancy test to the patient, and upon the pregnancy test being negative, retrieving the blood sample from storage and sequencing the blood sample for miRNA, thereby providing the miRNA expression profile.

In some embodiments, the disclosure provides a method including obtaining a blood sample of a patient in an in vitro fertilization (IVF) implantation cycle. The blood sample is drawn from the patient before and on the day of an embryo transfer for the IVF implantation cycle. In some embodiments, the disclosure provides a method including determining, based on a machine-learning model trained to determine an endometrium status based on miRNA expression profile data from the blood sample, a predicted endometrium status of the patient at the time of the embryo transfer based on an miRNA expression profile from the blood sample. In some embodiments, the disclosure provides a method including generating a predicted embryo transfer date based on the predicted endometrium status. In some embodiments, if the in vitro fertilization implantation cycle is not successful, an embryo transfer is performed in a subsequent IVF cycle based on the predicted embryo transfer date. In some embodiments, the method comprises storing the blood sample, such that storing the blood sample preserves the later extraction and sequencing of miRNA. In some embodiments, the method comprises administering a pregnancy test to the patient, and upon the pregnancy test being negative, retrieving the blood sample from storage and sequencing the blood sample for miRNA, thereby providing the miRNA expression profile.

In some embodiments, the disclosure provides a method including obtaining a blood sample of a patient in an in vitro fertilization (IVF) cycle. The blood sample is drawn from the patient before and on the day of an embryo transfer for the IVF cycle. In some embodiments, the disclosure provides a method including determining, based on a machine-learning model trained to determine an endometrium status based on miRNA expression profile data from the blood sample, a predicted endometrium status of the patient at the time of the embryo transfer based on an miRNA expression profile from the blood sample. In some embodiments, the disclosure provides a method including generating a predicted embryo transfer date based on the predicted endometrium status. If the in vitro fertilization cycle is not successful, an embryo transfer is performed in a subsequent IVF cycle based on the predicted embryo transfer date, the method further includes storing the blood sample, such that storing the blood sample preserves the later extraction and sequencing of miRNA, and administering a pregnancy test to the patient, and upon the pregnancy test being negative: retrieving the blood sample from storage and sequencing the blood sample for miRNA, thereby providing the miRNA expression profile.

In some embodiments, the disclosure provides a method including obtaining a blood sample of a patient in an in vitro fertilization (IVF) implantation cycle. The blood sample is drawn from the patient before and on the day of an embryo transfer for the IVF implantation cycle. In some embodiments, the disclosure provides a method including determining, based on a machine-learning model trained to determine an endometrium status based on miRNA expression profile data from the blood sample, a predicted endometrium status of the patient at the time of the embryo transfer based on an miRNA expression profile from the blood sample. In some embodiments, the disclosure provides a method including generating a predicted embryo transfer date based on the predicted endometrium status. If the in vitro fertilization implantation cycle is not successful, an embryo transfer is performed in a subsequent IVF cycle based on the predicted embryo transfer date, the method further includes storing the blood sample, such that storing the blood sample preserves the later extraction and sequencing of miRNA, and administering a pregnancy test to the patient, and upon the pregnancy test being negative: retrieving the blood sample from storage and sequencing the blood sample for miRNA, thereby providing the miRNA expression profile.

In some embodiments, a method includes determining endometrial status data for a plurality of patients. The endometrial status data can be retrieved from at least one of endometrium samples and pregnancy outcomes. The method includes associating respective miRNA expression profiles from the plurality of patients with endometrial status data. Each miRNA expression profile of a respective patient is associated with an endometrial status of the respective patient. The method further includes training a machine-learning model based on the associated miRNA expression profiles and associated endometrial status data. The resulting trained machine-learning model is trained to output a predicted endometrial status based on an inputted miRNA expression profile.

In some embodiments, the endometrial status is at least one of PRE (e.g., pre-receptive), WOI (e.g., receptive, window of implantation), and POST (e.g., post receptive).

In some embodiments, the machine-learning model is a plurality of machine-learning models, and each of the machine-learning model generates a prediction of one or more of PRE, WOI, and POST.

In some embodiments, the model further associates one or more of age of the respective patient, body mass index (BMI) of the patient, pregnancy history of the patient, and implantation failure of the patient with the endometrial status of the patient, such that input data of age of the respective patient, body mass index (BMI) of the patient, pregnancy history of the patient, and implantation failure of the patient can be input to the machine-learning model in addition to the miRNA expression profile.

In some embodiments, the machine-learning is trained on a server in a network. The server accessible to a patient or clinician for upload of the miRNA expression data.

In some embodiments, a method includes receiving, at a machine-learning model in a networked server, a digital representation of an miRNA expression profile of a patient.

The miRNA expression profile can be determined by sequencing of a blood sample of the patient. The method further includes processing, at the machine-learning model, the miRNA expression profile. The machine-learning model is trained to output a predicted endometrial status based on an inputted miRNA expression profile. The processing, by the machine-learning model, results in a predicted endometrial status of the patient based on the provided digital representation of the miRNA expression profile.

In some embodiments, the machine-learning model is further trained to receive input data of age of the respective patient, body mass index (BMI) of the patient, pregnancy history of the patient, and implantation failure of the patient and predict the endometrial status of the patient based on the received input data. The method further includes receiving the input data of age of the respective patient, body mass index (BMI) of the patient, pregnancy history of the patient, and implantation failure of the patient, such that the machine-learning model outputs the predicted endometrial status based on the input data in addition to the miRNA expression profile.

In some embodiments, the trained machine learning model is trained based on a plurality of miRNA expression profiles. Each miRNA expression profile is determined from a sample of a given patient of a plurality of patients and each miRNA expression profile associated with a known endometrial status of the given patient, such that the trained machine-learning model is trained to output the endometrial state of a patient separate from the plurality of patients based on an miRNA expression profile determined from the sample of the patient separate from the plurality of patients.

In some embodiments, the machine-learning model is a classifier.

Kits

Another aspect of this disclosure relates to kits for carrying out the methods of determining an endometrial status. In some embodiments, the kits comprise primers and/or probes suitable for the detection of the expression levels of a plurality of miRNAs, for example, the 281 miRNAs provided in Table 7. In some embodiments, the primers and/or probes are suitable for performing qPCR reactions to detect the expression levels of the 281 miRNAs in Table 7. In some embodiments, the kits comprise one or more miRNA profiling chips targeting the 281 miRNAs in Table 7. In some embodiments, the one or more chips additionally target RNA sequences, e.g., 18 s rRNA, that can be used as the endogenous controls for the miRNA expression analysis.

The kits may additionally contain instructions on (i) determining a miRNA expression profile of a blood sample from a subject, optionally using the one or more miRNA profiling chips, and/or (ii) obtaining a receptivity predictive score based on the miRNA expression profile, using a computer-based machine-learning model. In some embodiments, the kits contain instructions on how to interpret and use the receptivity predictive score.

In some embodiments, the kit provides instructions for performing a blood draw during a hormone replacement therapy cycle or natural cycle. In some embodiments, the kit provides instructions for performing a blood draw during a hormone replacement therapy cycle. In some embodiments, the kit provides instructions for performing a blood draw during a natural cycle. In some embodiments, the kit provides instructions for performing a blood draw either after 4 days (96 hours) and 5 days (120 hours) of progesterone administration in a hormone replacement therapy (HRT) cycle. In some embodiments, the kit provides instructions for performing a blood draw after 6 days (144 hours) and 7 days (168 hours) from when LH surge is detected or from when human chorionic gonadotropin (hCG) is administered in a natural cycle.

In some embodiments, the blood sample is sent to a laboratory for RNA extraction and analysis.

In some embodiments, the kit provides instructions after Optimal Receptivity Assay (ORA®) analysis for the endometrium status of a subject. In some embodiments, the kit provides instructions after Optimal Receptivity Assay (ORA®) analysis placing the subject's sample into one of four endometrium status groups including pre-receptive, receptive, post-receptive (short window), or post-receptive (average window). In some embodiments, a healthcare provides performs a personalized embryo transfer (pET) during a treatment cycle according to Optimal Receptivity Assay (ORA®) test results.

In some embodiments, a sample is determined to be inconclusive. In some embodiments, a sample is determined to have invalid/insufficient RNA. In some embodiments, an inconclusive or invalid/insufficient RNA result occurs in less than 1% of samples.

In some embodiments, the kit provides test results with one of the following endometrial states or sample results:
i) Receptive (or WOI): the optimal time for embryo transfer is at the time at which the blood draw was performed;
ii) Pre-Receptive: the endometrium is not yet ready for embryo implantation and implanting at the time at which this blood draw was performed may not be ideal. It is recommended to delay the embryo implantation time during the next treatment cycle;
iii) Post-Receptive (short or average window): the endometrium has passed the optimal time for embryo implantation. It is recommended to adjust the timing of embryo implantation during the next treatment cycle by moving forward the embryo implantation time either by 12 or 24 hours;
iv) Inconclusive: the resulting data does not match ORA's method of Optimal Receptivity Assay (ORA®) and database and is unable to proceed with analysis. This could be due to existing physiological conditions or variations that have occurred during the sample submission process;
v) Invalid/insufficient RNA: Results cannot be obtained due to the low concentration of the extracted material (miRNA). The blood draw should be performed again in hopes of obtaining higher concentration to proceed with Optimal Receptivity Assay (ORA®).

In some embodiments, the kits are useful for diagnostic and therapeutic purposes, including but not limited to IVF treatment.

Clinical and Computational Methods

Figure 2A:
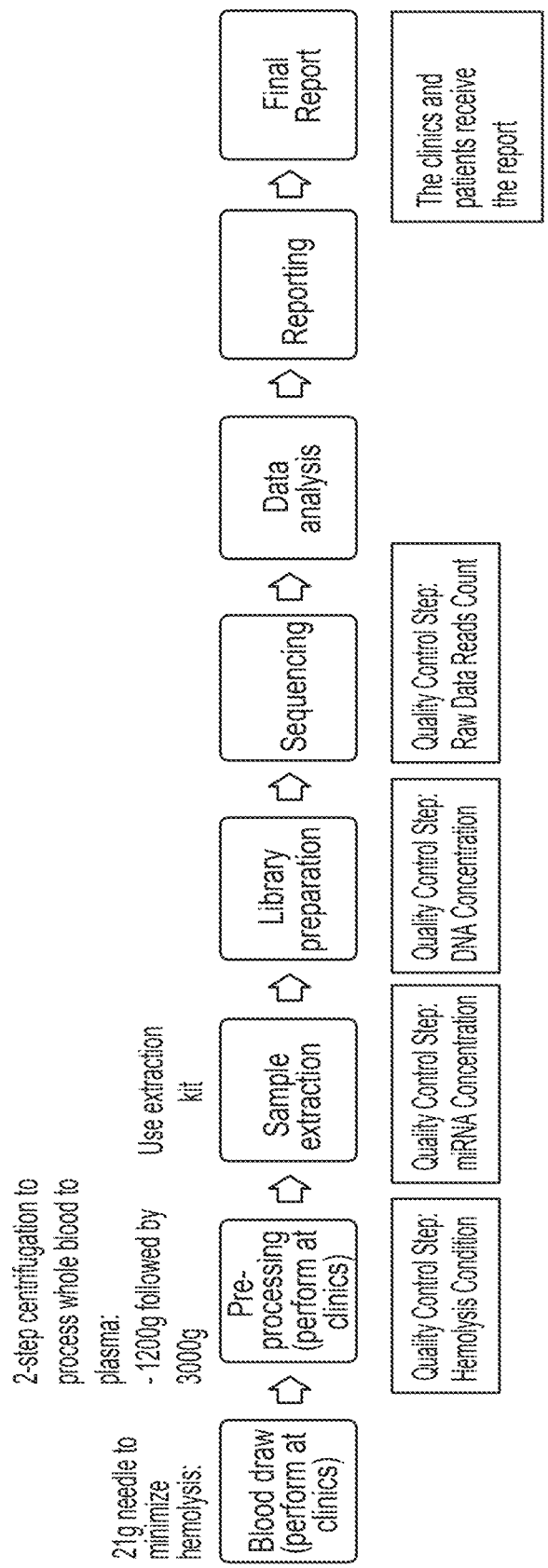
FIGS. 2A-2E provide schematics depicting the workflow of sample collection, processing, and data analysis using the Optimal Receptivity Assay (ORA®) to determine a patient's window of implantation (WOI).
Figure 2B:
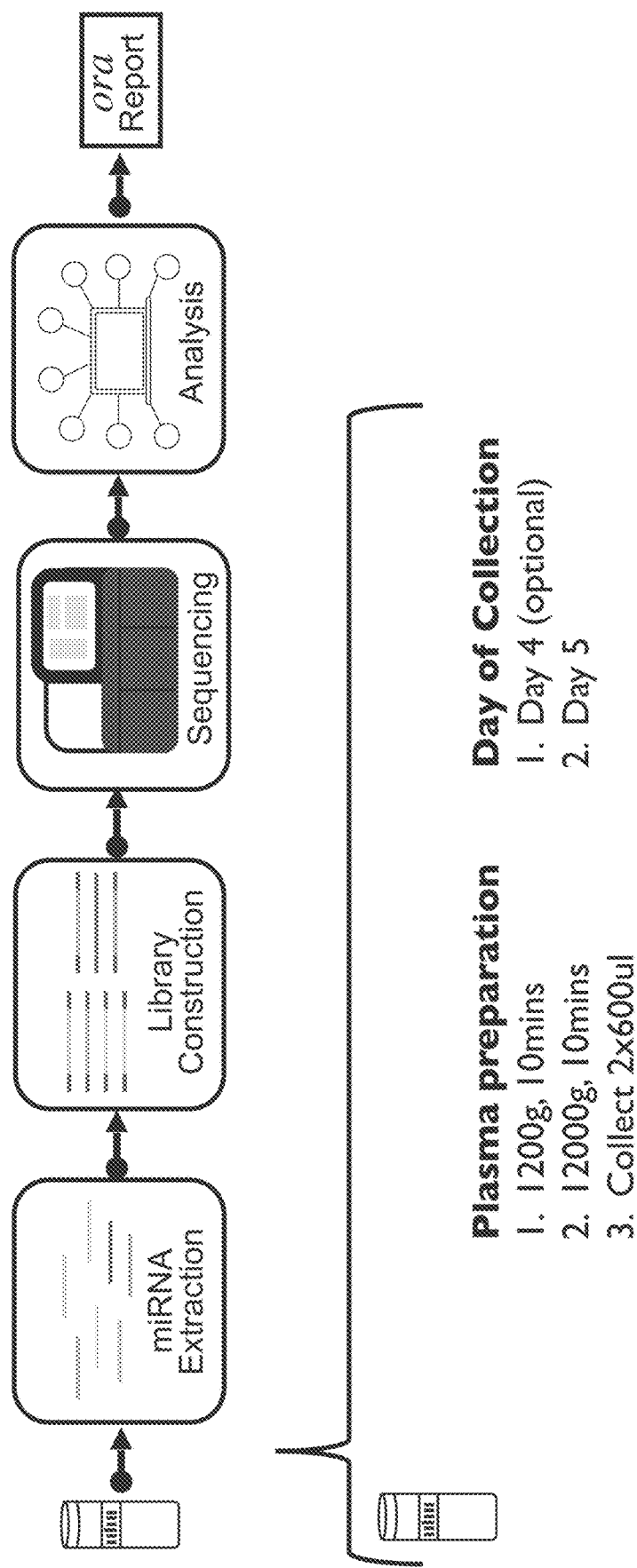
Figure 2C:
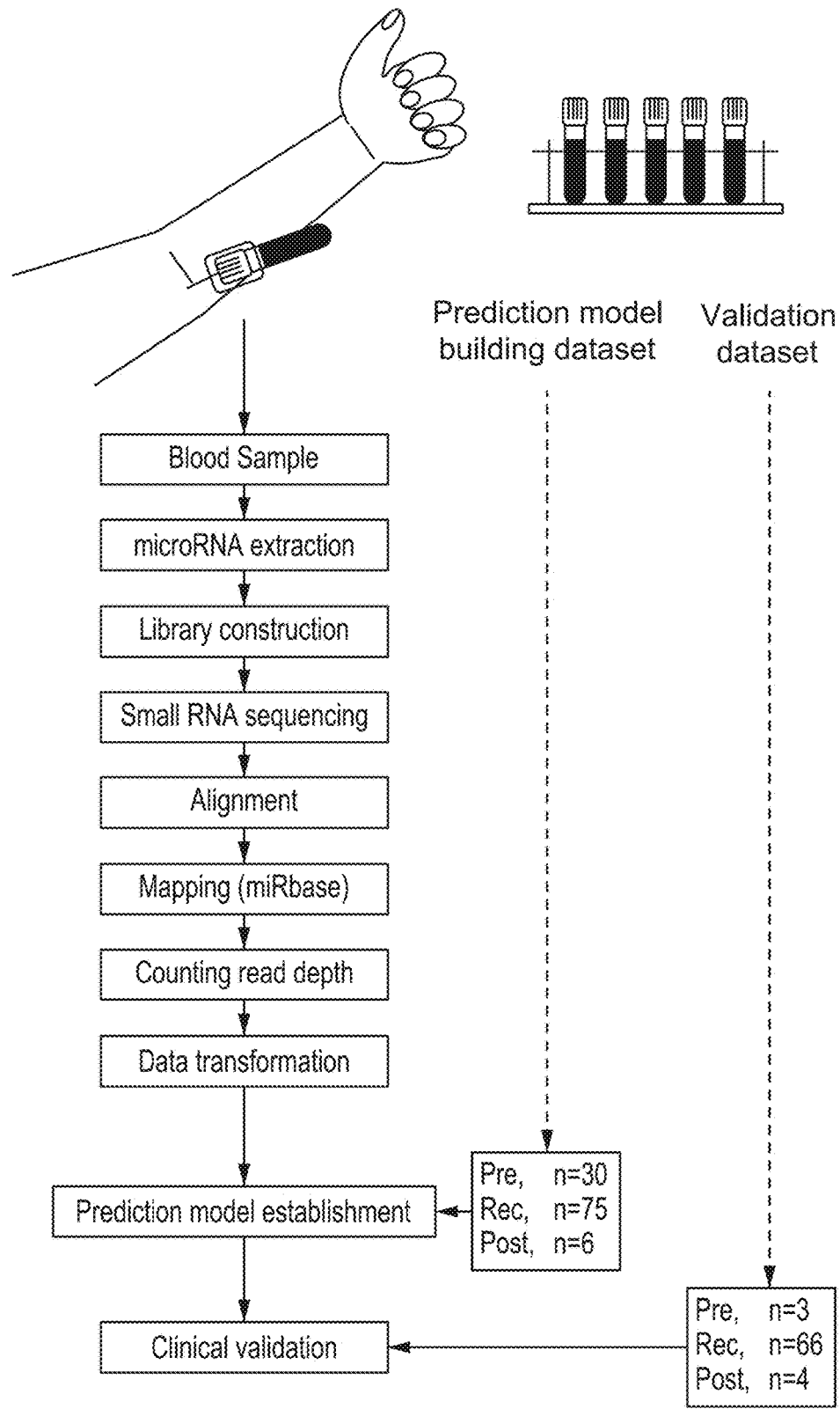
Figure 2D:
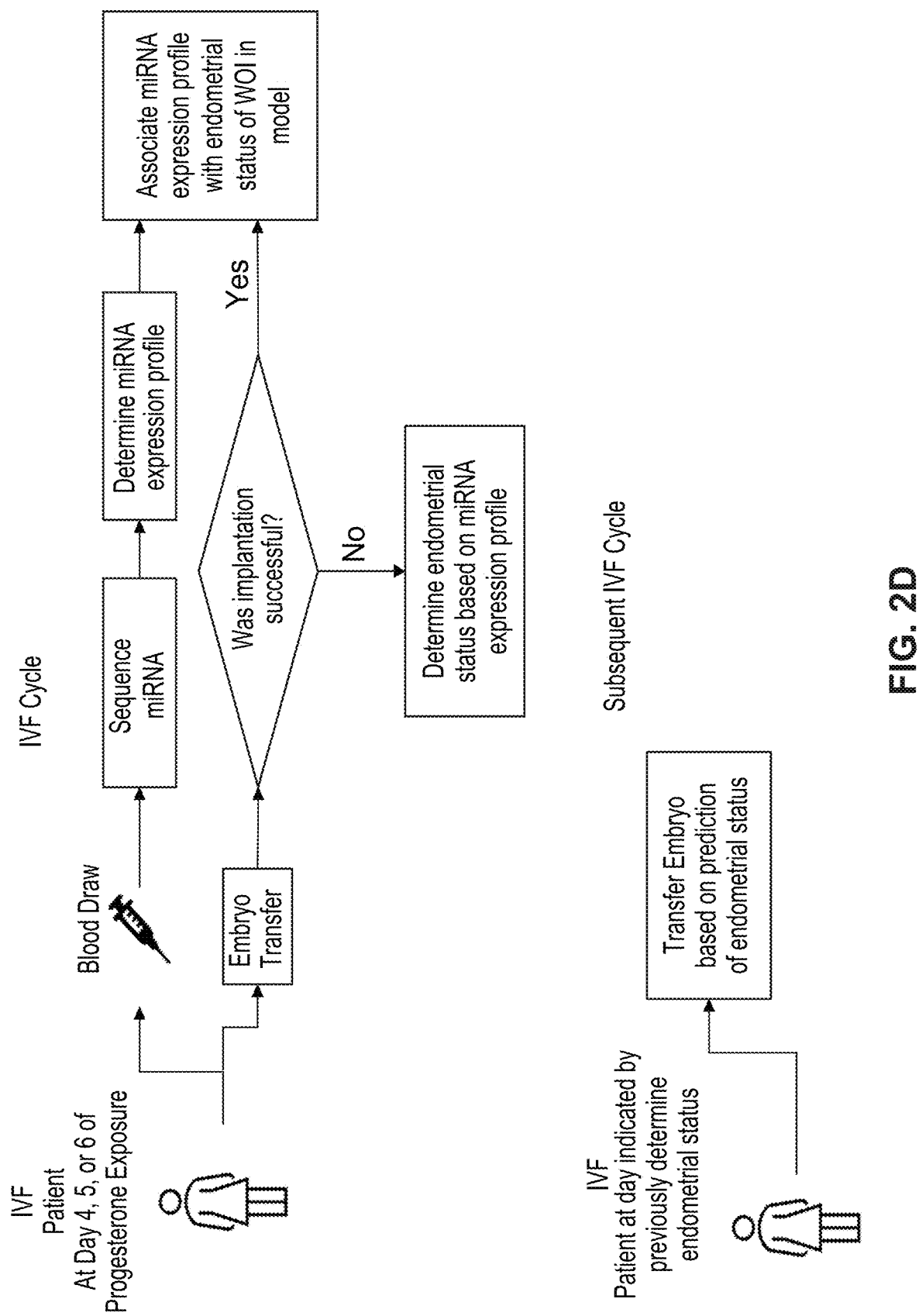

FIG. 2D is a diagram illustrating embodiments of an IVF cycle and subsequent IVF cycle for a patient using methods of the present disclosure. The IVF cycle occurs before the subsequent IVF cycle. In the IVF cycle, at day 5 of progesterone exposure (P+5), a medical provider performs a blood draw and a subsequent embryo transfer for the patient. In some embodiments, the embryo is rated as a high-quality embryo. In some embodiments, the embryo is rated as an average-quality embryo. In some embodiments, the embryo is rated as a poor-quality embryo. In some embodiments, the blood draw is performed before the embryo transfer. Performing the blood draw before the embryo transfer captures the patient's blood sample in a pre-implantation state, thus providing a measure of the patient's blood that indicates whether the patient is in a PRE, WOI, or POST state. The sample from the blood draw is sequenced for miRNA. From that sequencing, an miRNA expression profile is determined (e.g., by a computer-implemented method).

At a later time in IVF treatment, a test or provider determines whether the transfer was successful (e.g., the embryo implanted). The determination can be made by one or more of a blood test, urine test, ultrasound test, or other method. In some embodiments, the transfer is successful, the subsequent IVF may not be needed. In some embodiments, the miRNA expression profile can be used as ground truth data to train the classifier(s) of the model, where the endometrial status the miRNA expression profile is associated with is the WOI status because the transfer was successful.

In some embodiments or in some cases, if the transfer is not successful, the subsequent IVF cycle of IVF treatment is performed. It can be appreciated that, in some cases, after a successful transfer of an embryo (e.g., resulting in implantation), the pregnancy may not come to term for a variety of reasons including, for example, miscarriage. In such a case, the patient and clinician could determine, based on the successful transfer, that the time of the cycle where the embryo transfer occurred is the window of implantation. The patient and clinician could choose to repeat the same embryo transfer timing based on the successful transfer, therefore. However, the patient and clinician can further order the test described in the present disclosure to determine the predicted endometrium status or state based on the blood sample for additional data. If the blood is sequenced after a successful transfer, it can be further used as additional training data for the model where the miRNA expression profile of the blood sample is associated with the ground truth of the endometrium state or status being WOI.

The method can then determine the patient's endometrial status by inputting the miRNA expression profile derived from the blood draw to the model. The model outputs a determination about whether the miRNA expression profile indicates that the patient was PRE or POST. If the model outputs POST, the embryo transfer can be shifted to P+3 or one of the days before Day 5 of progesterone exposure (e.g., P+1, P+2, P+3, P+4). If the model outputs PRE, the embryo transfer can be shifted to P+7 or any of the days after Day 5 of progesterone exposure (e.g., P+6, P+7, P+8, P+9, P+10).

In some embodiments, it can be appreciated that the model outputs a probability of each state when transfer was not successful in the IVF cycle. In these cases, the subsequent IVF cycle can be guided by the higher probability state among PRE and POST, excluding the WOI result.

In some embodiments, the IVF cycle includes a blood draw on the patient and performing a subsequent embryo transfer, without also performing a contemporaneous endometrial sample. Therefore, this IVF cycle differs from the "mock cycle" traditionally used, where a patient undergoes HRT, has an endometrial sample extracted to determine status of the endometrium, and does not have an embryo transfer performed in that "mock cycle." Advantageously, the patient avoids an extra procedure of an endometrial sample extraction and can attempt the embryo transfer on an earlier or first IVF cycle for HRT. In some embodiments, if the transfer in the IVF cycle is successful, the blood sample can further train the prediction model by associating the blood sample with an endometrial status of WOI. In some embodiments, if the transfer in the IVF cycle is successful, the patient can avoid additional IVF cycles of HRT compared to treatment with a "mock cycle," which performs an embryo transfer on an additional cycle. In some embodiments, if the transfer in the IVF cycle is unsuccessful, then a subsequent IVF cycle is performed with an embryo transfer performed on a predicted embryo transfer date determined by the model.

Figure 2E:
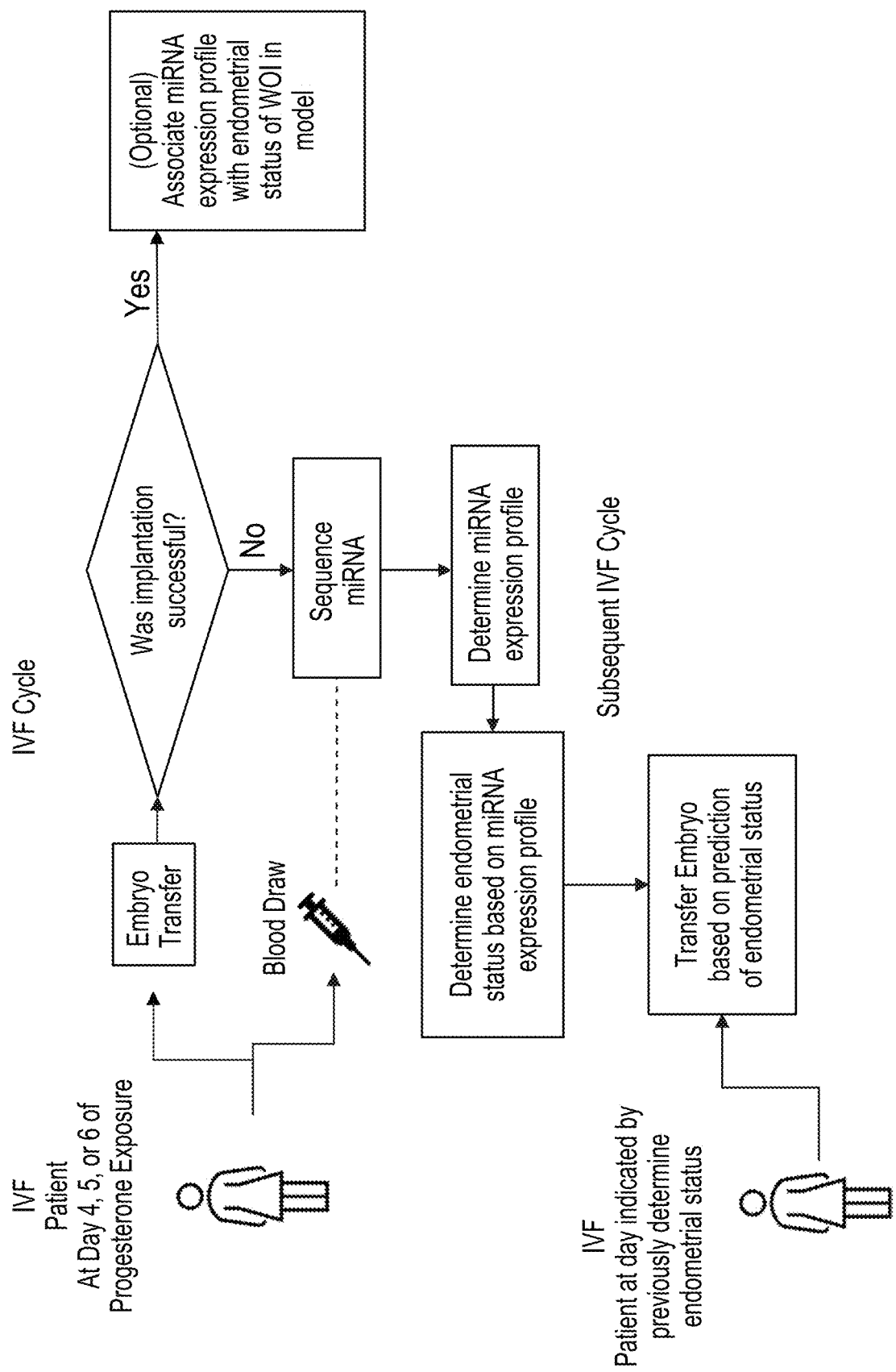

FIG. 2E is a diagram illustrating embodiments of a first and subsequent IVF cycle for a patient using methods of the present disclosure. In a IVF cycle, at day 5 of progesterone exposure (P+5), a medical provider performs a blood draw and a subsequent embryo transfer for the patient. In some embodiments, the embryo is rated as a high-quality embryo. In some embodiments, the embryo is rated as an average-quality embryo. In some embodiments, the embryo is rated as a poor-quality embryo. In some embodiments, the blood draw is performed before the embryo transfer. Performing the blood draw before the embryo transfer captures the patient's blood sample in a pre-implantation state, thus providing a measure of the patient's blood that indicates whether the patient is in a PRE, WOI, or POST state.

At a later time in the IVF treatment, a pregnancy test or provider determines whether the embryo transfer was successful (e.g., the embryo implanted). The determination can be made by one or more of a blood test, urine test, ultrasound test, or other method.

In some embodiments, if the embryo transfer is successful, a subsequent IVF is not performed. It can be appreciated that, in some cases, after a successful embryo transfer (e.g., embryo implantation), the pregnancy may not come to term for a variety of reasons including, for example, miscarriage. In such a case, the patient and clinician could determine, based on the successful embryo transfer, that the time of the cycle where the embryo transfer occurred is the window of implantation. The patient and clinician could choose to repeat the same embryo transfer timing based on the successful embryo transfer, therefore. However, the patient and clinician could further order the test described in the present disclosure to determine the predicted endometrium status or state based on the blood sample for additional data. If the blood is sequenced after a successful embryo transfer, it can be further used as additional training data for the model where the miRNA expression profile of the blood sample is associated with the ground truth of the endometrium state or status being WOI. In some embodiments, an miRNA expression profile determined from the blood draw/sample can be used as ground truth data to train the classifier(s) of the model, where the endometrial status the miRNA expression profile is associated with is the WOI status because the embryo transfer was successful.

In some embodiments, if the embryo transfer is not successful, the subsequent IVF cycle is performed. In some embodiments, at this time, the sample from the blood draw is sequenced for miRNA. From that sequencing, an miRNA expression profile is determined (e.g., by a computer-implemented method). The blood draw can be preserved for miRNA sequencing (e.g., frozen, refrigerated) according to methods known in the art. By waiting until this time, it can reduce costs for the patient. On the other hand, performing the test in the event of a positive pregnancy test provides the model an additional data point to further train the model by associating the miRNA expression profile of the sample with endometrial status of being WOI/receptive due to ground truth of knowing that the embryo transfer was successful.

The method can then determine the patient's endometrial status by inputting the miRNA expression profile derived from the blood draw to the model. The model outputs a determination about whether the miRNA expression profile indicates that the patient was PRE or POST. If the model outputs POST, the embryo transfer of the subsequent IVF cycle can be shifted to P+3 or one of the days before Day 5 of progesterone exposure (e.g., P+1, P+2, P+3, P+4). If the model outputs PRE, the embryo transfer of the subsequent IVF cycle can be shifted to P+7 or any of the days after Day 5 of progesterone exposure (e.g., P+6, P+7, P+8, P+9, P+10).

In some embodiments, it can be appreciated that the model outputs a probability of each state when embryo transfer was not successful in the IVF cycle. In these cases, the subsequent IVF cycle can be guided by the higher probability state among PRE and POST, excluding the WOI result.

In some embodiments, the IVF cycle includes a blood draw on the patient and performing a subsequent embryo transfer, without also performing a contemporaneous endometrial sample. Therefore, this IVF cycle differs from the "mock cycle" traditionally used, where a patient undergoes HRT, has an endometrial sample extracted to determine status of the endometrium, and does not have an embryo transfer performed in that "mock cycle." Advantageously, the patient avoids an extra procedure of an endometrial sample extraction, and can attempt the embryo transfer on a IVF cycle for HRT. In some embodiments, if the transfer in the IVF cycle is successful, the blood sample can further train the prediction model by associating the blood sample with an endometrial status of WOI. In some embodiments, if the transfer in the IVF cycle is successful, the patient can avoid additional cycles of HRT compared to treatment with a "mock cycle," which performs an embryo transfer on an additional cycle. In some embodiments, if the transfer in the IVF cycle is unsuccessful, then a subsequent IVF cycle is performed with an embryo transfer performed on a predicted embryo transfer date determined by the model.

In some embodiments, first IVF cycle performs a standard embryo transfer at P+5, or the fifth day of progesterone administration. At P+5, and optionally P+4, blood draws occur. After the blood draw, the sample is pre-processed (e.g., processed into plasma) for storage, shipped to a storage facility, and stored for a year (e.g., in a refrigerator or freezer). After the P+5 blood draw, embryo transfer is performed.

In some embodiments, after the embryo transfer, a pregnancy test is performed later in the cycle. In some embodiments, if the test is positive (e.g., the patient is pregnant after the embryo transfer), then no further cycle is needed. In some embodiments, if the test is negative (e.g., the patient is not pregnant after the embryo transfer), then the patient can immediately analyze the blood sample taken during the embryo transfer. If the patient elects to do so, the blood can be analyzed and report delivered before the next IVF cycle. In some embodiments, the blood can be analyzed and report can be issued in 12-16 days.

Clinical and Computational Methods—Machine Learning Model Training

Figure 13:
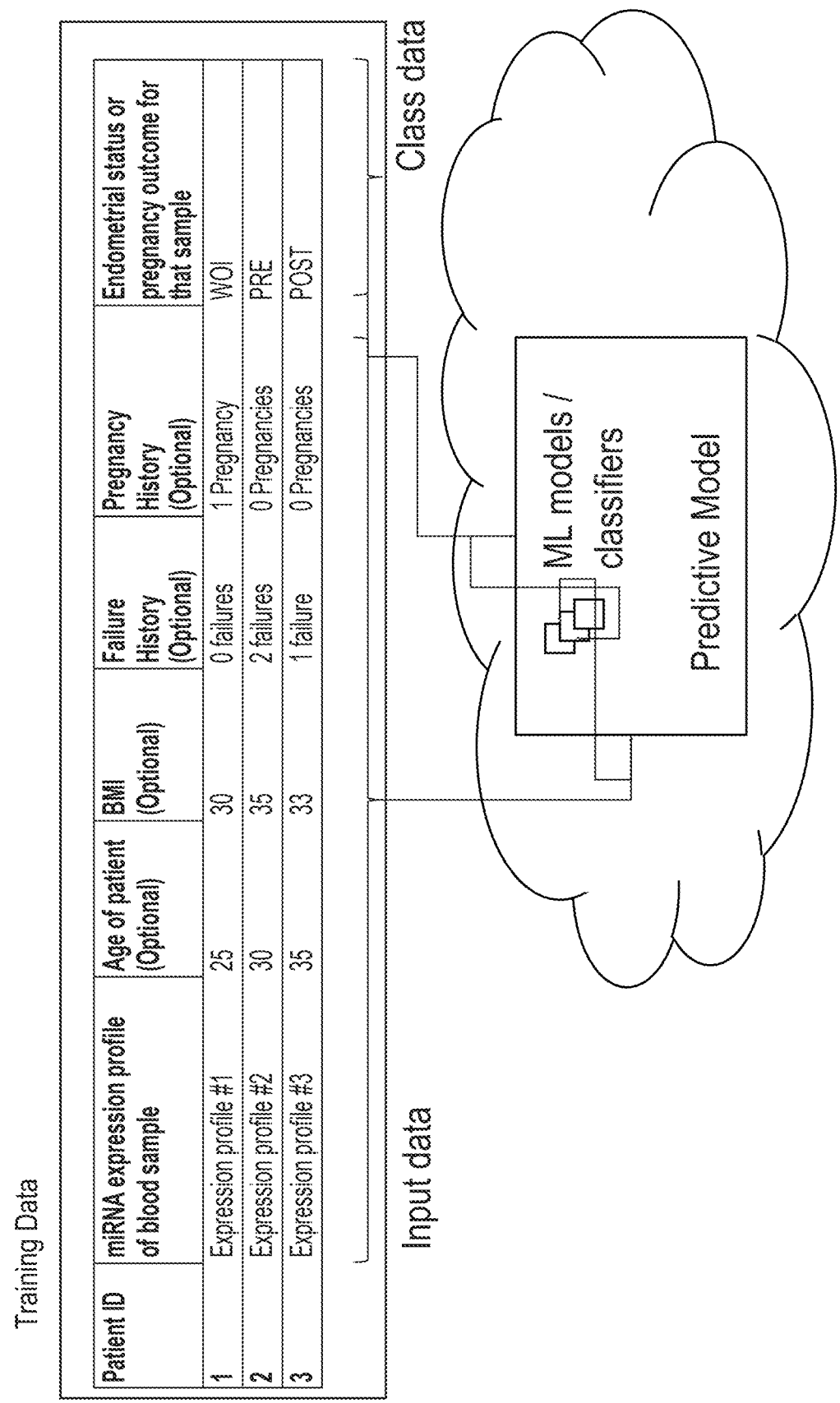
FIG. 13 is a diagram illustrating an example embodiment of training the predictive model.

FIG. 13 is a diagram illustrating an example embodiment of training the predictive model. Training data illustrated includes miRNA expression profile of a blood sample and endometrial status or pregnancy outcome for that sample. Optional input data/predictive data includes age of the patient, body mass index (BMI), implantation failure history, or pregnancy history. A patient ID serves as an index identifying each patient, expression profile, demographic and medical data, and endometrial outcome, but is not predictive data used to train the model.

The training data includes input data (e.g., the miRNA expression profile and optionally the age of patient, BMI, failure history, and pregnancy history) and class data of the endometrial status associated with the patient at the time of the sample. The input data and class data are provided to a predictive model in a training process. After training, the predictive models learn to associate any novel input data having at least the miRNA expression profile and any of the optional input data to a prediction of an endometrial status. The predictive model, in some embodiments, can include multiple machine learning models such as classifiers. Examples of such classifiers are logistic regression classifiers, perceptron, naïve bayes, decision tree, support vector machine, K-nearest neighbors classifiers, or random forest classifier. The training process can include training these one or more machine learning models such as classifiers, which are trained in the manner described above. It can be appreciated that other machine learning models other than classifiers can be employed, such as neural networks, etc.

In some embodiments, miRNA expression profile can later be associated with the endometrial status in the model to train or fine-tune a trained model. In other words, as more IVF is performed on patients, the miRNA data can be provided (e.g., anonymously) to further train the model. Providing the miRNA expression profile and associated endometrial status to a training set or to a trained model thereby trains or further trains the model to associate the expression profile of miRNA measured in the blood draw with the ground truth of the measured endometrial status.

In some embodiments, the trained predictive model is stored in a network environment on one or more servers. In some embodiments, the servers are Health Insurance Portability and Accountability Act (HIPAA) compliant. In some embodiments, the servers are cloud providers such as Amazon AWS® or Azure®.

In some embodiments, sample preparation includes preparation of the sample and plasma miRNA extraction. The method then performs the experimental protocol and sets up the prediction model. The samples are amplified and used to set up a library (e.g., a training data set), which builds a prediction model. Quality control is run on the model by verifying miRNA amount, and verifying sequencing level (e.g., normalization, augmentation, qualification, transformation) based on the total reads, miRNA total reads, spike-in control, and detectible miRNA quantity. In some embodiments, quality control is performed before building the model. After the model is build, it is verified and validate (e.g., with 10-fold cross validation). Verification includes determining reproducibility, repeatability, accuracy, sensitivity, specificity, precision, local observation-based verification, and interference.

In some embodiments, data input of miRNA expression profile information as read by a Next Generation Sequencing (NGS) test is provided. The miRNA expression profile, as output by the NGS, is read counts of each miRNA found in the sample.

A five-step process processes the raw data input to prepare it to be sent to the prediction model. It can be appreciated, however, that the model can read data in other formats, such as unnormalized raw read counts, etc., and these steps can be performed or omitted in any combination. First, the data is normalized by converting the miRNA sequencing read counts to a ratio of each miRNA's read counts to total miRNA read counts. Second, targets are qualified by selecting miRNA with a stable expression pattern and a reliable ratio value between samples. Third, the data is transformed by converting miRNA ratio values to a simply processed format which matches the model system.

Fourth, the data is modeled by establishing a prediction model with different model systems and evaluating modeling results. In some embodiments, the model system is one or more classifiers that are trained to determine PRE, WOI, or POST status of a patient based on the miRNA expression profile. An example of the training data set would include a set of miRNA expression profiles, where each miRNA expression profile is associated with an Endometrial state. The endometrial state is expressed as follows:

$$\text{Endometrial State} = \begin{cases} PRE, & \text{score} > x \\ POST, & \text{score} < y \\ WOI, & \text{otherwise} \end{cases}$$

where the score is derived from a determination of the endometrial state via a sample extraction and laboratory examination. Fifth, the prediction model is validated by an independent dataset that evaluates the accuracy rate.

The model then is trained to output results to providers. Once trained, upon receiving an miRNA expression profile, the model outputs a result of PRE, POST, or WOI based on which state is most likely based on the input profile.

In some embodiments, first step of data processing (NGS data) is performed. Then, a prediction model is trained based on the data, and once trained, the model can output a result.

Data input of miRNA expression profile information as read by a Next Generation Sequencing (NGS) test is provided for training. The raw data can be augmented so that each sample includes technical repeats to eliminate variance from the batch effect. Targets are qualified by selecting miRNA with a stable expression pattern and a reliable ratio value between samples. The data is transformed by converting miRNA ratio values to a simply processed format which matches the model system. Then, the data is normalized by converting the miRNA sequencing read counts to a ratio of each miRNA's read counts to total miRNA read counts. The miRNA expression profile, as output by the NGS, is read counts of each miRNA found in the sample. It can be appreciated that these steps can occur in any order or combination, or that some or all of these steps may be omitted.

The model training is performed by associating each read count ratio of the miRNA expression profile, probability of each stage, and the representative endometrial stage for each miRNA as the training data set. The training data is provided to one or more models for training. An example of the training data set would include a set of miRNA expression profiles, where each miRNA expression profile is associated with an Endometrial state. The endometrial state is expressed as follows:

$$\text{Endometrial State} = \begin{cases} PRE, & \text{score} > x \\ POST, & \text{score} < y \\ WOI, & \text{otherwise} \end{cases}$$

where the score is derived from a determination of the endometrial state via a sample extraction and laboratory examination. The model then is trained to output results to providers.

The models being trained can include classifiers such as a logistic regression classifier, a random forest classifier, and a K-nearest neighbor classifier. The models built are then 10-fold cross-validated for hyper-parameter tuning by using the logistic regression, random forest, and k-nearest neighbor models. The resulting prediction model is one or more classifiers (e.g., logistic regression, random forest, k-nearest neighbors) that are trained to determine PRE, WOI, or POST status of a patient based on the miRNA expression profile.

Once trained, upon receiving an miRNA expression profile, the model outputs a result of PRE, POST, or WOI based on which state is most likely based on the input profile. In some embodiments, the model outputs a probability of each state or one or more states.

Clinical and Computational Methods—Using Trained Model

Figure 14:
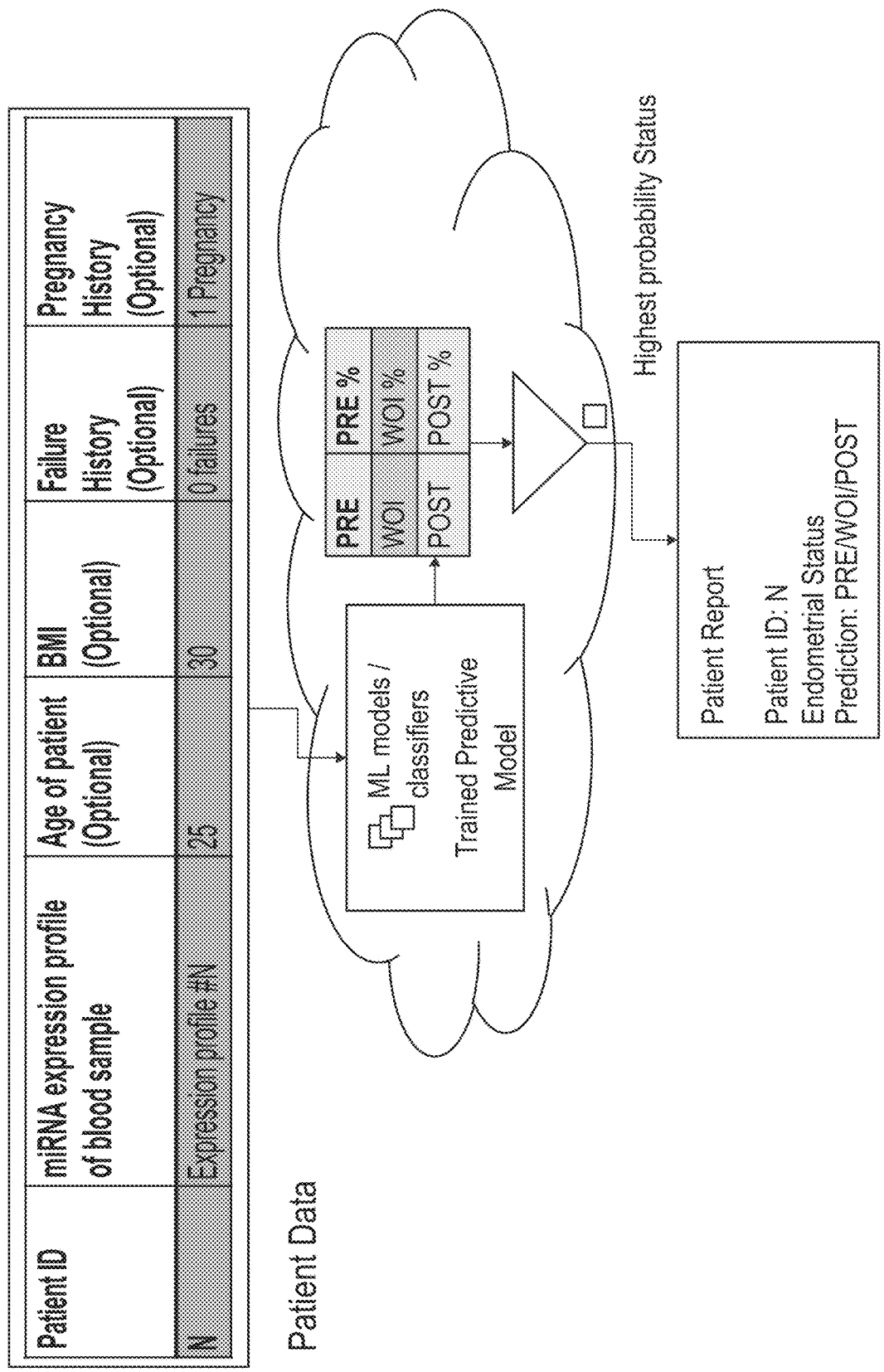
FIG. 14 is a diagram illustrating an example embodiment of using the trained predictive model.

FIG. 14 is a diagram illustrating an example embodiment of using the trained predictive model. The trained predictive model is trained in the manner described in relation to FIG. 14. The trained predictive model can be stored in a network environment on one or more servers. In some embodiments, the servers are Health Insurance Portability and Accountability Act (HIPAA) compliant. In some embodiments, the servers are cloud providers such as Amazon AWS® or Azure®.

A patient or clinician can send the patient data to the trained predictive model. It can be understood that the patient data is of the same categories of the training data, but the data itself is novel compared to the training set. The trained predictive model (e.g., via the machine-learning models/classifiers) outputs probabilities of each endometrial status-PRE, WOI, and POST. In some embodiments, the model may output other combinations of the probabilities, including PRE and WOI, PRE and POST, WOI and POST. In some embodiments, different models, including the different types of classifiers disclosed herein, may calculate the probabilities of each status or combination of statuses. A selection module determines the highest probability status out of the outputted probabilities. The selection module outputs the highest probability status that is representative of the endometrial status of the patient at the time of the sample. The patient report then includes the endometrial status of the highest probability status.

In some embodiments, it can be appreciated that the trained predictive model can select the endometrial status or state—PRE, WOI, or POST—based on metrics other than probability, such as selecting directly without outputting an intermediary probability.

In some embodiments, the selection module and patient report can be generated in the cloud server housing the patient data, in a different server, or at a local machine. In some embodiments, the patient report can be generated by a different machine than the machine of the selection module.

In some embodiments, machine-learning models can be used together in the following manner. A first model receives a miRNA expression profile of a patient and outputs whether the sample is POST status. If the first model outputs that POST is the most likely status, then the patient's report will indicate that the endometrial status is POST and the second model may not be used. However, if the first model indicates that the endometrial status is either WOI or PRE, then the second model also receives the miRNA expression profile. The second model either outputs whether the endometrial status is WOI or PRE, and the patient's report will indicate that endometrial status. In some embodiments, the models can be any type of classifier. It can be appreciated that if the first model outputs that POST is the most likely status, in some embodiments, a second model can also be used.

In some embodiments, the model can output that PRE is the most likely status, then the patient's report will indicate that the endometrial status is PRE and the second model may not used. However, if the first model indicates that the endometrial status is either WOI or POST, then the second model also receives the miRNA expression profile. The second model either outputs whether the endometrial status is WOI or POST, and the patient's report will indicate that endometrial status. In some embodiments, the models can be any type of classifier. It can be appreciated that if the first model outputs that POST is the most likely status, in some embodiments, a second model can also be used.

In some embodiments, more than two models can be used.

Clinical and Computational Methods—Using the Model in a Clinical Setting

Figure 15:
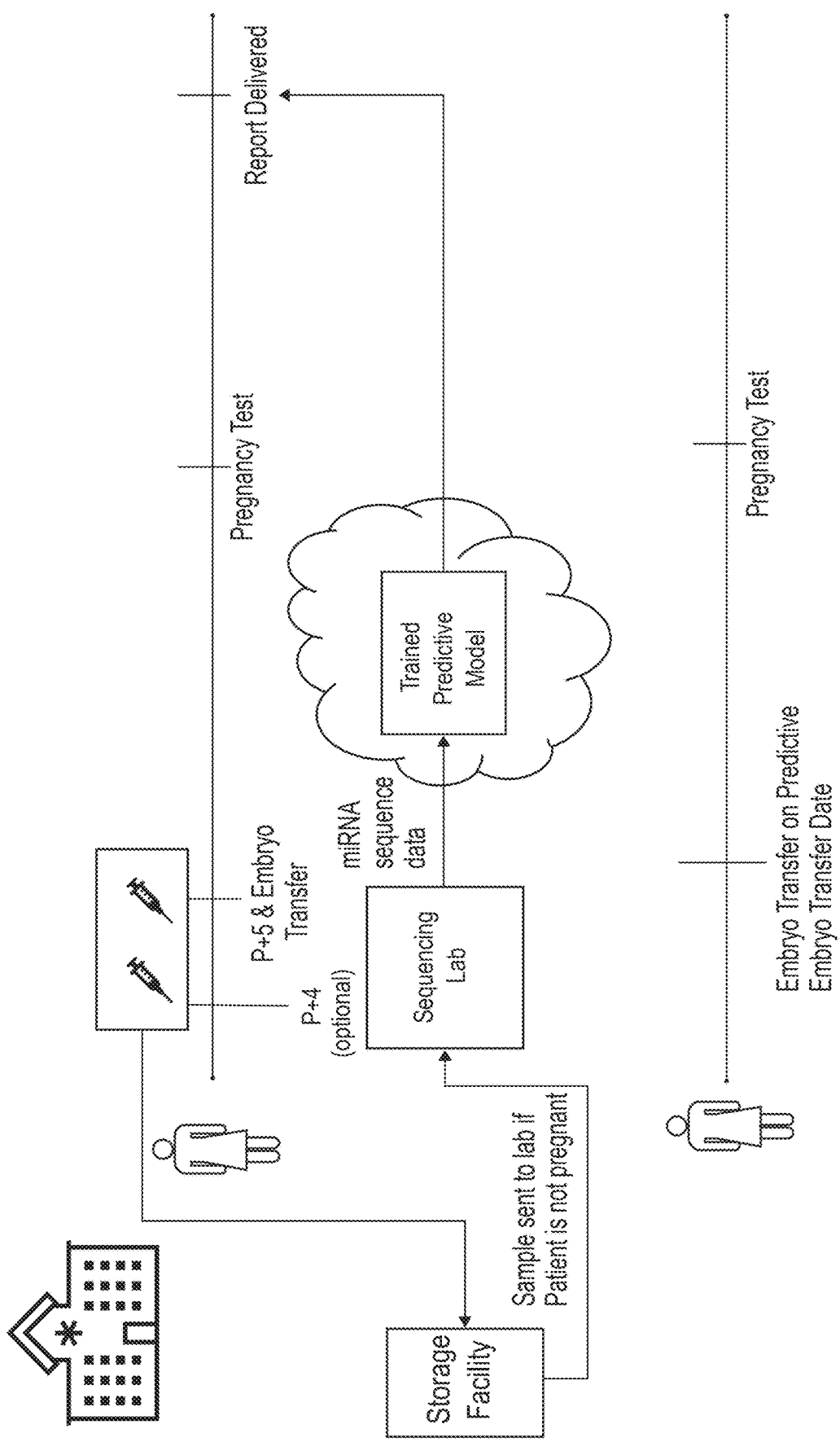
FIG. 15 is a diagram illustrating an example embodiment of a method employed by the present disclosure.

FIG. 15 is a diagram illustrating an example embodiment of a method employed by the present disclosure. An IVF cycle of IVF treatment is administered to a patient in a clinic, hospital, IVF center, or other medical center. The clinic administers hormone replacement therapy. The clinic administers blood draws at P+5 and optionally P+4 days after the progesterone (e.g., or other trigger drug) is administered. The blood draw is pre-processed, and shipped to a storage facility where it is stored (e.g., refrigerated or frozen) for a period of time requested by the patient or clinic (e.g., 1 month, 2 months, 3 months, 4 months, 5 months, 6 months, 7 months, 8 months, 9 months, 10 months, 11 months, 12 months, 13 months, 14 months, 15 months, 16 months, 17 months, 18 months, 2 years, 2.5 years, 3 years, or other time period). After the blood draw on the P+5 day, the embryo transfer is performed. In some embodiments, the blood draw is processed immediately.

In the IVF cycle of IVF treatment, a pregnancy test is administered to the patient. If the patient is pregnant, then there is no need for a subsequent IVF cycle because the patient is already pregnant. However, if the patient is not pregnant, the patient or clinician can choose to request analysis of the blood sample taken before the embryo transfer. The sample is then sent to a sequencing lab if the patient is not pregnant. The miRNA sequence data is provided to the trained predictive model, which processes the data, and generates the report to be delivered to the clinician or patient. The report includes a predictive embryo transfer date based on whether the report indicated the previous blood sample indicated a PRE or POST status of the endometrium. In some embodiments, the model outputs a prediction of endometrial status (e.g., pre-WOI (PRE), WOI, or post-WOI (POST)). From that prediction, the report and/or medical provider can determine whether to transfer the embryo after P+5 (e.g., if the prediction is PRE), to transfer the embryo at p+5 (e.g., if the prediction is WOI), or transfer the embryo prior to P+5 (e.g., if the prediction is POST).

In some embodiments, the option to generate a report is automated, such that upon patient selection, the logistics of causing the blood sample to be analyzed for miRNA expression profile, analyzing the miRNA expression profile with the model to determine the endometrial status or state, and generating the report, are performed without additional work by the patient or clinician after the report is ordered.

In a subsequent IVF cycle, the embryo transfer is then performed on the predictive embryo transfer date. In some embodiments, the subsequent IVF cycle can include the same events as the IVF cycle but using the timing of the predictive embryo transfer date (e.g., with a blood draw just before the embryo transfer on the predictive embryo transfer date). However, for simplicity, FIG. 15 illustrates the embryo transfer and pregnancy test.

Figure 16:
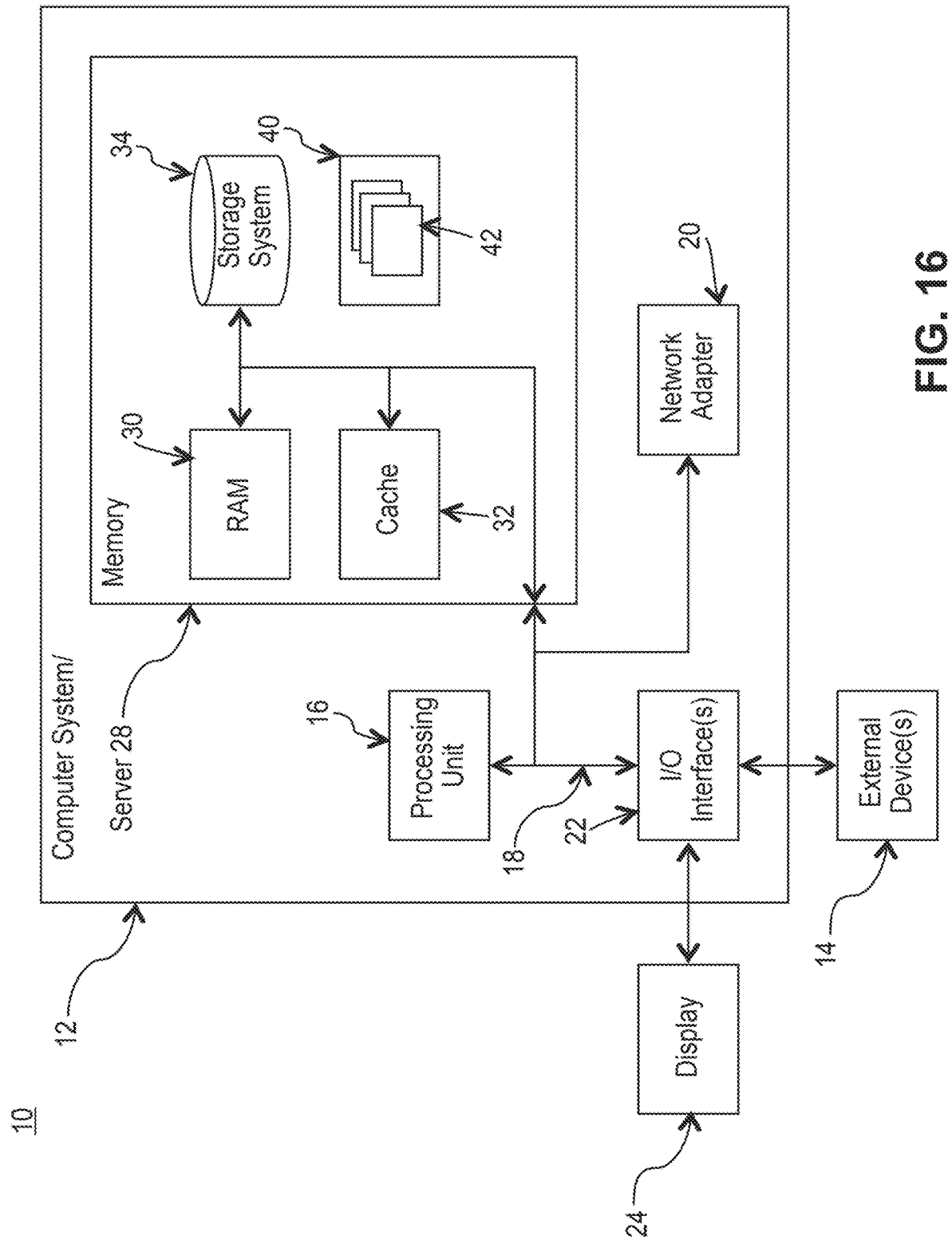
FIG. 16 is a diagram illustrating a computer system/server in a computing node in the form of a general-purpose computing device.

Clinical and Computational Methods—Computing Hardware and Environment Applied to the Disclosed Systems and Methods Referring now to FIG. 16, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 16, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In some embodiments, a feature vector is provided to a machine-learning model (e.g., a learning system, machine learning system, an artificial intelligence system, an artificial intelligence model). Based on the input features, the learning system generates one or more outputs. In some embodiments, the output of the learning system is a feature vector. It can be appreciated that the miRNA expression profile can be formatted as a feature vector to the machine-learning models described herein. It can further be appreciated that the input data including the miRNA expression profile and optional age, body mass index, implantation failure history, and pregnancy history can also be inputted as one or more feature vector of one or more dimensions. It can further be appreciated that the output data including the probabilities of PRE, POST, and WOI can be output as a feature vector.

In some embodiments, the learning system comprises a SVM. In other embodiments, the learning system comprises an artificial neural network. In some embodiments, the learning system is pre-trained using training data. In some embodiments training data is retrospective data. In some embodiments, the retrospective data is stored in a data store. In some embodiments, the learning system may be additionally trained through manual curation of previously generated outputs.

In some embodiments, the learning system, is a trained classifier. In some embodiments, the trained classifier is a random decision forest. However, it will be appreciated that a variety of other classifiers are suitable for use according to the present disclosure, including linear classifiers, support vector machines (SVM), random decision forests (e.g., a random forest classifier), clustering model, decision tree, nearest neighbor (e.g., K-nearest neighbor), binary classification, Naïve Bayes, or neural networks such as recurrent neural networks (RNN).

Suitable artificial neural networks include but are not limited to a feedforward neural network, a radial basis function network, a self-organizing map, learning vector quantization, a recurrent neural network, a Hopfield network, a Boltzmann machine, an echo state network, long short term memory, a bi-directional recurrent neural network, a hierarchical recurrent neural network, a stochastic neural network, a modular neural network, an associative neural network, a deep neural network, a deep belief network, a convolutional neural networks, a convolutional deep belief network, a large memory storage and retrieval neural network, a deep Boltzmann machine, a deep stacking network, a tensor deep stacking network, a spike and slab restricted Boltzmann machine, a compound hierarchical-deep model, a deep coding network, a multilayer kernel machine, or a deep Q-network.

Artificial neural networks (ANNs) are distributed computing systems, which consist of a number of neurons interconnected through connection points called synapses. Each synapse encodes the strength of the connection between the output of one neuron and the input of another. The output of each neuron is determined by the aggregate input received from other neurons that are connected to it. Thus, the output of a given neuron is based on the outputs of connected neurons from preceding layers and the strength of the connections as determined by the synaptic weights. An ANN is trained to solve a specific problem (e.g., pattern recognition) by adjusting the weights of the synapses such that a particular class of inputs produce a desired output.

Various methods may be used for this learning process. Certain methods may be suitable for specific tasks such as image recognition, speech recognition, or language processing. Training methods lead to a pattern of synaptic weights that, during the learning process, converges toward an optimal solution of the given problem. Backpropagation is one suitable methods for supervised learning, in which a known correct output is available during the learning process. The goal of such learning is to obtain a system that generalizes to data that were not available during training.

In general, during backpropagation, the output of the network is compared to the known correct output. An n error value is calculated for each of the neurons in the output layer. The error values are propagated backwards, starting from the output layer, to determine an error value associated with each neuron. The error values correspond to each neuron's contribution to the network output. The error values are then used to update the weights. By incremental correction in this way, the network output is adjusted to conform to the training data.

When applying backpropagation, an ANN rapidly attains a high accuracy on most of the examples in a training-set. The vast majority of training time is spent trying to further increase this test accuracy. During this time, a large number of the training data examples lead to little correction, since the system has already learned to recognize those examples. While in general, ANN performance tends to improve with the size of the data set, this can be explained by the fact that larger data-sets contain more borderline examples between the different classes on which the ANN is being trained.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Exemplary Embodiments In some embodiments, the disclosure provides a method of determining the endometrial state of a subject in need thereof, the method comprising
- (a) obtaining a sample from a subject or using a sample obtained from a subject;
- (b) determining a microRNA (miRNA) expression profile in the sample;
- (c) inputting the miRNA expression profile from step (b) into an trained machine-learning model to generate a report; and
- (d) determining the endometrial state of the subject based on the report.

In some embodiments, the disclosure provides a method of determining the endometrial state of a subject in need thereof during a first menstrual cycle, the method comprising
- (a) obtaining a sample from a subject or using a sample obtained from a subject;
- (b) determining a microRNA (miRNA) expression profile in the sample;
- (c) inputting the miRNA expression profile from step (b) into an trained machine-learning model to generate a report; and
- (d) determining the endometrial state of the subject based on the report.

In some embodiments, the disclosure provides a method of determining a time period when a subject is receptive to embryo transfer, the method comprising
- (a) obtaining a sample from a subject or using a sample obtained from a subject;
- (b) determining a microRNA (miRNA) expression profile in the sample;
- (c) inputting the miRNA expression profile from step (b) into an trained machine-learning model to generate a report;
- (d) identifying the endometrial state of the subject based on the report; and
- (e) determining the time period when the subject is receptive to embryo transfer based on the endometrial state of the subject.

In some embodiments, the disclosure provides a method of determining a time period when a subject is receptive to embryo transfer during a first menstrual cycle, the method comprising
- (a) obtaining a sample from a subject or using a sample obtained from a subject;
- (b) determining a microRNA (miRNA) expression profile in the sample;
- (c) inputting the miRNA expression profile from step (b) into an trained machine-learning model to generate a report;
- (d) identifying the endometrial state of the subject based on the report; and
- (e) determining the time period when the subject is receptive to embryo transfer based on the endometrial state of the subject.

In some embodiments, the disclosure provides a method of determining a time period when a subject is receptive to embryo transfer, the method comprising
- (a) obtaining a sample from a subject or using a sample obtained from a subject;
- (b) determining a microRNA (miRNA) expression profile in the sample;
- (c) inputting the miRNA expression profile from step (b) into an trained machine-learning model to generate a report;
- (d) identifying the endometrial state of the subject based on the report;
- (e) determining the time period when the subject is receptive to embryo transfer based on the endometrial state of the subject; and
- (f) generating an analysis report comprising the patient's endometrial receptivity status, and a recommended time for embryo implantation.

In some embodiments, the disclosure provides a method of determining a time period when a subject is receptive to embryo transfer during a first menstrual cycle, the method comprising
- (a) obtaining a sample from a subject or using a sample obtained from a subject;
- (b) determining a microRNA (miRNA) expression profile in the sample;
- (c) inputting the miRNA expression profile from step (b) into an trained machine-learning model to generate a report;
- (d) identifying the endometrial state of the subject based on the report;
- (e) determining the time period when the subject is receptive to embryo transfer based on the endometrial state of the subject; and
- (f) generating an analysis report comprising the patient's endometrial receptivity status, and a recommended time for embryo implantation.

In some embodiments, the disclosure provides a method of determining a time period when a subject is receptive to embryo transfer during a first menstrual cycle, the method comprising
- (a) obtaining a sample from a subject or using a sample obtained from a subject;
- (b) determining a microRNA (miRNA) expression profile in the sample;
- (c) inputting the miRNA expression profile from step (b) into an trained machine-learning model to generate a report;
- (d) identifying the endometrial state of the subject based on the report;
- (e) determining the time period when the subject is receptive to embryo transfer based on the endometrial state of the subject; and
- (f) transferring an embryo to the subject during a subsequent menstrual cycle in the subject, wherein the embryo is transferred during the time period identified during steps (a)-(e) from the first menstrual cycle as the time period when the subject is receptive to embryo transfer.

In some embodiments, the disclosure provides a method of determining a time period when a subject is receptive to embryo transfer during a first menstrual cycle, the method comprising
- (a) obtaining a sample from a subject or using a sample obtained from a subject;
- (b) determining a microRNA (miRNA) expression profile in the sample;
- (c) inputting the miRNA expression profile from step (b) into an trained machine-learning model to generate a report;

(d) identifying the endometrial state of the subject based on the report;

(e) determining the time period when the subject is receptive to embryo transfer based on the endometrial state of the subject;

(f) generating an analysis report comprising the patient's endometrial receptivity status, and a recommended time for embryo implantation based on steps (a)-(e), and providing said report to a physician; and (g) transferring an embryo to the subject during a subsequent menstrual cycle in the subject, wherein the embryo is transferred during the recommended time period identified in the report from the first menstrual cycle as the time period when the subject is receptive to embryo transfer.

In some embodiments, the disclosure provides a method comprising:

obtaining a blood sample of a patient in an in vitro fertilization (IVF) cycle, the blood sample drawn from the patient on the day of an embryo transfer for the IVF cycle;

determining, based on a machine-learning model trained to determine an endometrium status based on miRNA expression profile data from the blood sample, a predicted endometrium status of the patient at the time of the embryo transfer based on an miRNA expression profile from the blood sample;

generating a predicted embryo transfer date based on the predicted endometrium status; and administering a subsequent IVF cycle on the patient by performing an embryo transfer on the predicted embryo transfer date.

In some embodiments, the disclosure provides a method comprising:

obtaining a blood sample of a patient in a first in vitro fertilization (IVF) cycle, the blood sample drawn from the patient on the day of an embryo transfer and prior to the embryo transfer for the IVF cycle;

determining, based on a machine-learning model trained to determine an endometrium status based on miRNA expression profile data from the blood sample, a predicted endometrium status of the patient at the time of the embryo transfer based on an miRNA expression profile from the blood sample;

generating a predicted embryo transfer date based on the predicted endometrium status;

administering a pregnancy test to the patient, and upon the pregnancy test being negative; and administering a subsequent IVF cycle on the patient by performing an embryo transfer on the predicted embryo transfer date determined from the machine-learning model.

In some embodiments, the disclosure provides a method comprising:

determining endometrial status data for a plurality of patients, the endometrial status data retrieved from at least one of endometrium samples and pregnancy outcomes;

associating respective miRNA expression profiles from the plurality of patients with endometrial status data, each miRNA expression profile of a respective patient being associated with an endometrial status of the respective patient; and training a machine-learning model based on the associated miRNA expression profiles and associated endometrial status data, the trained machine-learning model trained to output a predicted endometrial status based on an inputted miRNA expression profile.

In some embodiments, the methods described herein result in determining a patient's endometrial receptivity state. In some embodiments, a patient's endometrial receptivity state determined using the methods described herein is provided on an analysis report. In some embodiments, a patients' endometrial receptivity state determined using the methods described herein is provided on an analysis report to a physician. In some embodiments, a patient's endometrial receptivity state determined using the methods described herein is provided on an analysis report comprising a recommended time for embryo implantation. In some embodiments, a patient is administered an IVF cycle using the recommended time for embryo implantation provided on an analysis report. In some embodiments, a patient is administered an IVF cycle using the recommended time for embryo implantation provided on an analysis report comprising the endometrial receptivity state as determined using the methods described herein.

In some embodiments, the embryo transfer is a fresh embryo transfer. In some embodiments, the embryo transfer is a frozen embryo transfer (FET).

EXAMPLES

Example 1: Optimal Receptivity Assay

Figure 1B:
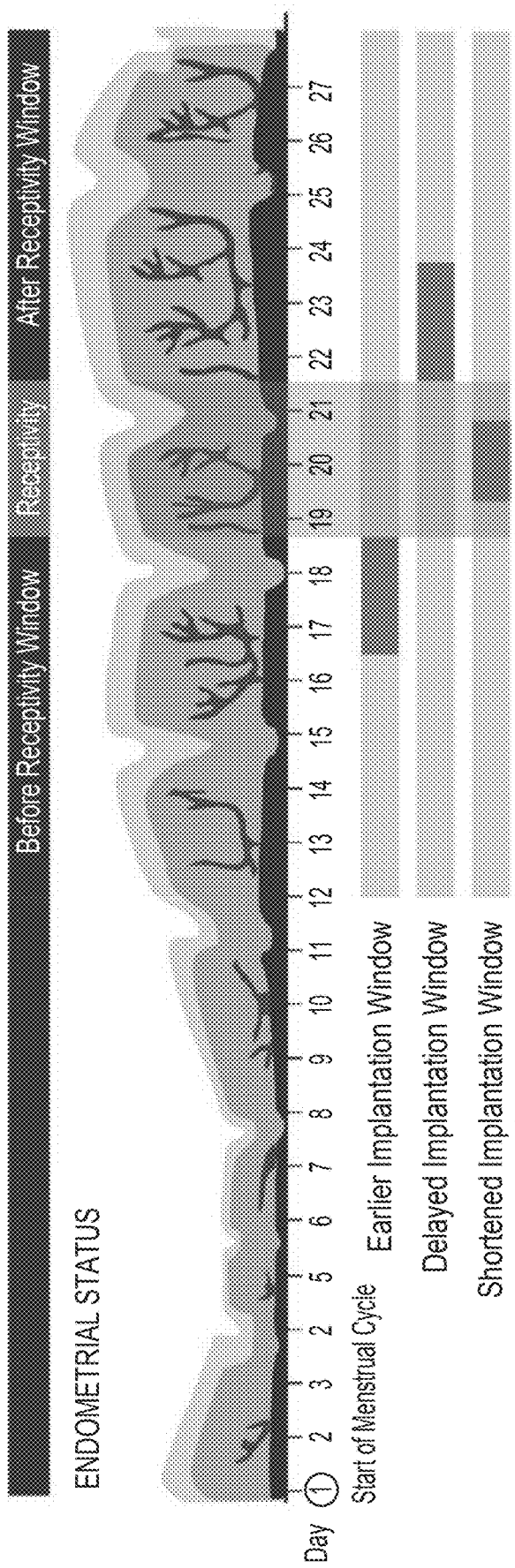
FIG. 1B provides a schematic depicting endometrial status through a human female menstrual cycle. The Standard Receptivity Window (or window of implantation) typically occurs about 19-21 days after the start of the menstrual cycle.
Figure 1C:
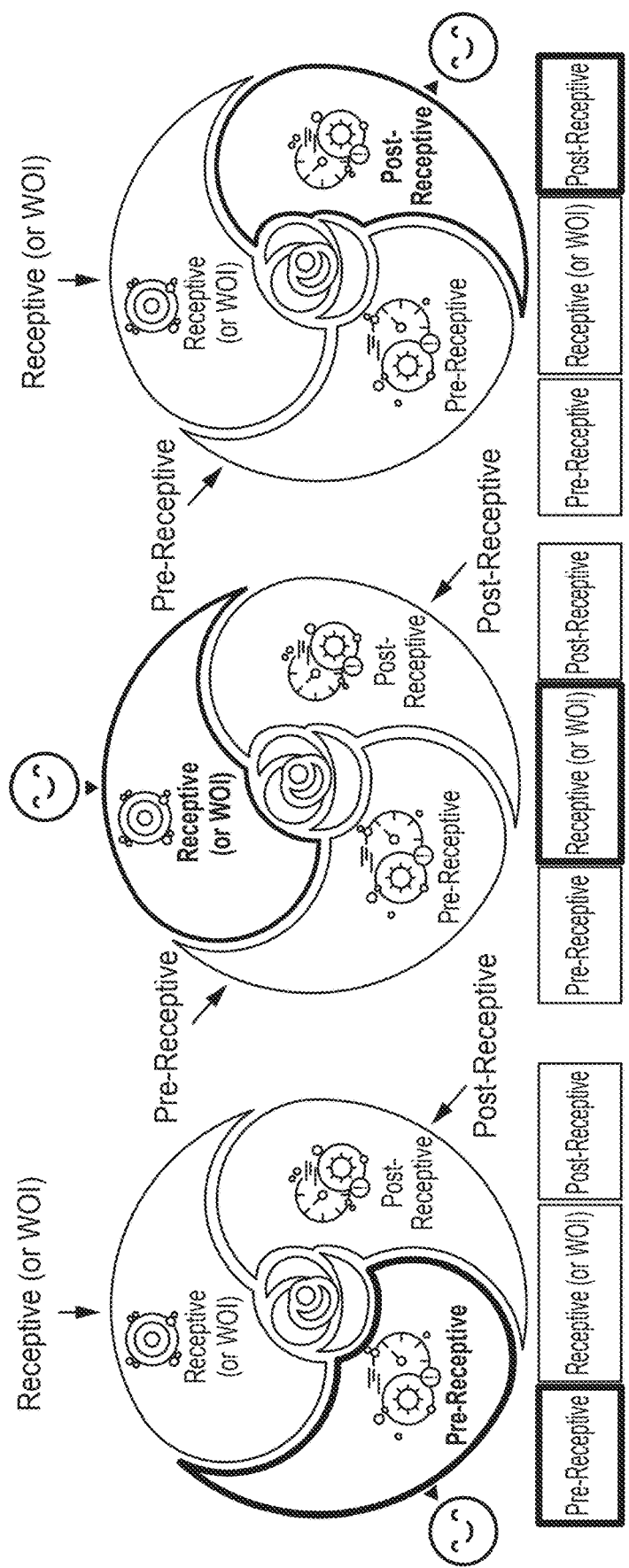
FIG. 1C provides a diagram demonstrating different windows of endometrial receptivity including the pre-receptive stage, the receptive stage, and the post-receptive stage.

In recent years, identifying displaced window of implantation (WOI) in patients with recurrent implantation failure (RIF) is a critical step in the in vitro fertilization (IVF) process for improving successful implantation rates. About 30 percent of infertile women have a displaced window of implantation which contributes to IVF failure (FIG. 1A). The endometrial status of a patient can be in the receptive stage, the pre-receptive stage, or the post-receptive stage (FIGS. 1B and 1C). Several molecular assays and platforms have been developed for assessment of the endometrial status. Until now, undergoing an invasive biopsy to obtain endometrial tissue sample from an IVF patient has been the universal sample input for conducting endometrial receptivity analysis (Table 1). Generally, the WOI or standard receptivity window is about 19-21 days after start of the menstrual cycle, but a patients optimal window may fall earlier than that time frame or be delayed (FIG. 1).

TABLE 1

Endometrial Receptivity Platforms

| Platform | Igenomix ERA | Yikon ERT | Cooper Genomics ERPeak | MIRA ® |
|---|---|---|---|---|
| Type | Invasive | Invasive | Invasive | Invasive |
| Sample requirement | Endometrial tissue | Endometrial tissue | Endometrial tissue | Endometrial tissue (minimal) |
| Biomarkers | mRNA | mRNA | mRNA | miRNA |

TABLE 1-continued

Endometrial Receptivity Platforms

| Platform | Igenomix ERA | Yikon ERT | Cooper Genomics ERPeak | MIRA® |
|---|---|---|---|---|
| Platform | NGS | NGS | qPCR | qPCR array |
| Laboratory | Centralized | Centralized | Centralized | Decentralized and Centralized |
| Turnaround Time | 10-12 working days | 10-15 working days | N/A | 2 working days |

Figure 3:
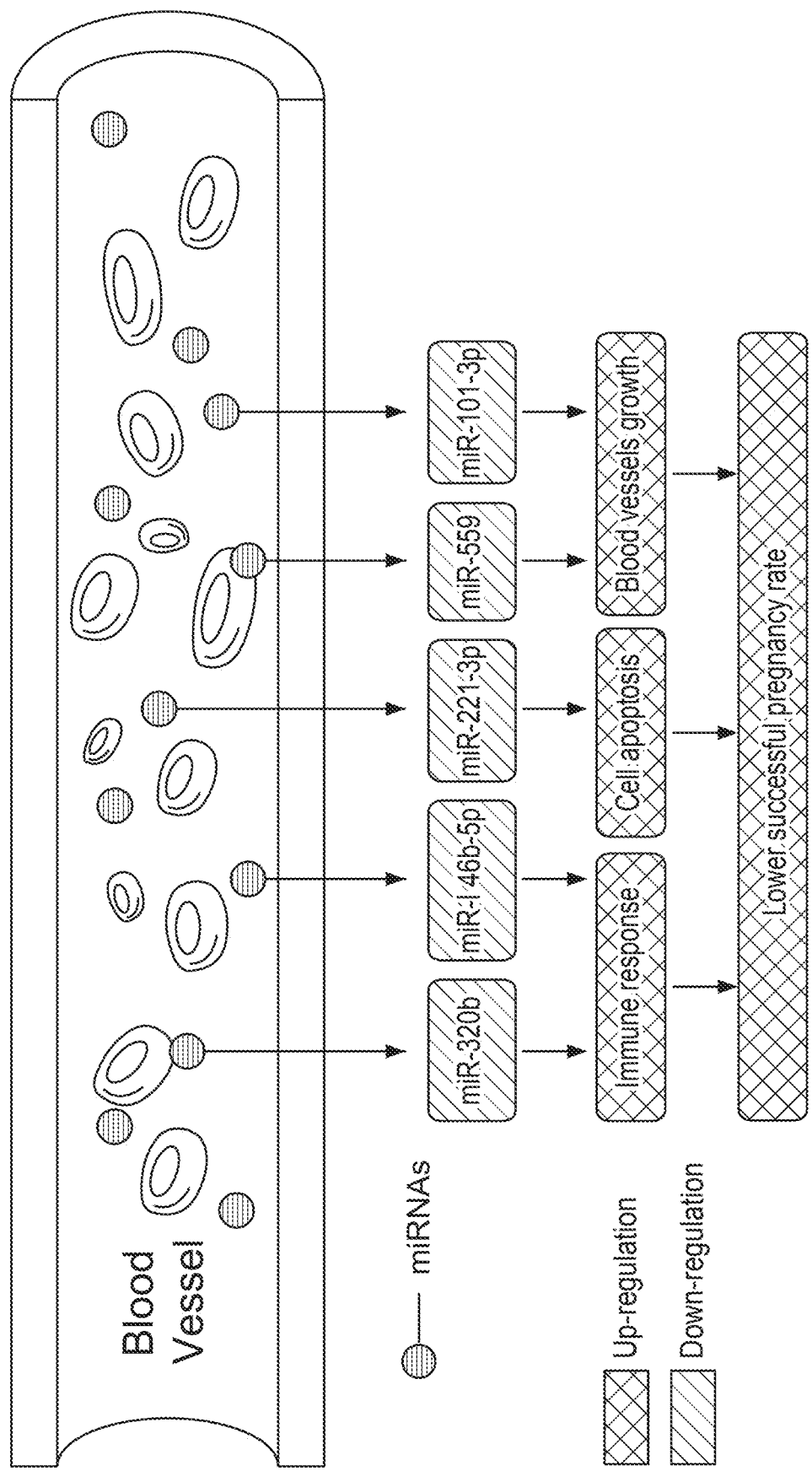
FIG. 3 provides a diagram depicting the presence of miRNAs in the blood. miRNA are known to regulate immune mechanisms, cell apoptosis, and angiogenesis during pregnancy. These miRNA are measured in the blood using the Optimal Receptivity Assay (ORA®) analysis to determine endometrial receptivity.

The following examples describe the development of a non-invasive assay for predicting the WOI in patients using blood plasma samples. The method comprises collecting a blood sample from a patient and performing Next-Generation sequencing to measure miRNA; using an analysis pipeline developed by the Applicant an miRNA biomarker panel was discovered to determine a window of implantation (WOI) (workflow shown in FIGS. 2A-2C). miRNAs are known to play a key role in the process of embryo implantation. miRNAs serve as biomarkers for predicting endometrial receptivity using biopsies and bodily fluids. The method described herein utilizes miRNA present in blood which provide information on various cellular functions to determine endometrial receptivity (FIG. 3)

The pipeline for use of this clinical analysis is depicted in FIGS. 2A and 2B and described below:

Blood Draw: Blood was collected from a subject. Blood was drawn during a hormone replacement therapy cycle or a natural cycle. Blood was collected either after 4 days (96 hours) and 5 days (120 hours) of progesterone administration in an HRT cycle, or after 6 days (144 hours) and 7 days (168 hours) from the time an LH surge was detected or from when human chorionic gonadotropic (hGC) was administered in a natural cycle). Blood samples were collected using at least a 21 g needle to minimize hemolysis. Hemolysis was monitored during the pre-processing steps while processing the blood into plasma as hemolysis would skew the data analysis.

Pre-processing: Whole blood was processed into plasma. This step was performed at the clinic where the blood was drawn. Hemolysis was monitored during the pre-processing step as hemolysis would skew the data analysis.

Sample Extraction: The pre-processed plasma was then sent to a laboratory for RNA extraction.

Library Preparation: The extracted miRNA was prepared for Next-Generation Sequencing Sequencing: Next Generation Sequencing was performed on the sample Data Analysis: miRNA measured in the sample was analyzed using the Optimal Receptivity Assay (ORA®) predictive model Final Report: Based on the Optimal Receptivity Assay (ORA®) analysis, samples were placed into one or four endometrium status groups, an inconclusive group, or an invalid/insufficient RNA group (less than 1 percent of samples results in an inconclusive or invalid/insufficient RNA result using the Optimal Receptivity Assay (ORA®) method); the six groups are described as follows:

a. pre-receptive: The endometrium was not yet ready for embryo implantation and implanting at the time at which the blood draw was performed was not ideal. It was recommended to delay the embryo implantation time during the next treatment cycle. Embryo transfer was delayed by 24 hours.

b. receptive: The optimal time for embryo transfer was at the time at which the blood draw was performed c. post-receptive (short window): The endometrium had passed the optimal time for embryo implantation. It was recommended to adjust the timing of embryo implantation during the next treatment cycle by moving forward by 12 hours.

d. post-receptive (average window): The endometrium had passed the optimal time for embryo implantation. It was recommended to adjust the timing of embryo implantation during the next treatment cycle by moving forward by 24 hours.

e. Inconclusive: The resulting data does not match Optimal Receptivity Assay (ORA®) method and database and was unable to proceed with analysis. This could be due to existing physiological conditions or variations that have occurred during the sample submission process f. Invalid/insufficient RNA: Results could not be obtained due to the low concentration of the extracted material (miRNA). The blood draw needed performed again in hopes of obtaining higher concentration to proceed with Optimal Receptivity Assay (ORA®)

Embryo transfer: The healthcare provide performed embryo transfer during next treatment cycle according to Optimal Receptivity Assay (ORA®) test results.

Study Population

Figure 4:
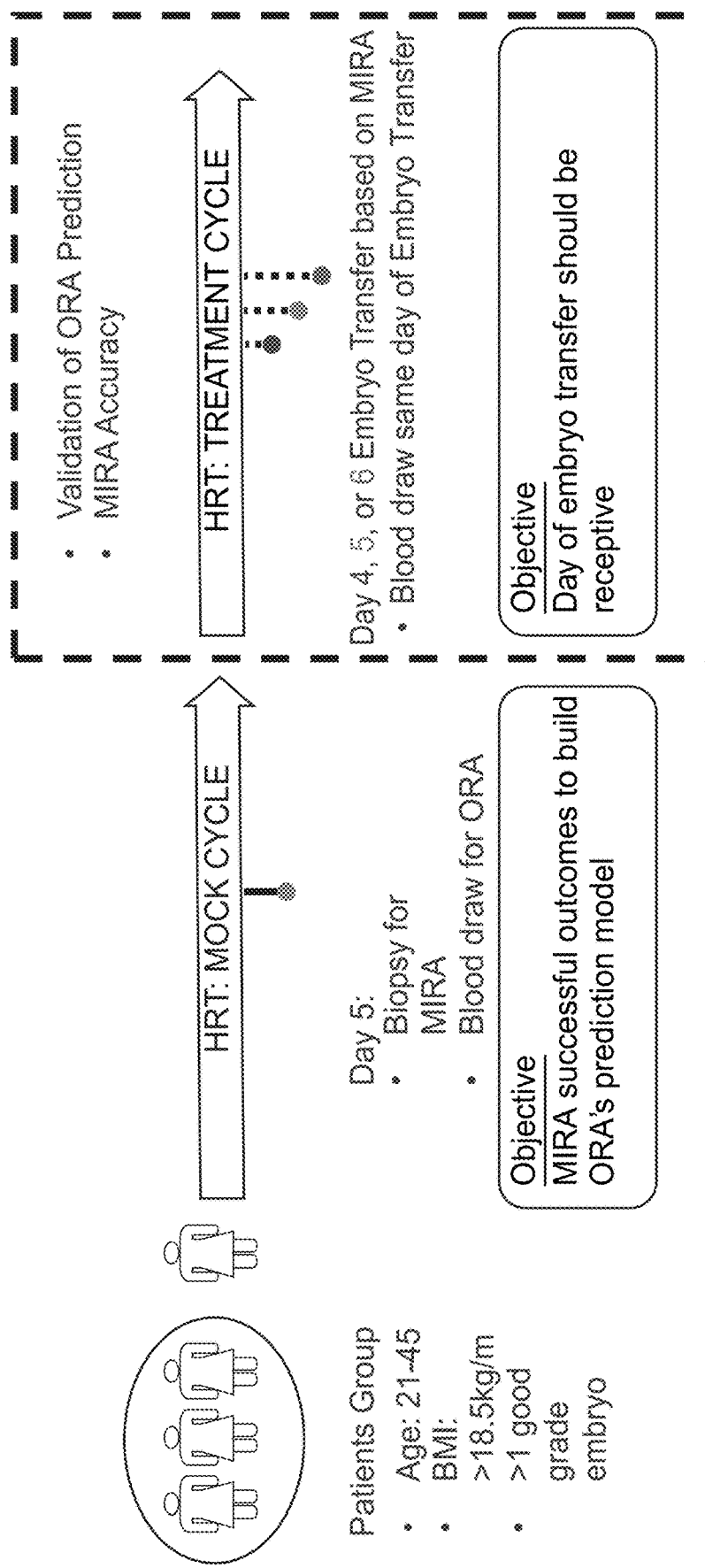
FIG. 4 provides a diagram demonstrating the Optimal Receptivity Assay (ORA®) study group. Patients include those age 21-45, with a BMI greater than 18.5, and greater than one good grade embryo. During a hormone replacement therapy (HRT) mock cycle on day 5 after progesterone administration, a biopsy for MIRA analysis and a blood draw for Optimal Receptivity Assay (ORA®) is collected. Next, during the treatment/implantation cycle after the WOI is determined using MIRA, an additional blood sample is collected for Optimal Receptivity Assay (ORA®) analysis to validate the prediction model. In some embodiments, during the treatment cycle (e.g., IVF) after the WOI is determined using MIRA, an additional blood sample is collected for Optimal Receptivity Assay (ORA®) analysis to validate the prediction model.

The population under study consisted of a cohort of 184 subjects collected between January 2021 to December 2022. The inclusion criteria for the subjects were: age between 21 and 45 years; absence of ovulatory disorders such as endometriosis, myomas, polyps or hydrosalpinx; body mass index (BMI)>18.5 kg/m$^2$ (Table 2). Subjects were separated into a prediction model building dataset (111 samples) and a validation dataset (73 samples). Subjects were also required to have greater than one good grade embryo. Both endometrial tissue and peripheral blood samples were collected during a mock hormone replacement therapy cycle 5 days (approximately 116-117 hours) after the starting progesterone administration. In order to identify the endometrial stage of the window of implantation, the endometrial tissue sample was tested on ready-to-use endometrial receptivity tests available on the market. Then, in a subsequent hormone replacement therapy (HRT) cycle, embryo(s) were transferred based on the endometrial receptivity test result (i.e., on day 4, 5, or 6 based on biopsy results) (FIG. 4). If the implantation was successful, the corresponding blood sample of the patient was included for further analysis of miRNA expression patterns and prediction model establishment. In addition to miRNA expression patterns, clinical information such as age, body mass index (BMI) and the history of implantation failure, were collected for optimization of the prediction model's accuracy.

TABLE 2

Clinical characteristics of prediction model building dataset and validation dataset

| Parameter | Prediction model building dataset | | | Validation dataset | | |
|---|---|---|---|---|---|---|
| | Pre (n = 30) | Rec (n = 75) | Post (n = 6) | Pre (n = 3) | Rec (n = 67) | Post (n = 4) |
| Age (years) Median (range) | 36.9 (30-44) | 37.8 (30-50) | 36.0 (28-39) | 37.7 (34-41) | 36.6 (29-44) | 36.0 (35-37) |
| BMI (kg/m$^2$) Median (range) | 23.4 (18.3-35.3) | 23.1 (18.3-38.3) | 23.4 (21.1-25) | 22.0 (19.2-23.6) | 22.9 (18.2-35.3) | 25.0 (24.5-25.5) |

Uterine Sample Collection

Uterine fluid (UF) was obtained by lavage after flushing the uterus with 0.5 ml of phosphate buffered saline (PBS) for 30 seconds and then aspirating the fluid. The procedure was carried out with an intrauterine insemination catheter (Cooper Surgical, Connecticut, USA) inserted through the cervical canal into the uterine cavity, while avoiding touching the uterine fundus.

UF samples were obtained by lavage of the endometrial cavity with 2.5 ml of sterile saline solution using a balloon hysterosonography catheter to avoid vaginal contamination.

Plasma Sample Collection

Peripheral blood samples (5-10 ml per subject) were obtained from subjects undergoing hormone replacement therapy cycles. The blood sample was collected into EDTA tubes (BD, USA, Cat. No. 367525) or Plasma Preparation Tubes (BD, USA, Cat. No. 362788). After the blood sample was collected, the tubes were inverted at least five times and processed within 1 to 2 hours. Then, each specimen was centrifuged at 1200 g for 10 minutes at room temperature to separate the plasma from remaining cells. The supernatant was transferred to new tubes and centrifuged at 12000 g for 10 minutes. Finally, the plasma samples were transferred to new tubes and stored at −80° C. The plasma samples were subsequently transferred to new tubes and stored at −80° C.

Methods of miRNA extraction and sequencing are described in the following examples.

Example 2: Methods of Plasma miRNA Extraction

Plasma samples are thawed on ice from −80° C. freezer. miRNA is extracted from the plasma sample using the miRNeasy Serum/Plasma Advanced Kit (Qiagen, Germany, Cat. No. 217204) following the manufacturers protocol and included:
  i. the plasma sample input of 200 µL-600 µL to produce greater than 10 ng of plasma miRNA, and
  ii. a pre-amplification step was performed.

The Extraction Spike-in control, cel-miR-2-3p, utilized in the miRNA extraction comprises an RNA oligo of SEQ ID NO: 1 (/5Phos/rUrArUrCrArCrArGrCrCrArGrCrUrUrUr-GrArUrGrUrGrC) at 10^8 copies/µL in the Buffer RPL. The Extraction Spike-in control is prepared by measuring the total copy number of the RNA oligo using Qubit Fluorometric Analysis according to the manufacturers methods and diluting the RNA oligo to 10^12 copies/µL in nuclease-free water containing 10 ng/µL of yeast tRNA (Invitrogen Catalog No. AM7119). The RNA oligo is further diluted from 10^12 copies/µL to 10^8 copies/µL in nuclease-free water for use in the miRNA extraction protocol. Following dilution, the spike-in control is mixed with the buffer RPL and the extraction is carried out per manufacturers protocols. Following extraction, the quality of the miRNA sample is then analyzed using the manufacturers methods for the Qubit Fluorometric Quantification Analysis (Thermo Fisher Cat. No. Q32880).

Example 3: Sequencing of miRNA in Plasma

RNA extracted in Example 1 was prepared for Next-Generation sequencing.

Library Preparation

The miRNA sequencing library was constructed using the QIAseq miRNA Library Kit (QIAGEN, Germany, Cat. No. 331502). RNA was concentrated and 3' ligation was carried out on the prepared miRNA sample. Immediately following 3' ligation, 5' ligation of the miRNA was carried out. Next, the samples were reverse transcribed using reverse transcription primers with unique molecular index (UMI). A cDNA cleanup was performed on the samples. Samples were then stored at −20° C. until library sample indexing and amplification. Library amplification mix was prepared and the sample was run through a thermal cycler program to amplify the product. Immediately following amplification, library amplification cleanup was completed. The quality of the library was checked using the 5200 Fragment Analyzer System (Agilent Technologies). The size of the library product was between 190-220 bps. The library was quantified by Quibit (Thermo Fisher Scientific, USA, Cat. No. Q32851), and the concentration used for sequencing was greater than 1 ng/µL.

Sequencing

The miRNA library was sequenced on the NextSeq 550 using the Illumina NextSeq 550 System Sequencing Reaction protocol. The data analysis pipeline included the following protocol: 1). Data preprocess by performing quality control on raw fastq data, including trimming adapter sequences, and removing low-quality reads using FastQC and Trimmomatic. After trimming low-quality (Q value<20) ends from reads in addition to adapter removal, reads that are shorter than 17 bps or longer than 55 bps were discarded. 2). Alignment of processed reads to Human Genome Assembly GRCh38 (hg38) reference genome and a specific set of small RNA sequences from miRBase is performed by using aligners such as Bowtie. 3). Quantification of extracted reads from the data by mapping the aligned reads using samtools and obtained reference annotations using miRBase. The read counts of each miRNA were used as the expression value for further data analysis. The total count of miRNA was calculated by summing the values of total miRNAs for each sample. The ratio of each miRNA was calculated by dividing the read counts of each miRNA by the total counts of miRNA. The resulting values were multiplied by 1,000,000 to obtain a ratio. After data normalization, the log 2 transformation of a given final normalized value was calculated. On average, miRNAs accounted for approximately 5% of the total sequencing reads. Therefore, a significant proportion of small RNAs were not analyzed. The sequencing results of 111 samples used for the prediction model building data set are shown in Table 3. The average sequencing depth was 8,000,795×, and the average read counts of detectable miRNAs was 395,433 reads, accounting for an average proportion of 4.8% of the total sequencing reads. The average number of detectable miRNAs was 135.

TABLE 3

Sequencing result of prediction model building data set (111 samples)

| Item | Average | Range |
|---|---|---|
| Total reads | 8,000,795 | (5,459,122-10,043,952) |
| miRNA reads | 395,433 | (15,567-1,675,377) |
| miRNA % (miRNA reads/Total reads) | 4.8% | (0.3%-18.7%) |
| Detectable miRNAs (read counts >20) | 135 | (40-263) |

Example 4: Optimal Receptivity Assay Workflow Establishment

Figure 5:
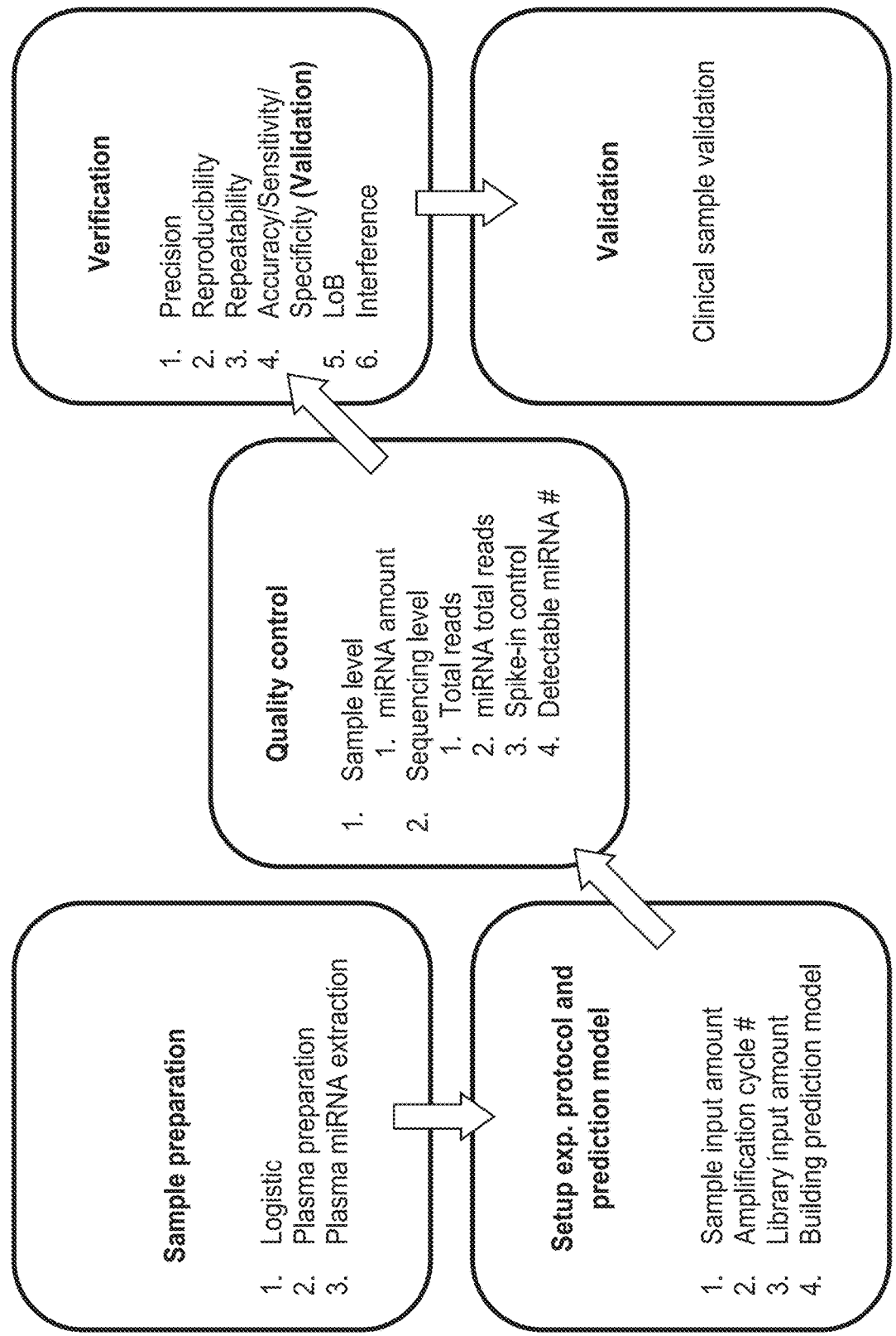
FIG. 5 provides a schematic depicting the workflow of sample preparation, setup of the prediction model, quality control, verification, and validation.
Figure 6A:
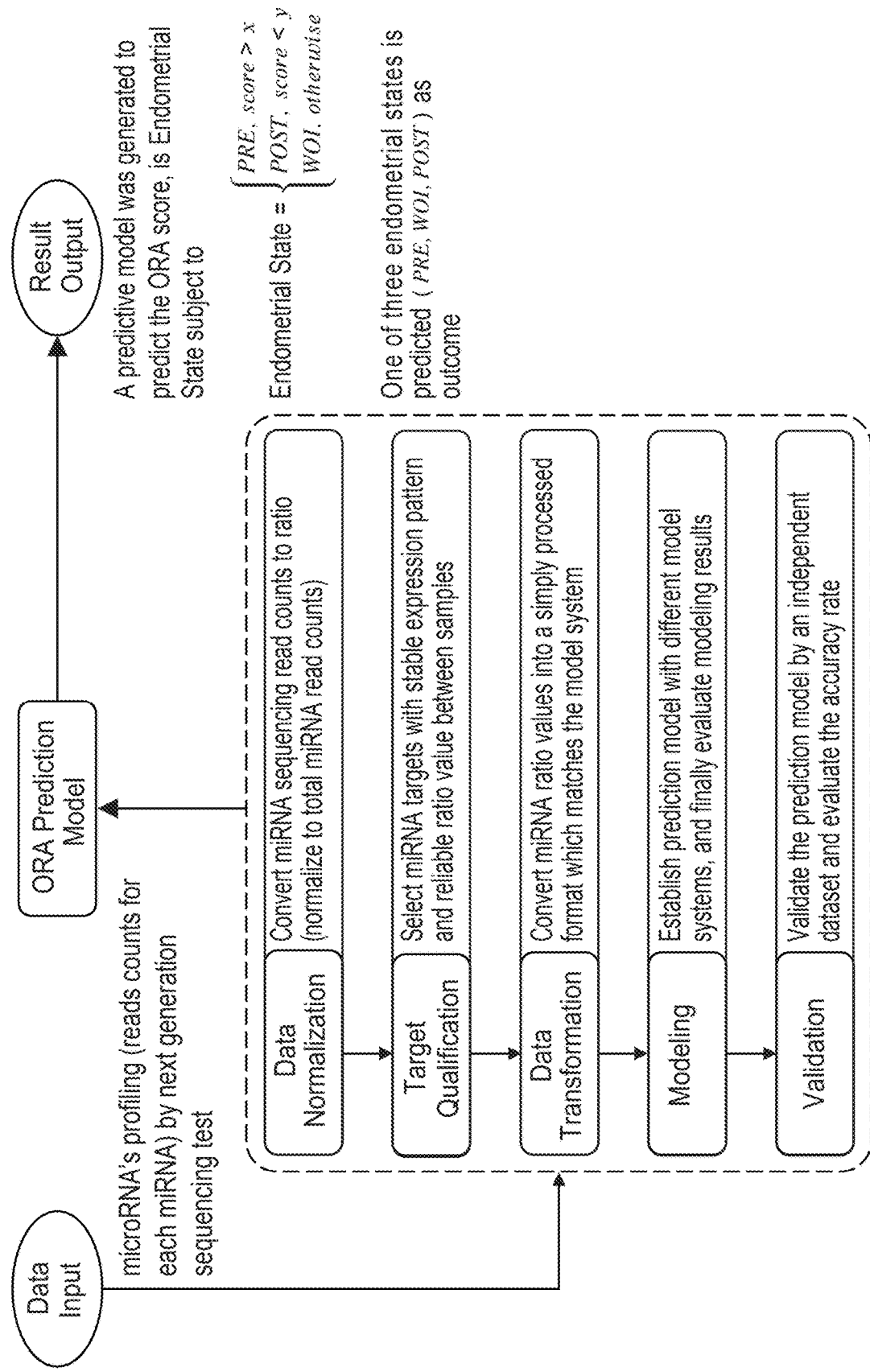
FIGS. 6A-6B are schematics depicting the process on how the computer-based method for the Optimal Receptivity Assay is built and how Optimal Receptivity Assay (ORA®) produced test results.
Figure 6B:
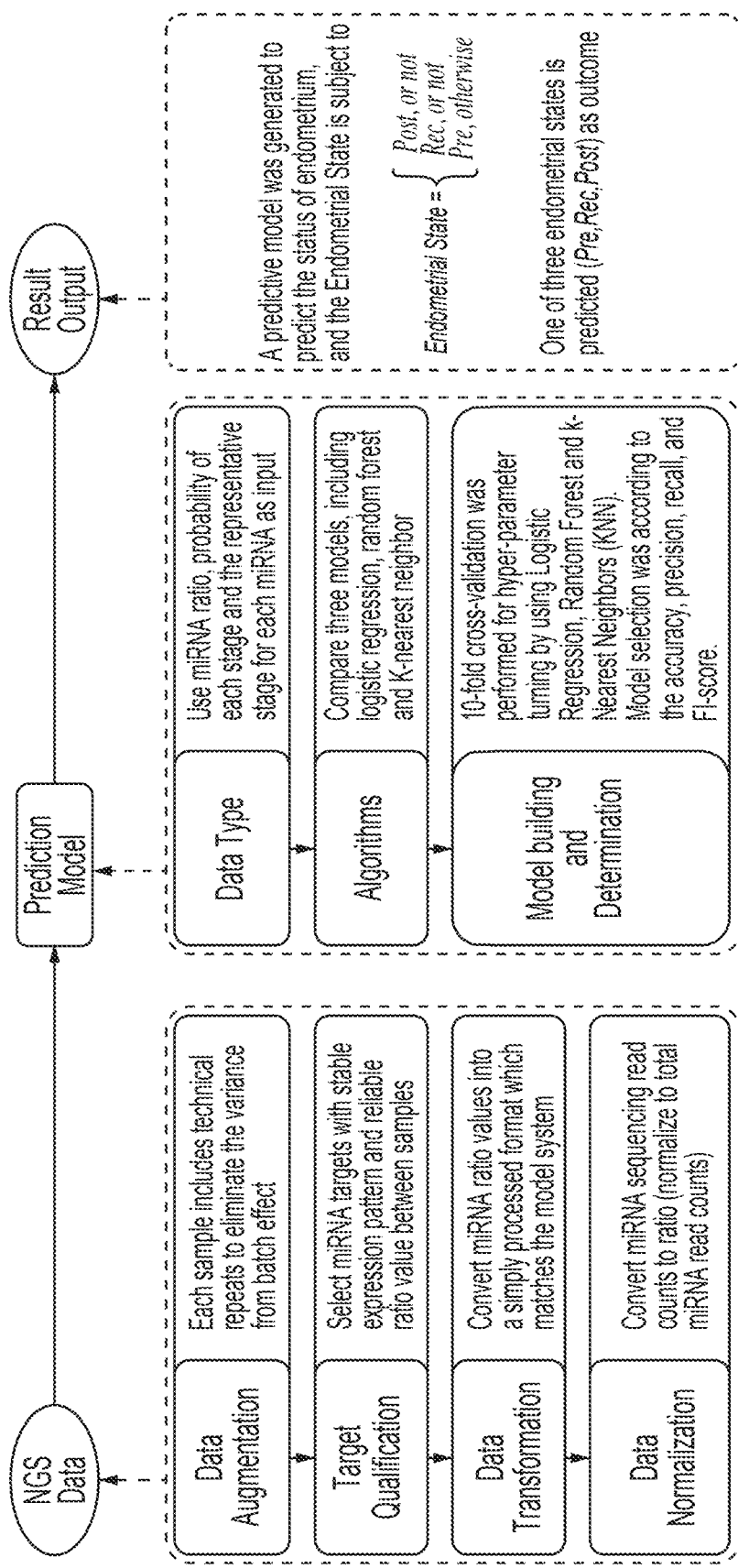

Upon completion of Next-Generation sequencing of miRNA in the blood plasma samples of patients, the raw data was used to identify the window of implantation (WOI) for a subject. As shown in FIGS. 5 and 6, the computer based Optimal Receptivity Assay (ORA®) analysis was built by performing one or more of the following steps: quality control, data normalization (converting miRNA sequencing read counts to a ratio with the total read count), target qualification (by selecting miRNA targets with stable expression patterns and reliable ration value between different patient samples), data transformation (converting the miRNA ratio into a processed format for use in the modeling system), prediction modeling (establishing the Optimal Receptivity Assay (ORA®) model), and cross-validation (validating the prediction model by an independent dataset to evaluate accuracy; Table 6). Quality control reviews miRNA amount used in sequencing, and the total reads, total miRNA reads, spike-in control reads, and detectable miRNA number from sequencing. Verification of the dataset using Optimal Receptivity Assay (ORA®) looks at precision, reproducibility, repeatability, limit of blank (LoB), and interference. The dataset is validated by looking at accuracy, sensitivity, and specificity.

The RNA sequencing data was grouped and analyzed based on the different stages of receptivity determined by the tissued-based endometrial receptivity test. Grouping the miRNA from the plasma samples based on receptive, pre-receptive, and post-receptive endometrial stages, and using unsupervised clustering, showed the miRNAs were capable of distinguishing the three stages. The model used logistic regression with a 10-fold cross validation using known pregnancy results of subjects compared to that of the blood sample collected for miRNA analysis. In addition, the miRNA expression was combined with clinical features of the patients such as age, BMI, and implantation failure history. The accuracy of Optimal Receptivity Assay (ORA®) for determining the WOI is predicted to be about 98.1 percent (Table 4). Upon establishment of the expected window of implantation using MIRA, Optimal Receptivity Assay (ORA®) was able to properly predict the receptive window for a subject (Table 5).

To validate the performance of the prediction model dataset, the validation dataset which included 3 samples in the pre-receptive stage, 66 samples in the receptive stage, and 4 samples in the post receptive stage (Table 2) previously determined by MIRA. Each of the patients had a successful implantation result. After analyzing all 73 samples using the prediction model, the overall accuracy was determined to be 95.9%. Specifically, accuracies of 95.9%, 95.9%, and 100.0% for the pre-receptive group, the receptive group, and the post-respective group, respectively were achieved (Table 6).

Figure 7:
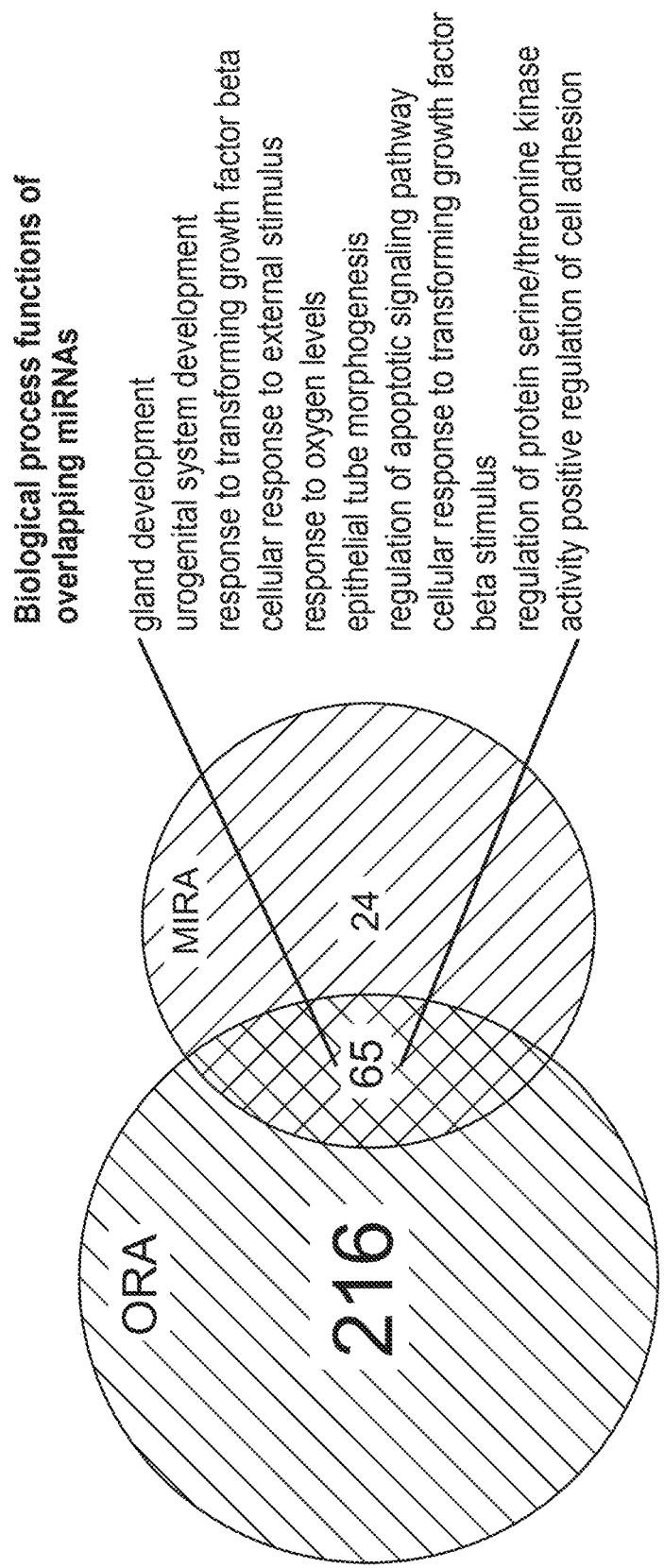
FIG. 7 is a diagram showing the novel miRNA biomarkers identified for the Optimal Receptivity Assay (ORA®) prediction model compared to the MIRA prediction model. The Optimal Receptivity Assay (ORA®) and MIRA prediction models share 65 similar miRNA which contribute to various biological processes.

The Optimal Receptivity Assay (ORA®) prediction model is based on 281 individual mRNA (Table 7). The model utilizes 216 novel miRNA biomarkers and 65 miRNA biomarkers (FIG. 7) which were previously identified using the MIRA method (U.S. Patent Publication No. 2021/0002698). The shared biomarkers related to processes such as gland development, urogenital system development, and response to oxygen levels among others (FIG. 7).

TABLE 5

Performance Validation of Optimal Receptivity Assay (ORA ®)[[ORA]]

| Stage | Expected Window | Actual Prediction with Optimal Receptivity Assay (ORA ®)[[ORA]] Model |
|---|---|---|
| PRE | — | 0 |
| RECEPTIVE | 44* | 44 |
| POST | — | 0 |

*Of the 44 samples, 27 subjects were pre-receptive and 17 were post-receptive. The Optimal Receptivity Assay (ORA ®)[[ORA]] model was accurately able to predict the proper receptive window for all 44 subjects.

TABLE 7

| ORA miRNA |
|---|
| hsa-let-7b-3p |
| hsa-let-7d-3p |
| hsa-let-7i-5p |
| hsa-miR-1-3p |
| hsa-miR-100-5p |
| hsa-miR-106b-3p |
| hsa-miR-10a-3p |
| hsa-miR-10a-5p |
| hsa-miR-10b-5p |
| hsa-miR-1180-3p |
| hsa-miR-1255b-5p |
| hsa-miR-125a-3p |
| hsa-miR-125b-5p |
| hsa-miR-1260a |
| hsa-miR-1260b |
| hsa-miR-1270 |
| hsa-miR-128-3p |
| hsa-miR-1285-3p |
| hsa-miR-1287-5p |
| hsa-miR-1292-5p |
| hsa-miR-1294 |
| hsa-miR-1298-5p |
| hsa-miR-1301-3p |
| hsa-miR-1303 |
| hsa-miR-1304-3p |
| hsa-miR-1306-5p |
| hsa-miR-1307-3p |
| hsa-miR-130b-3p |

TABLE 7-continued

| ORA miRNA |
|---|
| hsa-miR-139-3p |
| hsa-miR-140-5p |
| hsa-miR-141-3p |
| hsa-miR-142-3p |
| hsa-miR-143-3p |
| hsa-miR-145-5p |
| hsa-miR-1469 |
| hsa-miR-146a-5p |
| hsa-miR-146b-5p |
| hsa-miR-148a-3p |
| hsa-miR-151b |
| hsa-miR-1538 |
| hsa-miR-155-5p |
| hsa-miR-15b-3p |
| hsa-miR-17-3p |
| hsa-miR-17-5p |
| hsa-miR-181b-5p |
| hsa-miR-183-3p |
| hsa-miR-183-5p |
| hsa-miR-186-5p |
| hsa-miR-18a-5p |
| hsa-miR-1908-5p |
| hsa-miR-192-5p |
| hsa-miR-193a-5p |
| hsa-miR-193b-5p |
| hsa-miR-194-5p |
| hsa-miR-196b-5p |
| hsa-miR-197-3p |
| hsa-miR-199a-3p |
| hsa-miR-199b-3p |
| hsa-miR-19b-3p |
| hsa-miR-200c-3p |
| hsa-miR-204-3p |
| hsa-miR-205-5p |
| hsa-miR-210-3p |
| hsa-miR-2110 |
| hsa-miR-22-3p |
| hsa-miR-22-5p |
| hsa-miR-221-3p |
| hsa-miR-223-5p |
| hsa-miR-23b-3p |
| hsa-miR-24-3p |
| hsa-miR-25-5p |
| hsa-miR-27a-3p |
| hsa-miR-27b-3p |
| hsa-miR-27b-5p |
| hsa-miR-28-3p |
| hsa-miR-29b-3p |
| hsa-miR-29c-3p |
| hsa-miR-30a-3p |
| hsa-miR-30a-5p |
| hsa-miR-30d-5p |
| hsa-miR-30e-3p |
| hsa-miR-31-5p |
| hsa-miR-3135b |
| hsa-miR-3143 |
| hsa-miR-32-3p |
| hsa-miR-32-5p |
| hsa-miR-320d |
| hsa-miR-324-5p |
| hsa-miR-328-3p |
| hsa-miR-335-5p |
| hsa-miR-338-3p |
| hsa-miR-339-3p |
| hsa-miR-340-5p |
| hsa-miR-345-5p |
| hsa-miR-34a-5p |
| hsa-miR-3529-3p |
| hsa-miR-3605-3p |
| hsa-miR-3605-5p |
| hsa-miR-361-5p |
| hsa-miR-3612 |
| hsa-miR-3615 |
| hsa-miR-362-5p |
| hsa-miR-363-3p |
| hsa-miR-365a-3p |
| hsa-miR-365b-3p |
| hsa-miR-3688-3p |
| hsa-miR-374a-5p |
| hsa-miR-376a-3p |
| hsa-miR-376c-3p |
| hsa-miR-382-5p |
| hsa-miR-383-3p |
| hsa-miR-3913-3p |
| hsa-miR-3913-5p |
| hsa-miR-3960 |
| hsa-miR-3972 |
| hsa-miR-421 |
| hsa-miR-423-3p |
| hsa-miR-424-3p |
| hsa-miR-424-5p |
| hsa-miR-432-5p |
| hsa-miR-4429 |
| hsa-miR-450a-5p |
| hsa-miR-4510 |
| hsa-miR-454-3p |
| hsa-miR-4644 |
| hsa-miR-4732-5p |
| hsa-miR-483-5p |
| hsa-miR-497-5p |
| hsa-miR-5010-5p |
| hsa-miR-502-3p |
| hsa-miR-503-5p |
| hsa-miR-505-3p |
| hsa-miR-505-5p |
| hsa-miR-5189-3p |
| hsa-miR-532-3p |
| hsa-miR-542-3p |
| hsa-miR-548am-5p |
| hsa-miR-548c-5p |
| hsa-miR-548h-3p |
| hsa-miR-548o-5p |
| hsa-miR-548z |
| hsa-miR-550a-5p |
| hsa-miR-5585-5p |
| hsa-miR-574-3p |
| hsa-miR-576-5p |
| hsa-miR-589-5p |
| hsa-miR-590-3p |
| hsa-miR-598-3p |
| hsa-miR-625-3p |
| hsa-miR-625-5p |
| hsa-miR-628-3p |
| hsa-miR-642a-3p |
| hsa-miR-642a-5p |
| hsa-miR-642b-3p |
| hsa-miR-642b-5p |
| hsa-miR-652-3p |
| hsa-miR-657 |
| hsa-miR-660-5p |
| hsa-miR-663b |
| hsa-miR-664a-5p |
| hsa-miR-671-5p |
| hsa-miR-6815-5p |
| hsa-miR-7-5p |
| hsa-miR-744-5p |
| hsa-miR-766-3p |
| hsa-miR-769-5p |
| hsa-miR-877-5p |
| hsa-miR-885-3p |
| hsa-miR-885-5p |
| hsa-miR-93-3p |
| hsa-miR-941 |
| hsa-miR-95-3p |
| hsa-miR-96-5p |
| hsa-miR-99a-5p |
| hsa-miR-99b-5p |
| hsa-let-7a-5p |
| hsa-let-7b-5p |
| hsa-let-7c-5p |
| hsa-let-7d-5p |
| hsa-let-7e-5p |
| hsa-let-7f-5p |
| hsa-let-7g-5p |
| hsa-miR-103a-3p |
| hsa-miR-103b |

TABLE 7-continued

ORA miRNA

| |
|---|
| hsa-miR-106a-5p |
| hsa-miR-106b-5p |
| hsa-miR-107 |
| hsa-miR-12116 |
| hsa-miR-122-5p |
| hsa-miR-122b-3p |
| hsa-miR-1246 |
| hsa-miR-125a-5p |
| hsa-miR-126-3p |
| hsa-miR-126-5p |
| hsa-miR-1290 |
| hsa-miR-130a-3p |
| hsa-miR-132-3p |
| hsa-miR-139-5p |
| hsa-miR-140-3p |
| hsa-miR-142-5p |
| hsa-miR-144-3p |
| hsa-miR-150-3p |
| hsa-miR-150-5p |
| hsa-miR-151a-3p |
| hsa-miR-151a-5p |
| hsa-miR-15a-5p |
| hsa-miR-15b-5p |
| hsa-miR-16-5p |
| hsa-miR-181a-2-3p |
| hsa-miR-181a-3p |
| hsa-miR-181a-5p |
| hsa-miR-182-5p |
| hsa-miR-185-5p |
| hsa-miR-18b-5p |
| hsa-miR-191-5p |
| hsa-miR-195-5p |
| hsa-miR-200a-3p |
| hsa-miR-206 |
| hsa-miR-20a-5p |
| hsa-miR-20b-5p |
| hsa-miR-21-5p |
| hsa-miR-222-3p |
| hsa-miR-223-3p |
| hsa-miR-23a-3p |
| hsa-miR-25-3p |
| hsa-miR-26a-5p |
| hsa-miR-26b-5p |
| hsa-miR-28-5p |
| hsa-miR-29a-3p |
| hsa-miR-3065-5p |
| hsa-miR-3074-5p |
| hsa-miR-30b-5p |
| hsa-miR-30c-5p |
| hsa-miR-30e-5p |
| hsa-miR-3157-5p |
| hsa-miR-3184-3p |
| hsa-miR-3184-5p |
| hsa-miR-3200-5p |
| hsa-miR-320a-3p |
| hsa-miR-320b |
| hsa-miR-320c |
| hsa-miR-324-3p |
| hsa-miR-339-5p |
| hsa-miR-342-3p |
| hsa-miR-3614-3p |
| hsa-miR-3652 |
| hsa-miR-374b-5p |
| hsa-miR-374c-3p |
| hsa-miR-375-3p |
| hsa-miR-378a-3p |
| hsa-miR-378c |
| hsa-miR-3940-3p |
| hsa-miR-423-5p |
| hsa-miR-425-3p |
| hsa-miR-425-5p |
| hsa-miR-4298 |
| hsa-miR-451a |
| hsa-miR-4635 |
| hsa-miR-4685-5p |
| hsa-miR-4707-3p |
| hsa-miR-4771 |
| hsa-miR-484 |
| hsa-miR-486-3p |
| hsa-miR-486-5p |
| hsa-miR-499a-5p |
| hsa-miR-501-3p |
| hsa-miR-532-5p |
| hsa-miR-550a-3-5p |
| hsa-miR-574-5p |
| hsa-miR-629-5p |
| hsa-miR-651-5p |
| hsa-miR-6734-5p |
| hsa-miR-6786-3p |
| hsa-miR-6873-3p |
| hsa-miR-7706 |
| hsa-miR-7847-3p |
| hsa-miR-8485 |
| hsa-miR-92a-3p |
| hsa-miR-92b-3p |
| hsa-miR-93-5p |
| hsa-miR-98-5p |

Figure 8:
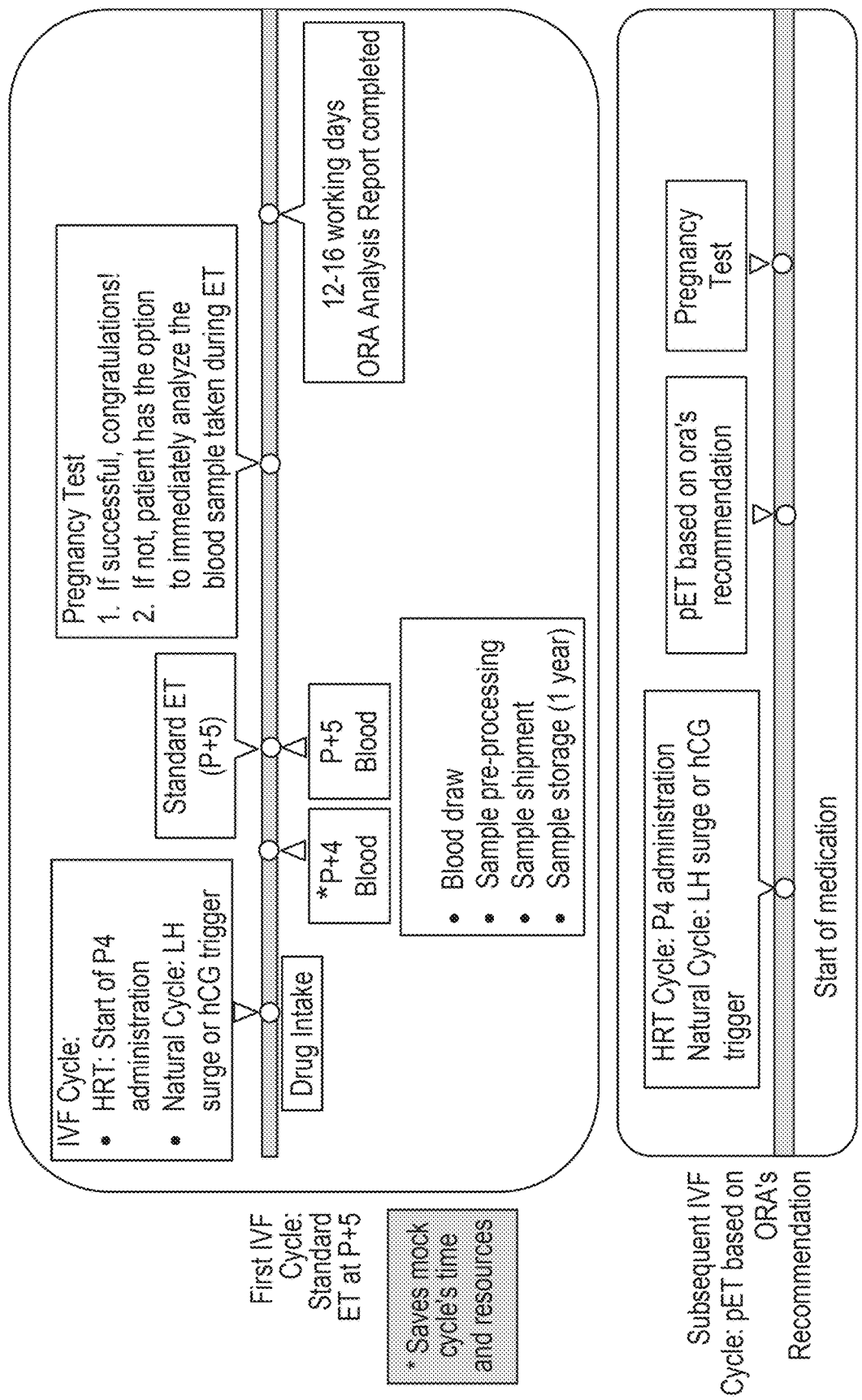
FIG. 8 is a schematic showing sample blood collection during a hormone replacement therapy (HRT) or natural cycle (LH) in a subject. If the embryo implantation is unsuccessful, the blood is processed and used to determine a personalized embryo transfer (pET) window based on prediction of Optimal Receptivity Assay (ORA®).

The Optimal Receptivity Assay (ORA®) method accurately predicts the optimal window of implantation for a subject. Known methods require invasive and painful tissue collection which require samples to be collected in operating rooms located at the same site for embryo transfer. In addition, these methods are costly and require mock cycles to determine the window of implantation. The Optimal Receptivity Assay (ORA®) method utilizes a non-invasive blood collection and does not require testing during a mock cycle which reduces costs and minimizes the time required between testing and embryo transfer. For example, during the first IVF cycle for a patient undergoing hormone therapy or under their natural cycle, blood is collected prior to embryo transfer. If the transfer is unsuccessful, the blood sample is processed and quantified using prediction model of Optimal Receptivity Assay (ORA®). Based on ORA's recommendation of Optimal Receptivity Assay (ORA®), a personalized embryo transfer (pET) is conducted during the next cycle. Thus, the time and cost associated with the traditional mock cycle is eliminated (FIG. 8).

Figure 9A:
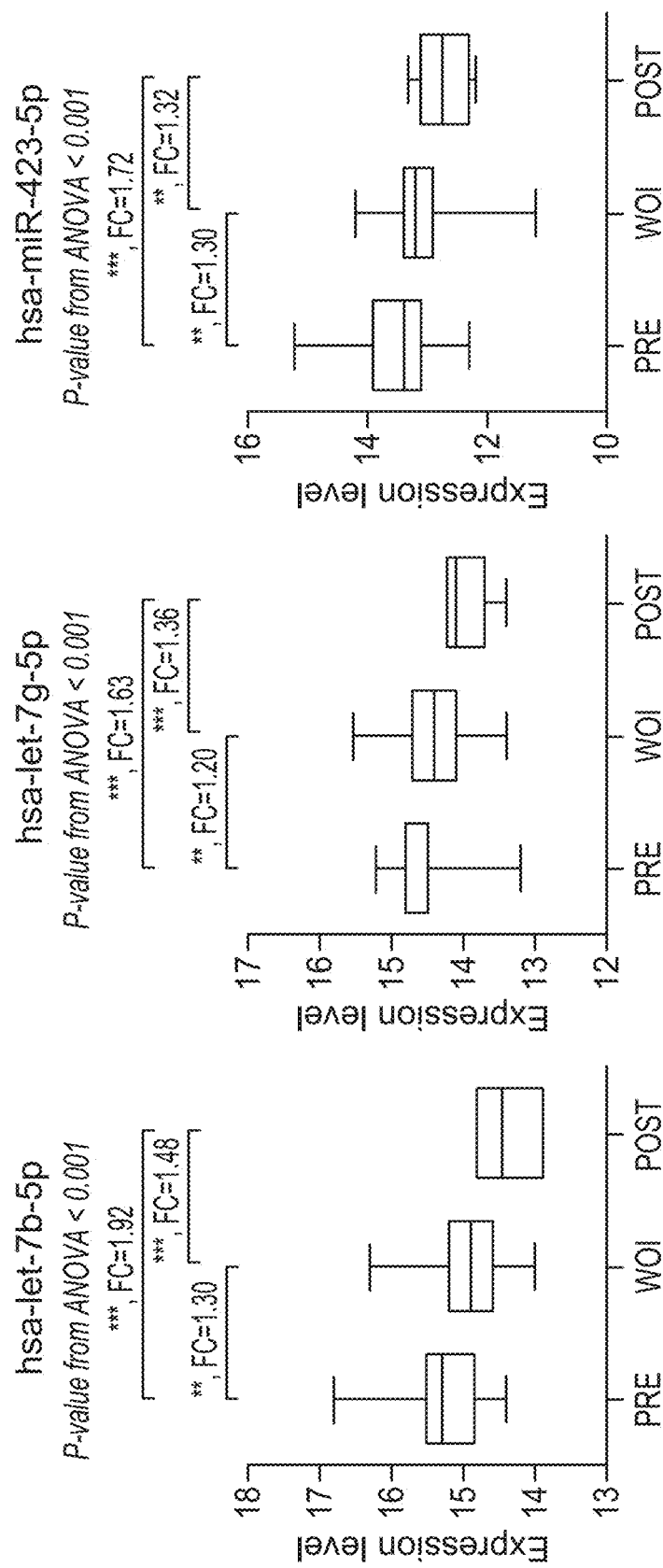
FIGS. 9A-9C provides graphs showing differentially expressed miRNAs among different endometrial receptivity statues. According to the expression levels of miRNAs in different statuses, miRNAs can be classified into three conditions: miRNAs expressed with decreasing expression levels from pre-receptive group to receptive group and further to post-receptive group (FIG. 9A); miRNAs in the post-receptive group exhibited differential expression levels compared to the other two groups (FIG. 9B); and differentially expressed miRNAs between pre-receptive and receptive groups (FIG. 9C). The expression level of each miRNA was determined by first obtaining the ratio of miRNA reads to total miRNA reads, and then multiplying the ratio by 1,000,000. Finally, the resulting value is calculated by taking a log2 transformation. For each box plot, the medians are shown as a black horizontal line in the box, where the box represents the upper and lower quartiles. The upper and lower black whiskers show the maximum and minimum, respectively. Significant post-hoc comparisons are represented by asterisks. *P-value<0.05; P-value<0.01; *P-value<0.001; ns: no significance), FC: fold change.
Figure 9B:
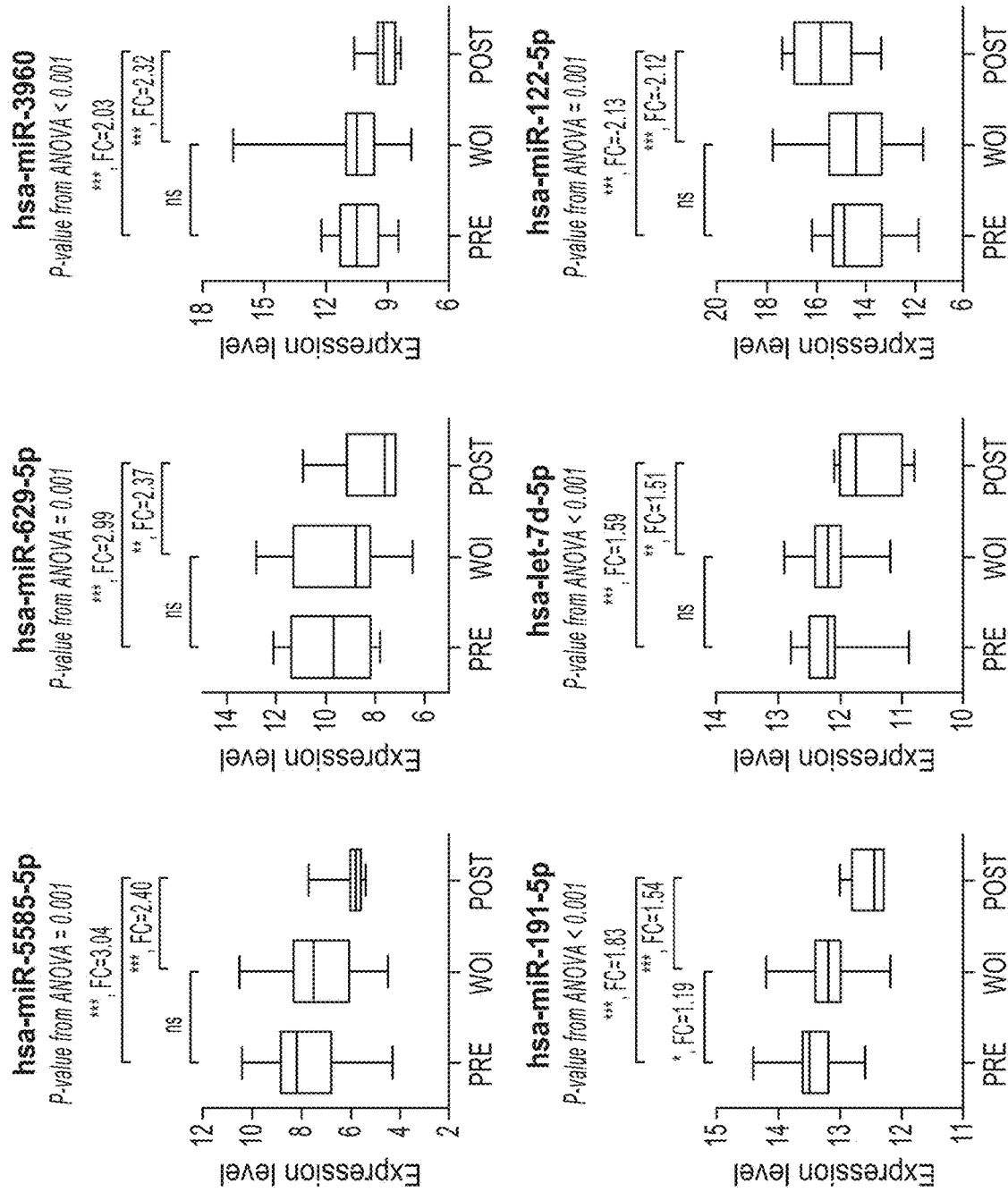
Figure 9C:
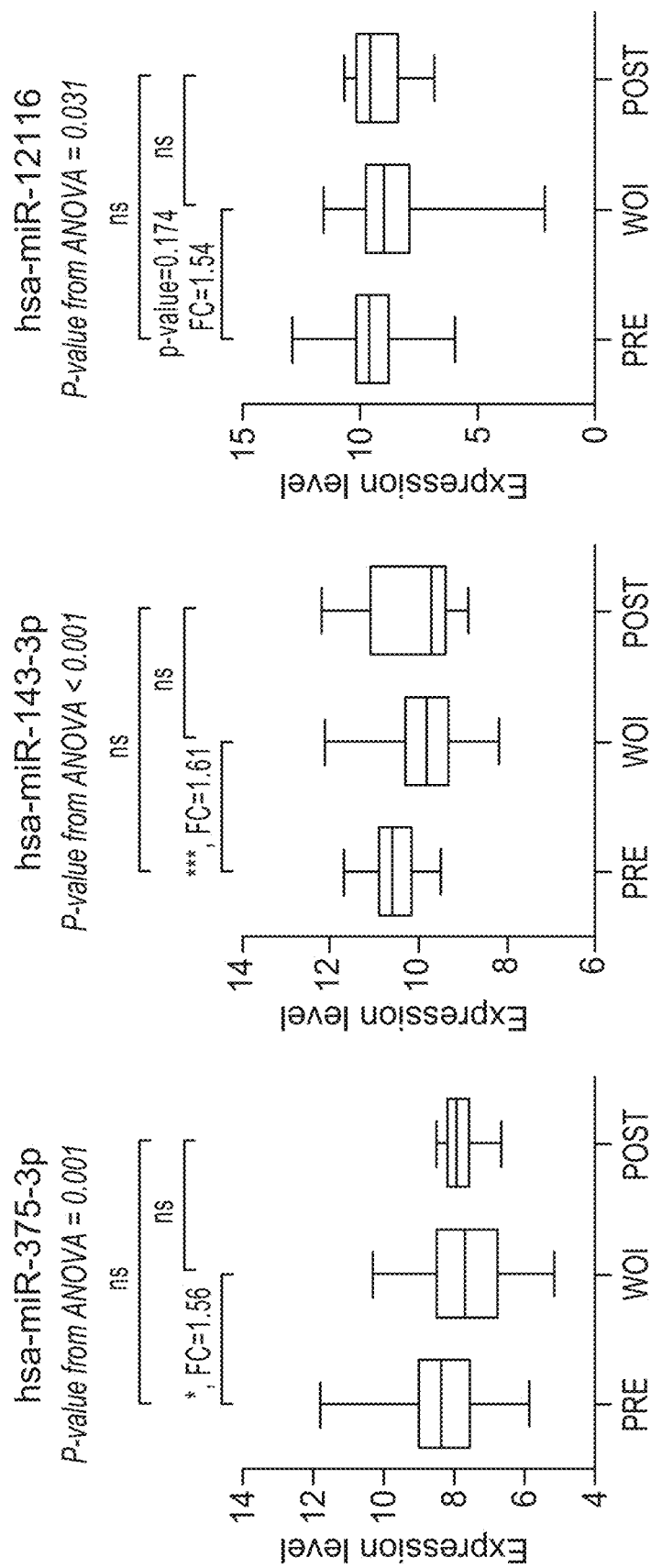

Analysis was conducted to identify differentially expressed miRNAs in the blood among different endometrial receptivity statuses. The expression pattern varied across different receptivity statuses (Table 8 and Table 9). Several miRNAs were identified that exhibited significant expression differences among the pre-receptive, receptive, and post-receptive groups in patient blood. A set of miRNA, including hsa-let-7b-5p, hsa-let-7g-5p, and hsa-miR-423-5p, had decreasing expression levels from pre-receptive to receptive to post-receptive endometrial status (FIG. 9A). Further, there are specific stages where distinct miRNAs exhibited either higher or lower expression levels. For instance, in the post-receptive group, miRNAs such as hsa-miR-5585-5p, hsa-miR-629-5p, hsa-miR-3960, hsa-miR-191-5p, and hsa-let-7d-5p had significantly lower expression levels compared to the pre-receptive and receptive groups. On the other hand, hsa-miR-122-5p had significantly higher expression levels in the post-receptive group compared to the pre-receptive and receptive groups (FIG. 9B). Moreover, miRNAs in the pre-receptive group exhibited significantly higher expression levels than the receptive group, including hsa-miR-375-3p, hsa-miR-143-3p, and hsa-miR-12116 (FIG. 9C). Overall, changes in miRNA expression levels indicate a complex regulation of gene expression during the preparation of the endometrium for implantation.

TABLE 8

Statistical analysis result of miRNAs included in the prediction model building dataset (miRNA expression level)

| miRNA | Pre-receptive (Pre) Mean | SD | Receptive (Rec) Mean | SD | Post-receptive (Post) Mean | SD | ANOVA F score | p-value |
|---|---|---|---|---|---|---|---|---|
| hsa-let-7b-5p | 15.32 | 0.57 | 14.95 | 0.52 | 14.38 | 0.39 | 25.17 | <0.001 |
| hsa-miR-3184-3p | 13.52 | 0.68 | 13.13 | 0.53 | 12.73 | 0.43 | 16.70 | <0.001 |
| hsa-miR-423-5p | 13.52 | 0.68 | 13.13 | 0.53 | 12.73 | 0.43 | 16.70 | <0.001 |
| hsa-let-7g-5p | 14.65 | 0.37 | 14.39 | 0.41 | 13.95 | 0.31 | 23.45 | <0.001 |
| hsa-miR-4635 | 12.67 | 1.28 | 12.21 | 1.27 | 11.95 | 1.00 | 3.75 | 0.025 |
| hsa-miR-4685-5p | 14.18 | 1.33 | 13.70 | 1.25 | 13.42 | 0.85 | 4.06 | 0.019 |
| hsa-miR-4771 | 12.86 | 1.27 | 12.32 | 1.21 | 12.20 | 0.99 | 4.61 | 0.011 |
| hsa-miR-92a-3p | 10.63 | 0.59 | 10.21 | 0.71 | 10.07 | 0.83 | 9.28 | <0.001 |
| hsa-miR-320a-3p | 13.99 | 0.77 | 13.55 | 0.60 | 13.42 | 0.64 | 11.31 | <0.001 |
| hsa-miR-1180-3p | 7.44 | 0.53 | 7.08 | 0.55 | 6.87 | 0.46 | 12.61 | <0.001 |
| hsa-miR-26a-5p | 13.67 | 0.57 | 13.30 | 0.73 | 13.15 | 0.31 | 7.80 | 0.001 |
| hsa-miR-10a-5p | 7.85 | 0.91 | 7.32 | 0.82 | 7.35 | 0.59 | 9.12 | <0.001 |
| hsa-miR-26b-5p | 11.28 | 0.46 | 11.00 | 0.72 | 10.85 | 0.62 | 4.88 | 0.008 |
| hsa-miR-484 | 8.81 | 0.46 | 8.45 | 0.71 | 8.40 | 0.57 | 7.31 | 0.001 |
| hsa-miR-23a-3p | 9.36 | 0.75 | 8.84 | 0.83 | 8.95 | 0.70 | 8.99 | <0.001 |
| hsa-miR-451a | 11.41 | 0.49 | 11.04 | 0.67 | 11.03 | 0.95 | 7.50 | 0.001 |
| hsa-miR-193a-5p | 8.20 | 0.82 | 7.91 | 0.78 | 8.37 | 0.84 | 4.62 | 0.011 |
| hsa-miR-375-3p | 8.32 | 1.23 | 7.68 | 1.15 | 7.82 | 0.60 | 6.96 | 0.001 |
| hsa-miR-320b | 11.95 | 1.17 | 11.47 | 0.85 | 11.55 | 0.94 | 5.63 | 0.004 |
| hsa-miR-320d | 10.64 | 1.23 | 10.12 | 0.93 | 10.27 | 0.78 | 5.82 | 0.003 |
| hsa-miR-143-3p | 10.54 | 0.54 | 9.85 | 0.76 | 10.17 | 1.17 | 18.74 | <0.001 |
| hsa-miR-181b-5p | 8.26 | 0.74 | 7.74 | 0.68 | 7.93 | 0.58 | 12.14 | <0.001 |
| hsa-miR-23b-3p | 7.69 | 0.91 | 7.24 | 0.91 | 7.40 | 0.75 | 5.43 | 0.005 |
| hsa-miR-320c | 11.29 | 1.17 | 10.83 | 0.91 | 11.02 | 0.97 | 4.75 | 0.010 |
| hsa-miR-30a-3p | 7.26 | 0.60 | 6.92 | 0.69 | 7.05 | 0.71 | 5.68 | 0.004 |
| hsa-miR-12116 | 9.45 | 1.39 | 8.83 | 1.54 | 9.27 | 1.30 | 3.52 | 0.031 |
| hsa-miR-181a-5p | 8.72 | 0.79 | 8.33 | 0.80 | 8.53 | 0.46 | 5.39 | 0.005 |
| hsa-miR-199a-3p | 9.85 | 0.73 | 9.41 | 0.70 | 9.75 | 0.72 | 9.05 | <0.001 |
| hsa-miR-199b-3p | 9.85 | 0.73 | 9.41 | 0.70 | 9.75 | 0.72 | 9.05 | <0.001 |
| hsa-miR-378c | 8.16 | 0.87 | 7.83 | 0.97 | 8.13 | 1.17 | 2.80 | 0.063 |
| hsa-miR-339-5p | 8.02 | 1.14 | 7.63 | 1.20 | 8.07 | 1.04 | 2.98 | 0.053 |
| hsa-miR-5585-5p | 7.70 | 1.60 | 7.37 | 1.35 | 6.10 | 0.85 | 7.71 | 0.001 |
| hsa-miR-629-5p | 9.85 | 1.60 | 9.51 | 1.62 | 8.27 | 1.39 | 6.80 | 0.001 |
| hsa-miR-3960 | 10.30 | 1.08 | 10.50 | 1.32 | 9.28 | 0.73 | 7.94 | <0.001 |
| hsa-miR-191-5p | 13.42 | 0.38 | 13.18 | 0.38 | 12.55 | 0.27 | 38.64 | <0.001 |
| hsa-miR-30e-3p | 7.93 | 0.46 | 7.75 | 0.77 | 7.22 | 0.43 | 7.73 | 0.001 |
| hsa-let-7d-5p | 12.24 | 0.35 | 12.16 | 0.34 | 11.57 | 0.51 | 25.22 | <0.001 |
| hsa-miR-130b-3p | 8.75 | 0.49 | 8.54 | 0.46 | 8.13 | 0.33 | 13.26 | <0.001 |
| hsa-miR-744-5p | 7.57 | 0.67 | 7.36 | 0.56 | 6.97 | 0.47 | 7.75 | 0.001 |
| hsa-let-7f-5p | 13.72 | 0.44 | 13.64 | 0.43 | 13.17 | 0.51 | 11.25 | <0.001 |
| hsa-miR-151a-5p | 14.18 | 0.50 | 14.09 | 0.48 | 13.67 | 0.18 | 8.23 | <0.001 |
| hsa-let-7e-5p | 8.19 | 0.59 | 8.18 | 0.58 | 7.70 | 0.85 | 5.39 | 0.005 |
| hsa-miR-182-5p | 8.32 | 0.62 | 8.30 | 0.60 | 7.88 | 0.74 | 3.92 | 0.021 |
| hsa-miR-421 | 7.89 | 0.33 | 7.91 | 0.45 | 7.48 | 0.36 | 8.56 | <0.001 |
| hsa-miR-486-5p | 15.10 | 0.42 | 14.95 | 0.54 | 14.68 | 0.38 | 5.05 | 0.007 |
| hsa-miR-20b-5p | 9.58 | 0.53 | 9.59 | 0.60 | 9.18 | 0.30 | 4.28 | 0.015 |
| hsa-let-7a-5p | 15.65 | 0.35 | 15.66 | 0.34 | 15.27 | 0.51 | 9.85 | <0.001 |
| hsa-miR-21-5p | 9.42 | 0.55 | 9.37 | 0.51 | 9.85 | 0.36 | 6.92 | 0.001 |
| hsa-miR-29a-3p | 9.89 | 0.66 | 9.92 | 0.64 | 10.37 | 0.71 | 4.10 | 0.018 |
| hsa-miR-122-5p | 14.40 | 1.19 | 14.47 | 1.40 | 15.67 | 1.39 | 6.83 | 0.001 |
| hsa-miR-122b-3p | 14.35 | 1.18 | 14.43 | 1.39 | 15.62 | 1.37 | 6.87 | 0.001 |
| hsa-miR-1285-3p | 10.06 | 0.77 | 9.77 | 1.09 | 9.27 | 0.89 | 4.61 | 0.011 |
| hsa-let-7i-5p | 14.19 | 0.27 | 13.94 | 0.28 | 13.70 | 0.43 | 24.65 | <0.001 |
| hsa-miR-486-3p | 14.99 | 0.41 | 14.86 | 0.53 | 14.62 | 0.37 | 4.13 | 0.017 |
| hsa-miR-98-5p | 10.09 | 0.34 | 9.94 | 0.35 | 9.73 | 0.30 | 8.64 | <0.001 |
| hsa-miR-150-5p | 8.77 | 0.70 | 8.56 | 0.89 | 8.40 | 0.46 | 1.98 | 0.140 |
| hsa-miR-339-3p | 7.57 | 0.54 | 7.42 | 0.48 | 7.23 | 0.46 | 3.76 | 0.025 |
| hsa-miR-185-5p | 14.18 | 0.44 | 14.00 | 0.64 | 13.87 | 0.24 | 2.88 | 0.058 |
| hsa-let-7c-5p | 11.32 | 0.51 | 11.32 | 0.62 | 11.05 | 0.24 | 1.90 | 0.152 |
| hsa-miR-29c-3p | 8.79 | 0.64 | 8.87 | 0.51 | 9.17 | 0.62 | 3.15 | 0.045 |
| hsa-miR-144-3p | 10.59 | 0.61 | 10.77 | 0.61 | 10.97 | 0.64 | 3.27 | 0.040 |
| hsa-miR-142-5p | 8.36 | 0.57 | 8.50 | 0.63 | 8.72 | 0.47 | 2.72 | 0.068 |
| hsa-miR-625-5p | 7.11 | 0.71 | 7.33 | 0.86 | 7.53 | 0.41 | 2.53 | 0.082 |
| hsa-miR-3135b | 7.52 | 1.43 | 7.83 | 1.20 | 7.18 | 0.55 | 2.93 | 0.056 |
| hsa-miR-103a-3p | 14.12 | 0.28 | 14.15 | 0.54 | 13.85 | 0.39 | 3.19 | 0.043 |
| hsa-miR-103b | 14.12 | 0.28 | 14.15 | 0.54 | 13.85 | 0.39 | 3.19 | 0.043 |
| hsa-miR-93-5p | 13.54 | 0.42 | 13.57 | 0.43 | 13.32 | 0.26 | 3.02 | 0.051 |

TABLE 8-continued

Statistical analysis result of miRNAs included in the prediction model building dataset (miRNA expression level)

| miRNA | Pre-receptive (Pre) Mean | SD | Receptive (Rec) Mean | SD | Post-receptive (Post) Mean | SD | ANOVA F score | p-value |
|---|---|---|---|---|---|---|---|---|
| hsa-miR-361-5p | 7.68 | 0.61 | 7.43 | 0.63 | 7.87 | 0.32 | 6.61 | 0.002 |
| hsa-miR-378a-3p | 9.26 | 0.74 | 9.04 | 0.77 | 9.43 | 0.72 | 3.45 | 0.033 |
| hsa-miR-1260b | 8.18 | 1.73 | 7.80 | 1.72 | 7.70 | 0.99 | 1.14 | 0.323 |
| hsa-miR-342-3p | 8.56 | 1.24 | 8.20 | 1.23 | 8.17 | 1.06 | 2.00 | 0.138 |
| hsa-miR-28-3p | 7.92 | 0.68 | 7.69 | 0.76 | 7.58 | 0.86 | 2.50 | 0.085 |
| hsa-miR-8485 | 9.09 | 1.25 | 8.97 | 1.32 | 8.82 | 1.29 | 0.33 | 0.717 |
| hsa-miR-107 | 14.09 | 0.29 | 14.12 | 0.59 | 13.85 | 0.39 | 2.20 | 0.113 |
| hsa-miR-151a-3p | 9.30 | 0.50 | 9.08 | 0.51 | 9.17 | 0.45 | 4.24 | 0.016 |
| hsa-miR-3529-3p | 7.93 | 0.62 | 7.98 | 0.66 | 7.78 | 0.42 | 0.79 | 0.453 |
| hsa-miR-7-5p | 7.93 | 0.62 | 7.98 | 0.66 | 7.78 | 0.42 | 0.79 | 0.453 |
| hsa-miR-425-5p | 8.84 | 0.41 | 8.70 | 0.47 | 8.70 | 0.46 | 2.16 | 0.118 |
| hsa-miR-25-3p | 10.19 | 0.42 | 10.15 | 0.38 | 10.07 | 0.21 | 0.79 | 0.453 |
| hsa-miR-126-3p | 12.64 | 0.42 | 12.43 | 0.48 | 12.53 | 0.53 | 4.52 | 0.012 |
| hsa-miR-30d-5p | 7.81 | 0.51 | 7.57 | 0.44 | 7.72 | 0.34 | 6.20 | 0.002 |
| hsa-miR-20a-5p | 10.22 | 0.51 | 10.11 | 0.68 | 10.18 | 0.42 | 0.67 | 0.510 |
| hsa-miR-106b-5p | 7.19 | 0.58 | 7.12 | 0.61 | 7.15 | 0.39 | 0.33 | 0.722 |
| hsa-miR-574-5p | 13.05 | 0.63 | 12.92 | 0.54 | 13.00 | 0.36 | 1.20 | 0.303 |
| hsa-miR-660-5p | 8.47 | 0.54 | 8.30 | 0.53 | 8.42 | 0.50 | 2.37 | 0.096 |
| hsa-miR-181a-3p | 9.27 | 1.23 | 9.06 | 1.37 | 9.22 | 0.85 | 0.65 | 0.523 |
| hsa-miR-223-3p | 10.45 | 0.68 | 10.23 | 0.89 | 10.43 | 0.20 | 1.90 | 0.152 |
| hsa-miR-130a-3p | 10.41 | 0.38 | 10.39 | 0.48 | 10.37 | 0.17 | 0.12 | 0.888 |
| hsa-miR-139-5p | 8.29 | 0.64 | 8.07 | 0.63 | 8.28 | 0.70 | 3.20 | 0.043 |
| hsa-miR-24-3p | 9.60 | 0.73 | 9.49 | 0.58 | 9.63 | 0.73 | 0.90 | 0.409 |
| hsa-miR-3074-5p | 9.55 | 0.74 | 9.42 | 0.59 | 9.58 | 0.71 | 1.13 | 0.326 |
| hsa-miR-10b-5p | 7.73 | 0.82 | 7.57 | 0.78 | 7.82 | 0.73 | 1.43 | 0.240 |
| hsa-miR-6873-3p | 10.11 | 1.83 | 9.97 | 1.60 | 10.20 | 1.65 | 0.25 | 0.781 |
| hsa-miR-126-5p | 11.73 | 0.47 | 11.62 | 0.45 | 11.83 | 0.53 | 2.41 | 0.093 |
| hsa-miR-15a-5p | 10.67 | 0.55 | 10.83 | 0.50 | 10.82 | 0.42 | 2.09 | 0.125 |
| hsa-miR-140-3p | 7.58 | 0.57 | 7.81 | 0.52 | 7.73 | 0.31 | 4.35 | 0.014 |
| hsa-miR-128-3p | 7.02 | 0.54 | 7.22 | 0.53 | 7.18 | 0.39 | 3.02 | 0.051 |
| hsa-miR-1290 | 11.05 | 0.92 | 10.82 | 0.88 | 11.20 | 1.25 | 2.33 | 0.099 |
| hsa-miR-532-5p | 8.26 | 0.32 | 8.31 | 0.47 | 8.42 | 0.42 | 0.95 | 0.388 |
| hsa-miR-151b | 8.78 | 0.70 | 8.73 | 0.64 | 8.93 | 0.59 | 0.85 | 0.430 |
| hsa-miR-15b-5p | 11.20 | 0.38 | 11.40 | 0.49 | 11.42 | 0.23 | 4.50 | 0.012 |
| hsa-miR-30e-5p | 8.92 | 0.56 | 8.94 | 0.53 | 9.15 | 0.31 | 1.43 | 0.241 |
| hsa-miR-16-5p | 18.54 | 0.40 | 18.72 | 0.39 | 18.80 | 0.24 | 5.61 | 0.004 |
| hsa-miR-7847-3p | 10.82 | 1.52 | 10.51 | 1.45 | 11.07 | 0.87 | 1.85 | 0.159 |
| hsa-miR-1246 | 8.84 | 1.17 | 8.55 | 1.31 | 9.20 | 1.01 | 2.24 | 0.109 |
| hsa-miR-1303 | 8.55 | 0.91 | 8.26 | 1.41 | 8.92 | 0.78 | 2.41 | 0.093 |
| hsa-miR-4510 | 7.52 | 1.74 | 7.42 | 1.79 | 8.04 | 0.95 | 0.88 | 0.415 |

FC = fold change

TABLE 9

Statistical analysis result of miRNAs included in the prediction model building dataset (Post Hoc Tukey HSD)

| | Post Hoc Tukey HSD | | | | | | | | |
|---|---|---|---|---|---|---|---|---|---|
| | Pre:Rec | | | Pre:Post | | | Rec:Post | | |
| miRNA | Q score | p-value | FC | Q score | p-value | FC | Q score | p-value | FC |
| hsa-let-7b-5p | 4.46 | 0.005 | 1.30 | 11.16 | <0.001 | 1.92 | 6.69 | <0.001 | 1.48 |
| hsa-miR-3184-3p | 4.17 | 0.010 | 1.30 | 8.56 | <0.001 | 1.72 | 4.39 | 0.006 | 1.32 |
| hsa-miR-423-5p | 4.17 | 0.010 | 1.30 | 8.56 | <0.001 | 1.72 | 4.39 | 0.006 | 1.32 |
| hsa-let-7g-5p | 4.06 | 0.013 | 1.20 | 10.94 | <0.001 | 1.63 | 6.88 | <0.001 | 1.36 |
| hsa-miR-4635 | 2.28 | 0.243 | 1.38 | 3.53 | 0.035 | 1.65 | 1.26 | 0.649 | 1.19 |
| hsa-miR-4685-5p | 2.34 | 0.225 | 1.39 | 3.75 | 0.023 | 1.69 | 1.42 | 0.577 | 1.22 |
| hsa-miR-4771 | 2.71 | 0.136 | 1.45 | 3.34 | 0.049 | 1.58 | 0.63 | 0.896 | 1.09 |

TABLE 9-continued

Statistical analysis result of miRNAs included in the
prediction model building dataset (Post Hoc Tukey HSD)

| | Post Hoc Tukey HSD | | | | | | | | |
|---|---|---|---|---|---|---|---|---|---|
| | Pre:Rec | | | Pre:Post | | | Rec:Post | | |
| miRNA | Q score | p-value | FC | Q score | p-value | FC | Q score | p-value | FC |
| hsa-miR-92a-3p | 3.76 | 0.023 | 1.34 | 5.08 | 0.001 | 1.48 | 1.33 | 0.617 | 1.11 |
| hsa-miR-320a-3p | 4.20 | 0.009 | 1.36 | 5.44 | <0.001 | 1.49 | 1.24 | 0.655 | 1.10 |
| hsa-miR-1180-3p | 4.15 | 0.010 | 1.28 | 6.56 | <0.001 | 1.48 | 2.41 | 0.207 | 1.16 |
| hsa-miR-26a-5p | 3.39 | 0.045 | 1.29 | 4.82 | 0.002 | 1.43 | 1.42 | 0.574 | 1.11 |
| hsa-miR-10a-5p | 3.97 | 0.015 | 1.45 | 3.73 | 0.024 | 1.42 | 0.24 | 0.984 | −2.01 |
| hsa-miR-26b-5p | 2.60 | 0.161 | 1.21 | 4.04 | 0.013 | 1.34 | 1.44 | 0.564 | 1.11 |
| hsa-miR-484 | 3.47 | 0.039 | 1.28 | 3.93 | 0.016 | 1.33 | 0.46 | 0.942 | 1.03 |
| hsa-miR-23a-3p | 3.97 | 0.015 | 1.43 | 3.13 | 0.072 | 1.32 | 0.85 | 0.821 | −2.02 |
| hsa-miR-451a | 3.57 | 0.033 | 1.30 | 3.61 | 0.030 | 1.30 | 0.04 | 1.000 | 1.00 |
| hsa-miR-193a-5p | 2.23 | 0.257 | 1.22 | 1.28 | 0.638 | −2.03 | 3.51 | 0.036 | −2.08 |
| hsa-miR-375-3p | 3.50 | 0.038 | 1.56 | 2.75 | 0.129 | 1.42 | 0.75 | 0.858 | −2.03 |
| hsa-miR-320b | 3.14 | 0.070 | 1.40 | 2.60 | 0.160 | 1.32 | 0.54 | 0.923 | −2.01 |
| hsa-miR-320d | 3.20 | 0.063 | 1.44 | 2.32 | 0.232 | 1.30 | 0.88 | 0.807 | −2.02 |
| hsa-miR-143-3p | 5.71 | <0.001 | 1.61 | 3.12 | 0.072 | 1.30 | 2.59 | 0.161 | −2.04 |
| hsa-miR-181b-5p | 4.62 | 0.004 | 1.43 | 2.93 | 0.098 | 1.25 | 1.70 | 0.455 | −2.03 |
| hsa-miR-23b-3p | 3.09 | 0.076 | 1.37 | 2.02 | 0.329 | 1.23 | 1.08 | 0.727 | −2.03 |
| hsa-miR-320c | 2.88 | 0.105 | 1.38 | 1.72 | 0.445 | 1.21 | 1.16 | 0.689 | −2.02 |
| hsa-miR-30a-3p | 3.16 | 0.068 | 1.27 | 1.95 | 0.353 | 1.16 | 1.20 | 0.671 | −2.03 |
| hsa-miR-12116 | 2.54 | 0.174 | 1.54 | 0.76 | 0.854 | 1.14 | 1.78 | 0.420 | −2.07 |
| hsa-miR-181a-5p | 3.05 | 0.080 | 1.30 | 1.46 | 0.556 | 1.14 | 1.59 | 0.499 | −2.03 |
| hsa-miR-199a-3p | 3.83 | 0.020 | 1.36 | 0.88 | 0.809 | 1.07 | 2.95 | 0.096 | −2.05 |
| hsa-miR-199b-3p | 3.83 | 0.020 | 1.36 | 0.88 | 0.809 | 1.07 | 2.95 | 0.096 | −2.05 |
| hsa-miR-378c | 2.07 | 0.311 | 1.25 | 0.14 | 0.994 | 1.02 | 1.92 | 0.363 | −2.05 |
| hsa-miR-339-5p | 2.07 | 0.309 | 1.32 | 0.22 | 0.987 | −2.01 | 2.29 | 0.239 | −2.08 |
| hsa-miR-5585-5p | 1.37 | 0.598 | 1.26 | 6.51 | <0.001 | 3.04 | 5.14 | 0.001 | 2.40 |
| hsa-miR-629-5p | 1.31 | 0.626 | 1.26 | 6.11 | <0.001 | 2.99 | 4.80 | 0.002 | 2.37 |
| hsa-miR-3960 | 0.96 | 0.774 | −2.03 | 5.15 | 0.001 | 2.03 | 6.12 | <0.001 | 2.32 |
| hsa-miR-191-5p | 4.10 | 0.011 | 1.19 | 14.49 | <0.001 | 1.83 | 10.39 | <0.001 | 1.54 |
| hsa-miR-30e-3p | 1.61 | 0.493 | 1.13 | 6.51 | <0.001 | 1.64 | 4.90 | 0.002 | 1.45 |
| hsa-let-7d-5p | 1.23 | 0.658 | 1.05 | 11.46 | <0.001 | 1.59 | 10.23 | <0.001 | 1.51 |
| hsa-miR-130b-3p | 2.84 | 0.112 | 1.16 | 8.34 | <0.001 | 1.54 | 5.49 | <0.001 | 1.33 |
| hsa-miR-744-5p | 2.21 | 0.264 | 1.16 | 6.36 | <0.001 | 1.51 | 4.15 | 0.010 | 1.31 |
| hsa-let-7f-5p | 1.12 | 0.710 | 1.06 | 7.76 | <0.001 | 1.47 | 6.64 | <0.001 | 1.39 |
| hsa-miR-151a-5p | 1.22 | 0.664 | 1.07 | 6.70 | <0.001 | 1.43 | 5.47 | <0.001 | 1.34 |

TABLE 9-continued

Statistical analysis result of miRNAs included in the
prediction model building dataset (Post Hoc Tukey HSD)

| | Post Hoc Tukey HSD | | | | | | | | |
|---|---|---|---|---|---|---|---|---|---|
| | Pre:Rec | | | Pre:Post | | | Rec:Post | | |
| miRNA | Q score | p-value | FC | Q score | p-value | FC | Q score | p-value | FC |
| hsa-let-7e-5p | 0.10 | 0.997 | 1.01 | 5.05 | 0.001 | 1.41 | 4.95 | 0.002 | 1.40 |
| hsa-miR-182-5p | 0.16 | 0.993 | 1.01 | 4.36 | 0.007 | 1.35 | 4.19 | 0.009 | 1.33 |
| hsa-miR-421 | 0.31 | 0.974 | −2.00 | 6.04 | <0.001 | 1.32 | 6.35 | <0.001 | 1.34 |
| hsa-miR-486-5p | 1.83 | 0.401 | 1.11 | 5.11 | 0.001 | 1.33 | 3.28 | 0.055 | 1.20 |
| hsa-miR-20b-5p | 0.17 | 0.992 | −2.00 | 4.31 | 0.007 | 1.32 | 4.48 | 0.005 | 1.33 |
| hsa-let-7a-5p | 0.12 | 0.996 | −2.00 | 6.64 | <0.001 | 1.31 | 6.76 | <0.001 | 1.31 |
| hsa-miR-21-5p | 0.52 | 0.929 | 1.03 | 5.21 | 0.001 | −2.06 | 5.73 | <0.001 | −2.07 |
| hsa-miR-29a-3p | 0.27 | 0.980 | −2.00 | 4.51 | 0.005 | −2.07 | 4.24 | 0.008 | −2.06 |
| hsa-miR-122-5p | 0.30 | 0.975 | −2.01 | 5.80 | <0.001 | −2.13 | 5.50 | <0.001 | −2.12 |
| hsa-miR-122b-3p | 0.34 | 0.968 | −2.01 | 5.84 | <0.001 | −2.13 | 5.50 | <0.001 | −2.12 |
| hsa-miR-1285-3p | 1.78 | 0.420 | 1.22 | 4.87 | 0.002 | 1.73 | 3.09 | 0.076 | 1.42 |
| hsa-let-7i-5p | 5.17 | 0.001 | 1.18 | 10.28 | <0.001 | 1.40 | 5.11 | 0.001 | 1.18 |
| hsa-miR-486-3p | 1.62 | 0.486 | 1.09 | 4.63 | 0.003 | 1.29 | 3.01 | 0.086 | 1.18 |
| hsa-miR-98-5p | 2.76 | 0.126 | 1.11 | 6.41 | <0.001 | 1.28 | 3.65 | 0.028 | 1.15 |
| hsa-miR-150-5p | 1.56 | 0.514 | 1.15 | 2.78 | 0.124 | 1.29 | 1.22 | 0.664 | 1.12 |
| hsa-miR-339-3p | 1.86 | 0.389 | 1.11 | 4.20 | 0.009 | 1.26 | 2.34 | 0.226 | 1.14 |
| hsa-miR-185-5p | 1.87 | 0.386 | 1.13 | 3.36 | 0.048 | 1.24 | 1.50 | 0.542 | 1.10 |
| hsa-let-7c-5p | 0.00 | <0.001 | 1.00 | 2.96 | 0.094 | 1.21 | 2.95 | 0.094 | 1.21 |
| hsa-miR-29c-3p | 0.84 | 0.822 | −2.01 | 4.16 | 0.010 | −2.06 | 3.31 | 0.052 | −2.05 |
| hsa-miR-144-3p | 1.81 | 0.409 | −2.02 | 3.83 | 0.020 | −2.05 | 2.03 | 0.325 | −2.03 |
| hsa-miR-142-5p | 1.47 | 0.552 | −2.02 | 3.66 | 0.028 | −2.06 | 2.19 | 0.270 | −2.04 |
| hsa-miR-625-5p | 1.69 | 0.457 | −2.04 | 3.24 | 0.059 | −2.08 | 1.55 | 0.516 | −2.04 |
| hsa-miR-3135b | 1.50 | 0.538 | −2.06 | 1.71 | 0.451 | 1.27 | 3.21 | 0.062 | 1.56 |
| hsa-miR-103a-3p | 0.36 | 0.964 | −2.00 | 3.53 | 0.035 | 1.21 | 3.89 | 0.018 | 1.23 |
| hsa-miR-103b | 0.36 | 0.964 | −2.00 | 3.53 | 0.035 | 1.21 | 3.89 | 0.018 | 1.23 |
| hsa-miR-93-5p | 0.45 | 0.945 | −2.00 | 3.33 | 0.051 | 1.17 | 3.78 | 0.022 | 1.19 |
| hsa-miR-361-5p | 2.55 | 0.172 | 1.19 | 1.86 | 0.387 | −2.03 | 4.41 | 0.006 | −2.08 |
| hsa-miR-378a-3p | 1.81 | 0.408 | 1.17 | 1.43 | 0.570 | −2.03 | 3.24 | 0.059 | −2.06 |
| hsa-miR-1260b | 1.36 | 0.601 | 1.30 | 1.74 | 0.437 | 1.39 | 0.37 | 0.962 | 1.07 |
| hsa-miR-342-3p | 1.83 | 0.401 | 1.29 | 1.99 | 0.339 | 1.31 | 0.16 | 0.993 | 1.02 |
| hsa-miR-28-3p | 1.90 | 0.374 | 1.17 | 2.79 | 0.121 | 1.26 | 0.90 | 0.801 | 1.08 |
| hsa-miR-8485 | 0.56 | 0.917 | 1.09 | 1.29 | 0.635 | 1.21 | 0.73 | 0.865 | 1.11 |
| hsa-miR-107 | 0.36 | 0.964 | −2.00 | 2.87 | 0.107 | 1.18 | 3.24 | 0.059 | 1.20 |
| hsa-miR-151a-3p | 2.73 | 0.133 | 1.17 | 1.63 | 0.482 | 1.10 | 1.09 | 0.719 | −2.01 |

TABLE 9-continued

Statistical analysis result of miRNAs included in the
prediction model building dataset (Post Hoc Tukey HSD)

| | Post Hoc Tukey HSD | | | | | | | | |
|---|---|---|---|---|---|---|---|---|---|
| | Pre:Rec | | | Pre:Post | | | Rec:Post | | |
| miRNA | Q score | p-value | FC | Q score | p-value | FC | Q score | p-value | FC |
| hsa-miR-3529-3p | 0.46 | 0.944 | −2.01 | 1.44 | 0.567 | 1.11 | 1.90 | 0.374 | 1.14 |
| hsa-miR-7-5p | 0.46 | 0.944 | −2.01 | 1.44 | 0.567 | 1.11 | 1.90 | 0.374 | 1.14 |
| hsa-miR-425-5p | 1.92 | 0.367 | 1.10 | 1.95 | 0.353 | 1.11 | 0.04 | 1.000 | 1.00 |
| hsa-miR-25-3p | 0.67 | 0.884 | 1.03 | 2.05 | 0.317 | 1.09 | 1.38 | 0.593 | 1.06 |
| hsa-miR-126-3p | 2.80 | 0.120 | 1.16 | 1.38 | 0.591 | 1.08 | 1.41 | 0.578 | −2.01 |
| hsa-miR-30d-5p | 3.24 | 0.059 | 1.18 | 1.23 | 0.662 | 1.06 | 2.01 | 0.332 | −2.03 |
| hsa-miR-20a-5p | 1.06 | 0.733 | 1.08 | 0.36 | 0.964 | 1.03 | 0.70 | 0.874 | −2.01 |
| hsa-miR-106b-5p | 0.76 | 0.853 | 1.05 | 0.42 | 0.953 | 1.03 | 0.34 | 0.968 | −2.01 |
| hsa-miR-574-5p | 1.43 | 0.572 | 1.09 | 0.57 | 0.916 | 1.04 | 0.86 | 0.816 | −2.01 |
| hsa-miR-660-5p | 1.99 | 0.339 | 1.13 | 0.65 | 0.892 | 1.04 | 1.34 | 0.609 | −2.02 |
| hsa-miR-181a-3p | 1.03 | 0.746 | 1.16 | 0.27 | 0.980 | 1.04 | 0.76 | 0.853 | −2.02 |
| hsa-miR-223-3p | 1.70 | 0.454 | 1.17 | 0.11 | 0.997 | 1.01 | 1.59 | 0.501 | −2.03 |
| hsa-miR-130a-3p | 0.38 | 0.961 | 1.02 | 0.68 | 0.879 | 1.03 | 0.30 | 0.975 | 1.01 |
| hsa-miR-139-5p | 2.19 | 0.270 | 1.17 | 0.08 | 0.998 | 1.01 | 2.11 | 0.298 | −2.04 |
| hsa-miR-24-3p | 1.07 | 0.731 | 1.08 | 0.31 | 0.974 | −2.00 | 1.38 | 0.594 | −2.02 |
| hsa-miR-3074-5p | 1.19 | 0.676 | 1.09 | 0.36 | 0.965 | −2.01 | 1.55 | 0.517 | −2.02 |
| hsa-miR-10b-5p | 1.27 | 0.643 | 1.12 | 0.65 | 0.891 | −2.01 | 1.92 | 0.367 | −2.05 |
| hsa-miR-6873-3p | 0.49 | 0.935 | 1.10 | 0.32 | 0.973 | −2.01 | 0.81 | 0.835 | −2.03 |
| hsa-miR-126-5p | 1.41 | 0.579 | 1.08 | 1.41 | 0.577 | −2.01 | 2.83 | 0.115 | −2.03 |
| hsa-miR-15a-5p | 1.91 | 0.370 | −2.02 | 1.74 | 0.438 | −2.02 | 0.17 | 0.992 | 1.01 |
| hsa-miR-140-3p | 2.77 | 0.125 | −2.04 | 1.82 | 0.405 | −2.03 | 0.95 | 0.779 | 1.06 |
| hsa-miR-128-3p | 2.30 | 0.237 | −2.04 | 1.88 | 0.380 | −2.03 | 0.42 | 0.953 | 1.02 |
| hsa-miR-1290 | 1.54 | 0.520 | 1.17 | 1.02 | 0.750 | −2.02 | 2.57 | 0.167 | −2.05 |
| hsa-miR-532-5p | 0.74 | 0.861 | −2.01 | 2.25 | 0.253 | −2.03 | 1.51 | 0.535 | −2.02 |
| hsa-miR-151b | 0.47 | 0.940 | 1.04 | 1.48 | 0.547 | −2.02 | 1.96 | 0.351 | −2.03 |
| hsa-miR-15b-5p | 2.74 | 0.130 | −2.02 | 2.96 | 0.094 | −2.03 | 0.21 | 0.988 | −2.00 |
| hsa-miR-30e-5p | 0.22 | 0.987 | −2.00 | 2.70 | 0.139 | −2.04 | 2.48 | 0.188 | −2.03 |
| hsa-miR-16-5p | 2.84 | 0.112 | −2.01 | 4.19 | 0.009 | −2.02 | 1.35 | 0.608 | −2.01 |
| hsa-miR-7847-3p | 1.31 | 0.624 | 1.24 | 1.08 | 0.727 | −2.03 | 2.39 | 0.212 | −2.07 |
| hsa-miR-1246 | 1.22 | 0.664 | 1.22 | 1.49 | 0.545 | −2.06 | 2.71 | 0.137 | −2.11 |
| hsa-miR-1303 | 1.30 | 0.630 | 1.23 | 1.62 | 0.486 | −2.06 | 2.92 | 0.100 | −2.11 |
| hsa-miR-4510 | 0.33 | 0.971 | 1.07 | 1.73 | 0.440 | −2.10 | 2.06 | 0.314 | −2.12 |

FC = fold change

In sum, a set of extracellular miRNAs was found to be stably expressed in the blood stream and correlate to endometrial receptivity. By combining these miRNAs' expression with clinical features of the patients such as age, BMI, and implantation failure history, a prediction model was built to accurately identify the window of implantation. A high prediction accuracy was observed when compared to tissue-based endometrial receptivity test results. This non-invasive testing method and miRNA-based prediction model could be used as an alternative to invasive, tissue-based endometrial receptivity tests in the future.

In the past, endometrial receptivity has been analyzed through an invasive tissue biopsy. The present study provides a novel, non-invasive method of testing for endometrial receptivity through analyzing extracellular miRNAs and could be used in place of tissue biopsies for patients undergoing assisted reproductive technology treatments.

Example 5: Clinical Trial for miRNA Identification

Figure 10A:
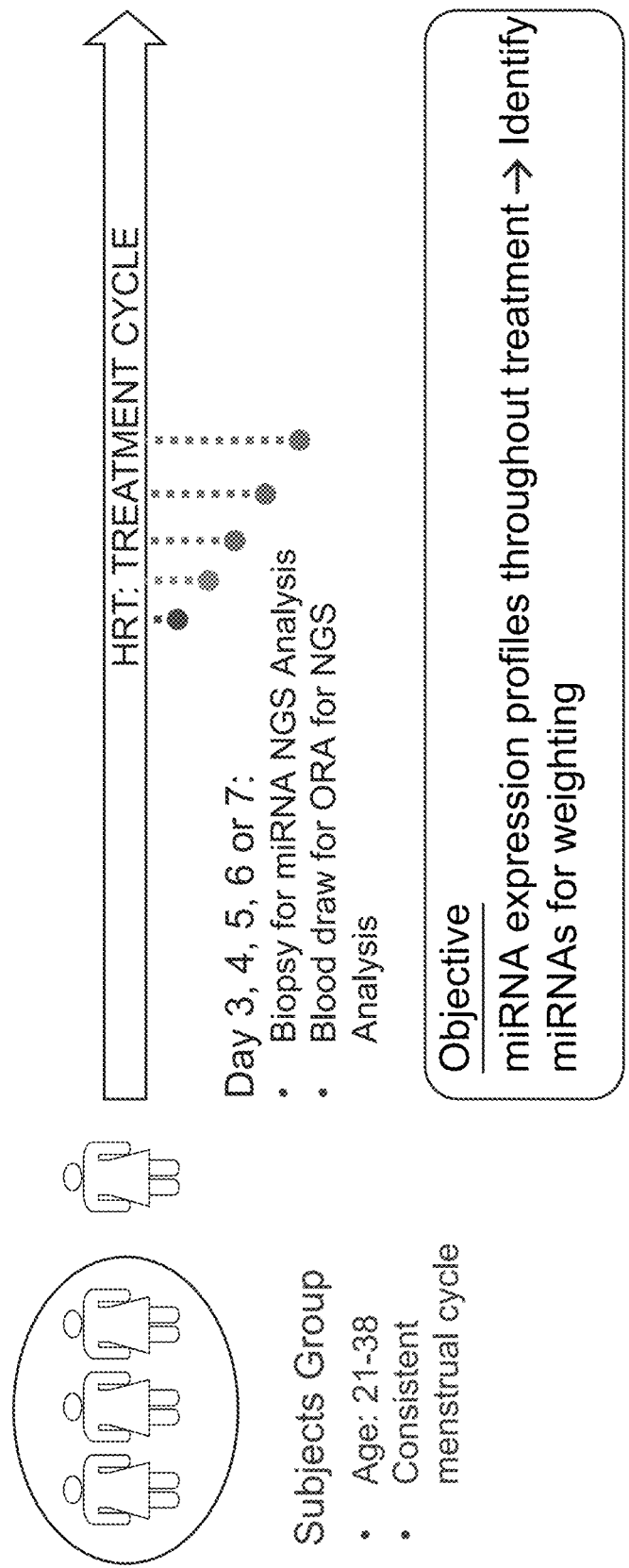
FIGS. 10A-10B are diagrams showing the workflow and study group of a clinical trial determining miRNA expression profiles during a hormone replacement therapy (HRT) treatment cycle after progesterone treatment on Day 3, 4, 5, 6, or 7.
Figure 10B:
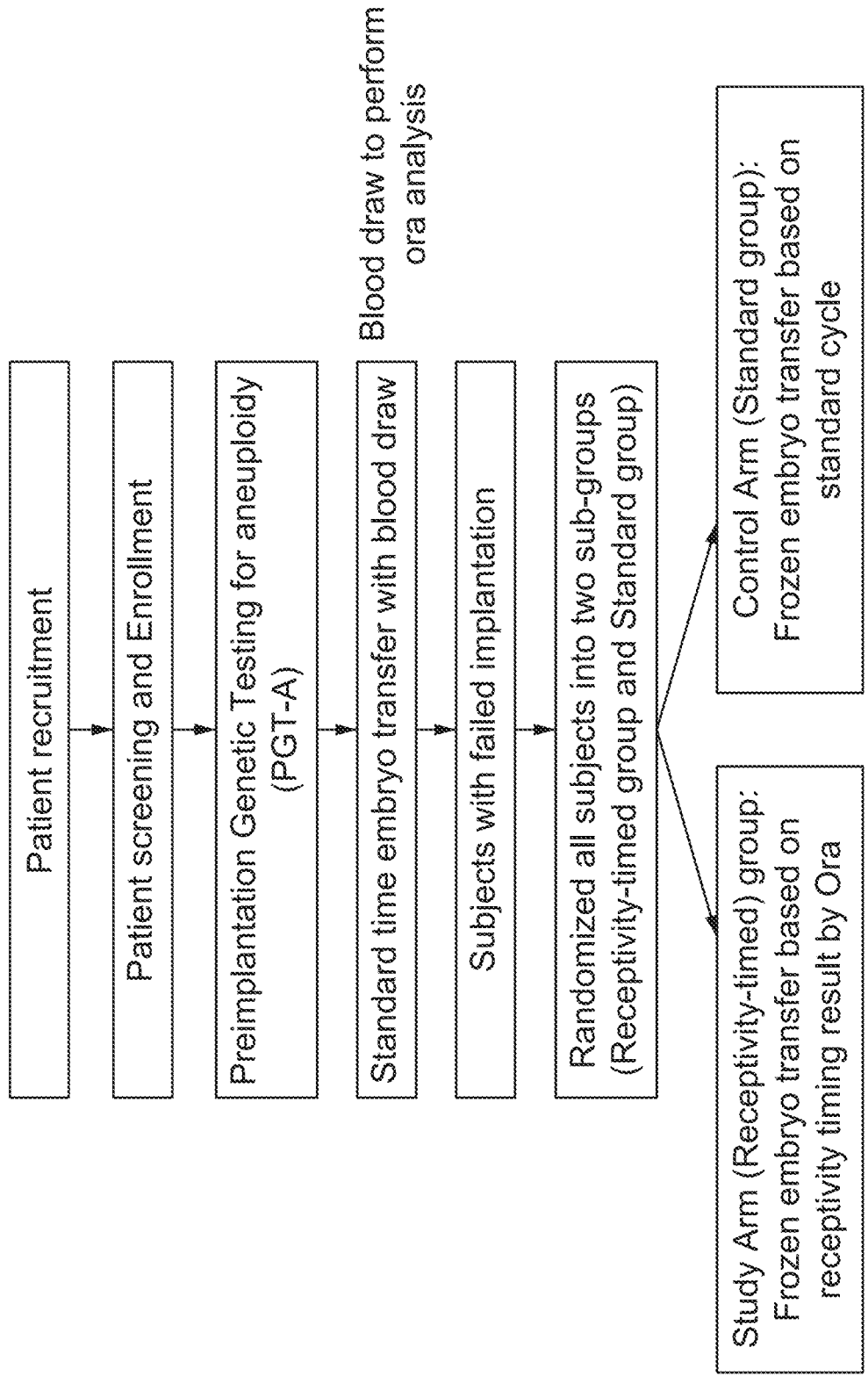
Figure 11A:
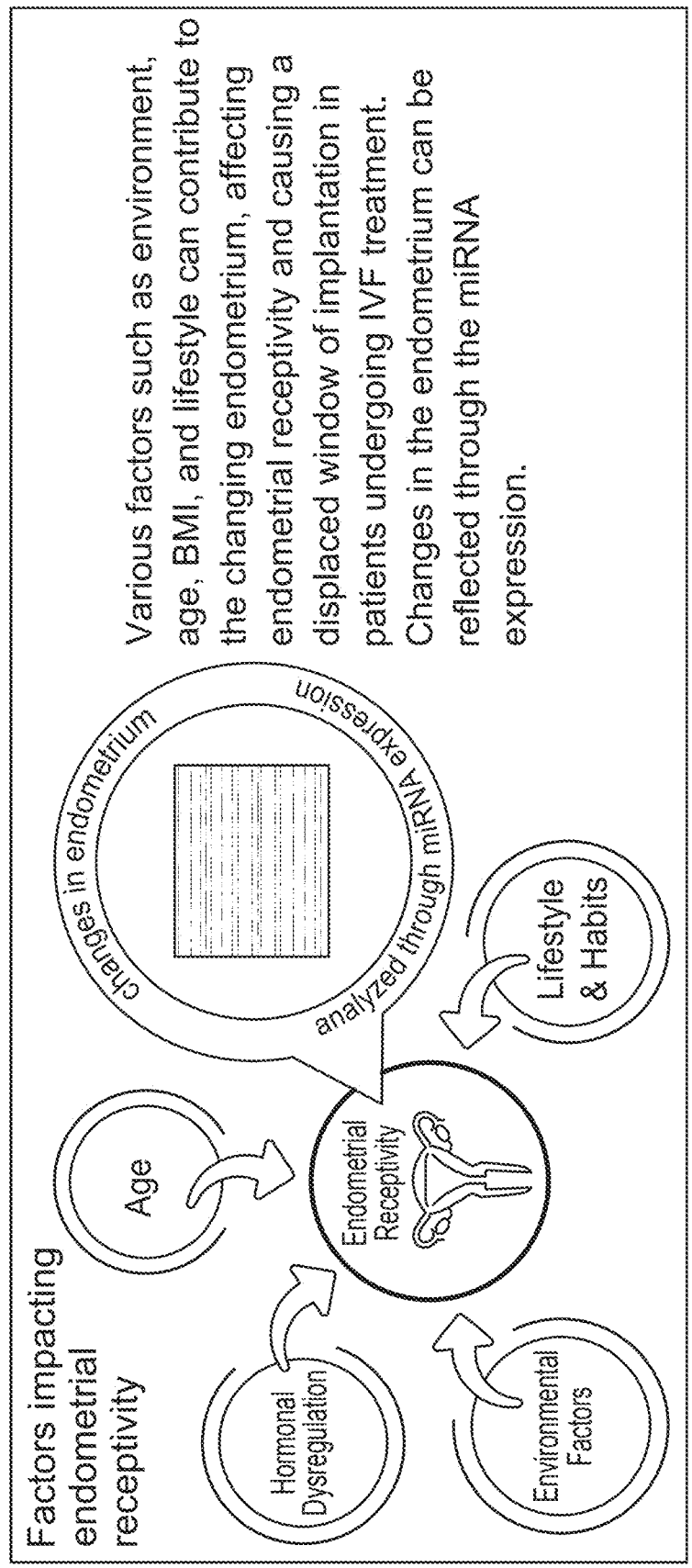
FIGS. 11A-11B are diagrams demonstrating the clinical and environmental factors which impact endometrial receptivity (FIG. 11A) and how miRNA alter bodily functions such as cell growth, reproduction, organ development, and embryo development (FIG. 11B). Various factors such as environment, age, body mass index (BMI), and lifestyle can contribute to the changing endometrium, affecting endometrial receptivity causing a displaced WOI in a subject (FIGS. 11A-11B).
Figure 11B:
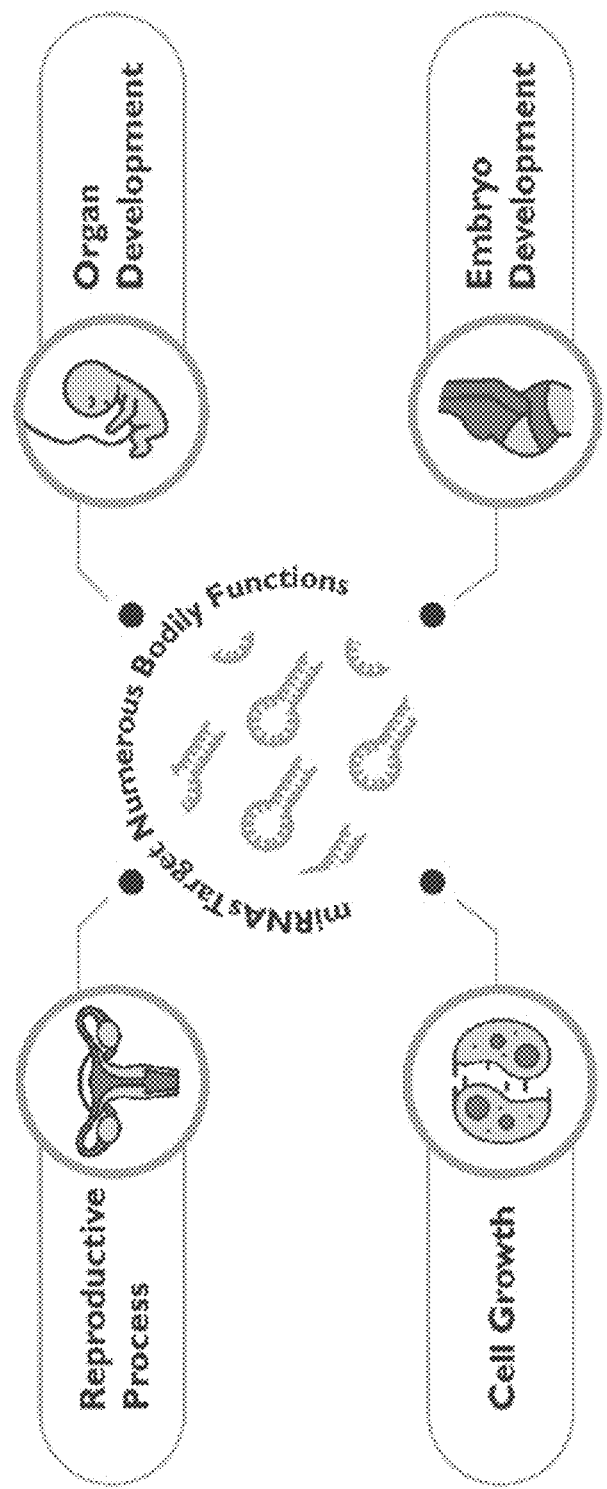
Figure 12:
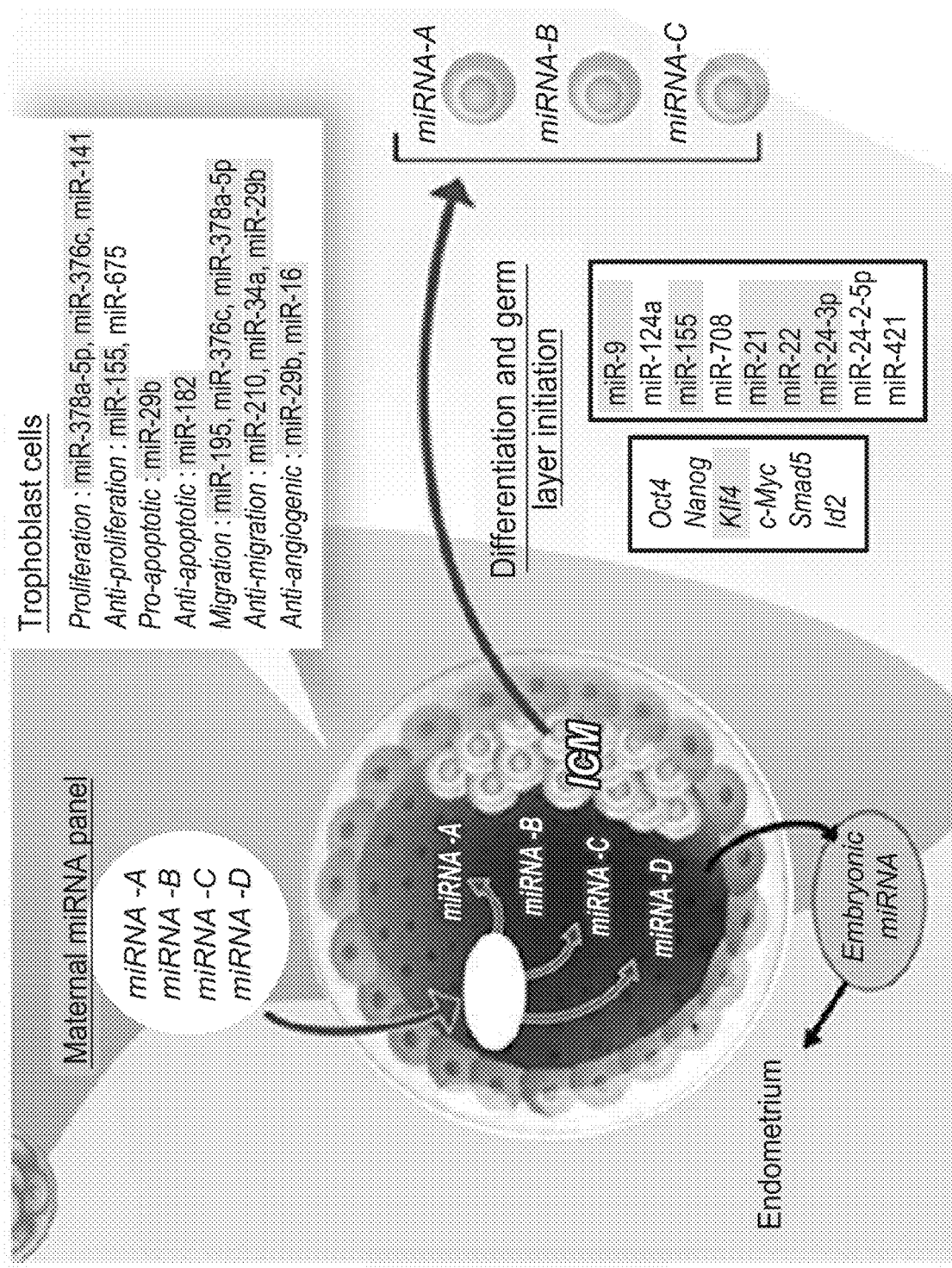
FIG. 12 is a schematic demonstrating how miRNA alter different cells and cellular functions, including the process of implantation. Because miRNAs can regulate a wide range of genes, they can play a role in patients with repeated implantation failure. These miRNA can serve as biomarkers for predicting endometrial receptivity using biopsies and bodily fluids (FIG. 12).

A clinical trial is conducted to identify changes in miRNA expression profiles in healthy subjects undergoing hormone replacement therapy. The clinical trial includes subjects age 21-38 which consistent menstrual cycles. During hormone replacement therapy, a uterine biopsy and a blood sample are collected on Day 3, 4, 5, 6, or 7 following progesterone injection. The samples are processed to extract miRNA and sequenced as described in Example 3. The resulting sequencing data is analyzed using the Optimal Receptivity Assay (ORA®) method to identify novel miRNA expression profiles to determine the window of implantation in a subject (FIGS. 10A-B).

The invention claimed is:

1. A method of determining the endometrial state of a subject in need thereof, the method comprising
    (a) obtaining a sample from a subject or using a sample obtained from a subject, wherein the sample is a blood sample or plasma sample;
    (b) determining a microRNA (miRNA) expression profile in the sample;
    (c) inputting the miRNA expression profile from step (b) into a trained machine-learning model to generate a report, and the machine-learning model includes Optimal Receptivity Assay (ORA®);
    (d) determining the endometrial state of the subject based on the report; and
    (e) determining the time period when the subject is receptive to embryo transfer based on the endometrial state of the subject,
    wherein the miRNA expression profile comprises expression levels of miRNAs shown in following table:

hsa-let-7b-3p
hsa-let-7i-5p
hsa-miR-106b-3p
hsa-miR-1180-3p
hsa-miR-1255b-5p
hsa-miR-1260a
hsa-miR-1260b
hsa-miR-1270
hsa-miR-1285-3p
hsa-miR-1287-5p
hsa-miR-1292-5p
hsa-miR-1294
hsa-miR-1298-5p
hsa-miR-1301-3p
hsa-miR-1303
hsa-miR-1304-3p -continued hsa-miR-1306-5p
hsa-miR-139-3p
hsa-miR-1469
hsa-miR-148a-3p
hsa-miR-1538
hsa-miR-15b-3p
hsa-miR-183-3p
hsa-miR-1908-5p
hsa-miR-193b-5p
hsa-miR-194-5p
hsa-miR-199b-3p
hsa-miR-204-3p
hsa-miR-2110
hsa-miR-22-5p
hsa-miR-23b-3p
hsa-miR-27b-3p
hsa-miR-30a-3p
hsa-miR-30e-3p
hsa-miR-3135b
hsa-miR-3143
hsa-miR-32-3p
hsa-miR-32-5p
hsa-miR-320d
hsa-miR-324-5p
hsa-miR-328-3p
hsa-miR-338-3p
hsa-miR-339-3p
hsa-miR-340-5p
hsa-miR-345-5p
hsa-miR-3529-3p
hsa-miR-3605-3p
hsa-miR-3605-5p
hsa-miR-3612
hsa-miR-3615
hsa-miR-362-5p
hsa-miR-365a-3p
hsa-miR-365b-3p
hsa-miR-3688-3p
hsa-miR-376a-3p
hsa-miR-383-3p
hsa-miR-3913-3p
hsa-miR-3913-5p
hsa-miR-3960
hsa-miR-3972
hsa-miR-421
hsa-miR-424-3p
hsa-miR-424-5p
hsa-miR-432-5p
hsa-miR-4429
hsa-miR-4510
hsa-miR-454-3p
hsa-miR-4644
hsa-miR-4732-5p
hsa-miR-497-5p
hsa-miR-5010-5p
hsa-miR-502-3p
hsa-miR-505-3p
hsa-miR-505-5p
hsa-miR-5189-3p
hsa-miR-532-3p
hsa-miR-542-3p
hsa-miR-548am-5p
hsa-miR-548c-5p
hsa-miR-548h-3p
hsa-miR-5480-5p
hsa-miR-548z
hsa-miR-5585-5p
hsa-miR-576-5p
hsa-miR-590-3p
hsa-miR-598-3p
hsa-miR-625-3p
hsa-miR-642a-3p
hsa-miR-642a-5p
hsa-miR-642b-3p
hsa-miR-642b-5p
hsa-miR-657
hsa-miR-663b
hsa-miR-664a-5p
hsa-miR-6815-5p -continued hsa-miR-766-3p
hsa-miR-885-3p
hsa-miR-93-3p
hsa-miR-941
hsa-miR-99a-5p
hsa-let-7e-5p
hsa-miR-103b
hsa-miR-107
hsa-miR-12116
hsa-miR-122b-3p
hsa-miR-1246
hsa-miR-132-3p
hsa-miR-139-5p
hsa-miR-140-3p
hsa-miR-150-3p
hsa-miR-151a-5p
hsa-miR-181a-2-3p
hsa-miR-181a-3p
hsa-miR-185-5p
hsa-miR-25-3p
hsa-miR-26b-5p
hsa-miR-28-5p
hsa-miR-3065-5p
hsa-miR-3074-5p
hsa-miR-3157-5p
hsa-miR-3184-3p
hsa-miR-3184-5p
hsa-miR-3200-5p
hsa-miR-320b
hsa-miR-320c
hsa-miR-324-3p
hsa-miR-339-5p
hsa-miR-3614-3p
hsa-miR-3652
hsa-miR-374b-5p
hsa-miR-374c-3p
hsa-miR-378a-3p
hsa-miR-3940-3p
hsa-miR-4298
hsa-miR-4635
hsa-miR-4685-5p
hsa-miR-4707-3p
hsa-miR-4771
hsa-miR-486-3p
hsa-miR-501-3p
hsa-miR-532-5p
hsa-miR-550a-3-5p
hsa-miR-629-5p
hsa-miR-651-5p
hsa-miR-6734-5p
hsa-miR-6786-3p
hsa-miR-6873-3p
hsa-miR-7706
hsa-miR-7847-3p
hsa-miR-8485
hsa-miR-98-5p.

2. The method of claim 1, wherein the endometrial state is pre-receptive, receptive, or post-receptive.

3. The method of claim 2, wherein when the endometrial state is receptive the subject is receptive to embryo transfer.

4. The method of claim 2, wherein when the endometrial state is pre-receptive the subject is receptive to embryo transfer about 24 hours after the sample was obtained from the subject.

5. The method of claim 2, wherein when the endometrial state is post-receptive the subject has passed the receptive state.

6. The method of claim 2, wherein when the endometrial state is post-receptive the subject is receptive to embryo transfer about 24 hours or about 12 hours before the sample was obtained from the subject.

7. The method of claim 1, wherein the subject has a history of implantation failure, few remaining high quality embryos, a lower or higher than normal BMI, is overweight, and/or is underweight.

8. The method of claim 1, wherein the method is performed during a first menstrual cycle.

9. The method of claim 8, wherein the method is repeated during a subsequent menstrual cycle in the subject.

10. The method of claim 8, further comprising transferring an embryo to the subject during a subsequent menstrual cycle in the subject, wherein the embryo is transferred during the time period identified during the first menstrual cycle as the time period when the subject is receptive to embryo transfer.

11. The method of claim 1, wherein the sample is obtained about 5 days after starting progesterone administration during an assisted reproductive technology treatment cycle.

12. The method of claim 1, wherein the subject is infertile.

13. The method of claim 1, wherein the subject is undergoing in vitro fertilization.

14. The method of claim 1, wherein the subject is undergoing infertility treatments.

15. The method of claim 1, wherein the subject is undergoing assisted reproductive technology treatment.

16. The method of claim 1, wherein the sample is obtained prior to an embryo transfer.

17. The method of claim 1, wherein the subject is not pregnant at the time of obtaining the sample.

18. The method of claim 1, wherein the subject is a human.

19. The method of claim 1, wherein the subject is a human female.

20. The method of claim 1, wherein the sample is obtained about 7 days after a luteinizing hormone (LH) surge is detected in the subject.

21. The method of claim 1, wherein the sample is obtained about 7 days after human chorionic gonadotropin (hCG) administration to the subject.

22. The method of claim 1, wherein the sample is obtained about 4 days or about 5 days after starting progesterone administration during an assisted reproductive technology treatment cycle.

23. The method of claim 1, wherein the sample is obtained about 6 days or about 7 days after an LH surge is detected in the subject.

24. The method of claim 1, wherein the sample is obtained about 6 days or about 7 days after hCG administration to the subject.

25. The method of claim 1, wherein the machine-learning model is trained to receive input data of age of the respective subject, body mass index (BMI) of the subject, pregnancy history of the subject, and implantation failure history of the subject, and predict the endometrial status of the subject based on the input data in addition to the miRNA expression profile.

* * * * *